(12) United States Patent
Daniels et al.

(10) Patent No.: US 11,694,161 B2
(45) Date of Patent: Jul. 4, 2023

(54) PLATFORM FOR INVESTIGATIVE ANALYSIS

(71) Applicant: In8Development, Inc., Camas, WA (US)

(72) Inventors: James Daniels, Camas, WA (US); Glen Wooden, Camas, WA (US); Aryk Moore, Camas, WA (US); Michael Payne, Camas, WA (US); Jill St. Clair Webb, Camas, WA (US); Jared Halper, Camas, WA (US)

(73) Assignee: In8Development, Inc., Camas, WA (US)

( * ) Notice: Subject to any disclaimer, the term of this patent is extended or adjusted under 35 U.S.C. 154(b) by 1154 days.

(21) Appl. No.: 16/112,142

(22) Filed: Aug. 24, 2018

(65) Prior Publication Data

US 2019/0080288 A1 Mar. 14, 2019

Related U.S. Application Data

(60) Provisional application No. 62/549,652, filed on Aug. 24, 2017.

(51) Int. Cl.
| | | |
|---|---|---|
| *G06F 3/04817* | (2022.01) | |
| *G06Q 10/10* | (2023.01) | |
| *G06F 21/62* | (2013.01) | |
| *G06F 16/25* | (2019.01) | |
| *G06Q 50/18* | (2012.01) | |

(52) U.S. Cl.
CPC ....... *G06Q 10/103* (2013.01); *G06F 3/04817* (2013.01); *G06F 16/252* (2019.01); *G06F 21/6209* (2013.01); *G06Q 50/18* (2013.01)

(58) Field of Classification Search
CPC .. G06Q 10/103; G06Q 50/108; G06F 16/252; G06F 21/6209; G06F 3/04817
See application file for complete search history.

(56) References Cited

U.S. PATENT DOCUMENTS

| | | | | |
|---|---|---|---|---|
| 5,801,700 | A  * | 9/1998 | Ferguson | G06F 3/0486 |
| | | | | 715/748 |
| 8,341,734 | B1 * | 12/2012 | Hernacki | G06F 16/24 |
| | | | | 726/21 |
| 9,355,107 | B2 | 5/2016 | Meaney et al. | |
| 9,852,606 | B1 | 12/2017 | Heier et al. | |
| 2006/0069994 | A1 * | 3/2006 | Weidner | G06F 9/451 |
| | | | | 345/581 |
| 2007/0112713 | A1 | 5/2007 | Seaman et al. | |
| 2008/0021921 | A1 * | 1/2008 | Horn | G06F 3/0485 |
| 2008/0140604 | A1 * | 6/2008 | Collier | G06F 16/24534 |
| 2008/0281904 | A1 * | 11/2008 | Conrad | G06Q 10/0631 |
| | | | | 709/203 |
| 2009/0113329 | A1 * | 4/2009 | Corona | G06F 3/0486 |
| | | | | 715/769 |
| 2009/0271238 | A1 | 10/2009 | Himley et al. | |
| 2009/0287529 | A1 * | 11/2009 | Johnson | G06Q 40/02 |
| | | | | 705/35 |
| 2010/0305992 | A1 | 12/2010 | Michalzuk et al. | |
| 2011/0296507 | A1 * | 12/2011 | Khosrowshahi | G06F 16/93 |
| | | | | 715/810 |
| 2012/0084288 | A1 | 4/2012 | Abdul-Razzak et al. | |
| 2013/0150074 | A1 | 6/2013 | Shrestha et al. | |

(Continued)

*Primary Examiner* — Nicholas Klicos
(74) *Attorney, Agent, or Firm* — Chernoff, Vilhauer, McClung & Stenzel, LLP

(57) ABSTRACT

A system for investigative analysis.

14 Claims, 65 Drawing Sheets

A VIEW OF THE DEFAULT DASHBOARD STATE

(56) References Cited

U.S. PATENT DOCUMENTS

| | | | | |
|---|---|---|---|---|
| 2013/0211866 A1* | 8/2013 | Gordon | G06Q 10/06313 | 705/7.15 |
| 2013/0212432 A1* | 8/2013 | Guthrie | H04L 67/06 | 714/16 |
| 2013/0304700 A1* | 11/2013 | Nicklin | G06F 16/27 | 707/624 |
| 2014/0156657 A1* | 6/2014 | Kottoor | G06Q 10/10 | 707/736 |
| 2014/0372336 A1* | 12/2014 | Young | G06Q 40/12 | 705/342 |
| 2015/0222615 A1* | 8/2015 | Allain | H04L 63/08 | 726/4 |
| 2015/0286636 A1* | 10/2015 | Elkhou | G06Q 50/18 | 707/722 |
| 2015/0379472 A1* | 12/2015 | Gilmour | G06F 16/168 | 705/7.15 |
| 2016/0004714 A1* | 1/2016 | Szymkowiak | H04L 67/06 | 715/739 |
| 2017/0200122 A1* | 7/2017 | Edson | H04L 63/104 | |
| 2018/0189706 A1* | 7/2018 | Newhouse | G06Q 10/06316 | |

* cited by examiner

USER INTERFACE
300

ENGINE
310

VAULT
320

FIG. 3

```
using System;
using In8.Core;
using In8.Core.Attributes;

namespace FamilyModule
{
   public class Child : In8Object
   {
      public In8List<Meal> WontEat
      {
         get { return this.GetPropertyValue<In8List<Meal>>(nameof(this.WontEat)); }
         set { this.SetPropertyValue<In8List<Meal>>(nameof(this.WontEat), value); }
      } public string FavoriteToy
      {
         get { return this.GetPropertyValue<string>(nameof(this.FavoriteToy)); }
         set { this.SetPropertyValue<string>(nameof(this.FavoriteToy), value); }
      }

[In8ItemKeyProperty]
      public string ItemKey
      {
         get { return this.GetPropertyValue<string>(nameof(this.ItemKey)); }
         set { this.SetPropertyValue<string>(nameof(this.ItemKey), value); }
      } public bool IsGrounded
      {
         get { return this.GetPropertyValue<bool>(nameof(this.IsGrounded)); }
         set { this.SetPropertyValue<bool>(nameof(this.IsGrounded), value); }
      }
   }
}
```

FIG. 5

| Datatype | Description |
| --- | --- |
| Object | |
| ListOfObjects | The platform supports a specialized datatype of "List". Lists contain a collection of zero or more Objects, all of the same base type. |
| SimpleObject | Any Serializable .NET object. |
| String | String. |
| Boolean | Boolean. |
| Byte | A single byte. Value 0 to 255. |
| SByte | A signed byte. Value -128 to 127. |
| Char | A Single Unicode character. |
| Decimal | 128-bit precise decimal value with 28-29 significant digits. Value $\pm 1.0 \times 10^{-28}$ to $\pm 7.9 \times 10^{28}$. |
| Double | 64-bit double-precision floating point. Value $\pm 5.0 \times 10^{-324}$ to $\pm 1.7 \times 10^{308}$. |
| Float | Floating point number. |
| Int | 32-bit signed integer. Value from -2,147,483,648 to 2,147,483,647. |
| ByteArray | An array of Byte. Length is not internally limited. |
| UShort | 16-but unsigned integer. Value 0 to 65,535. |
| UInt | 32-bit unsigned integer. Value 0 to 4,294,967,295. |
| Long | 64-bit Signed integer. Value from 9,223,372,036,854,775,808 to 9,223,372,036,854,775,807. |
| ULong | 64-bit unsigned integer. Value 0 to 18,446,744,073,709,551,615. |
| Short | 16-bit signed integer. Value -32,768 to 32,767. |
| Link | |
| Money | |
| DateTimeOffset | |
| Percent | Percentage. |
| Color | Color. |
| Guid | 128-bit universally unique identifier (UUID). |
| SimpleMoney | |
| Currency | |
| Stream | An unlimited-length stream of bytes. |
| FuzzyDate | Opening date. |
| Enumeration | |

FIG. 6

A VIEW OF THE DEFAULT DASHBOARD STATE

A VIEW OF THE QUICK LINKS AREA OF THE DASHBOARD

A VIEW OF THE MY INVESTIGATIONS PROJECT AREA OF THE DASHBAORD

ACTION ITEMS ⟵ 730

Day Week Month     Search Action Itmes

| Perform a trash run at 125 NE Jarlsville Road | Due by: 5/20/2016 ✓ ! ◯ X | ⟵ 1000 |

| Submit expense reports | Due by: 5/24/2016 ✓ ! ◯ X |

| Upload the new evidence for the Jennifer Smith investigation | Due by: 5/26/2016 ✓ ! ◯ X |

| Review the audio tape from the Xanadu investigation | Due by: 5/26/2016 ✓ ! ◯ X | ⟵ 1050 |

| Request subpoena for new Polyfil suspect locations | Due by: 5/28/2016 ✓ ! ◯ X | ⟵ 1040 |

| Check in with supervisor on the Xanadu interview questions | Due by: 5/31/2016 ✓ ! ◯ X | ⟵ 1030 |

| Review evidence gathered at 9547 S Portland Ave | Due by: 6/15/2016 ✓ ! ◯ X | ⟵ 1020 |

| Contact potential new lead for the Schmidt investigation | Due by: 6/21/2016 ✓ ! ◯ X | ⟵ 1010 |

View All

A VIEW OF THE ACTION ITEMS AREA OF THE DASHBOARD

FIG. 10

THE FILE VIEWER, WITH THE SELECTED TEXT TOOLBAR
AND ASSOCIATED ACTIONS

2. Drake Blaine is the owner of ABC Bookkeeping. They provide bc
Clare Stevens was hired by Blaine as the bookkeeper and office

POTENTIAL DATABASE MATCHES READY FOR USERS TO
CONFIRM

THE CANVAS WITH LINKED CARDS

THE CAVAS CARDS WITH THE TAGS DRAWER OPEN
(LEFT) AND CLOSED (RIGHT)

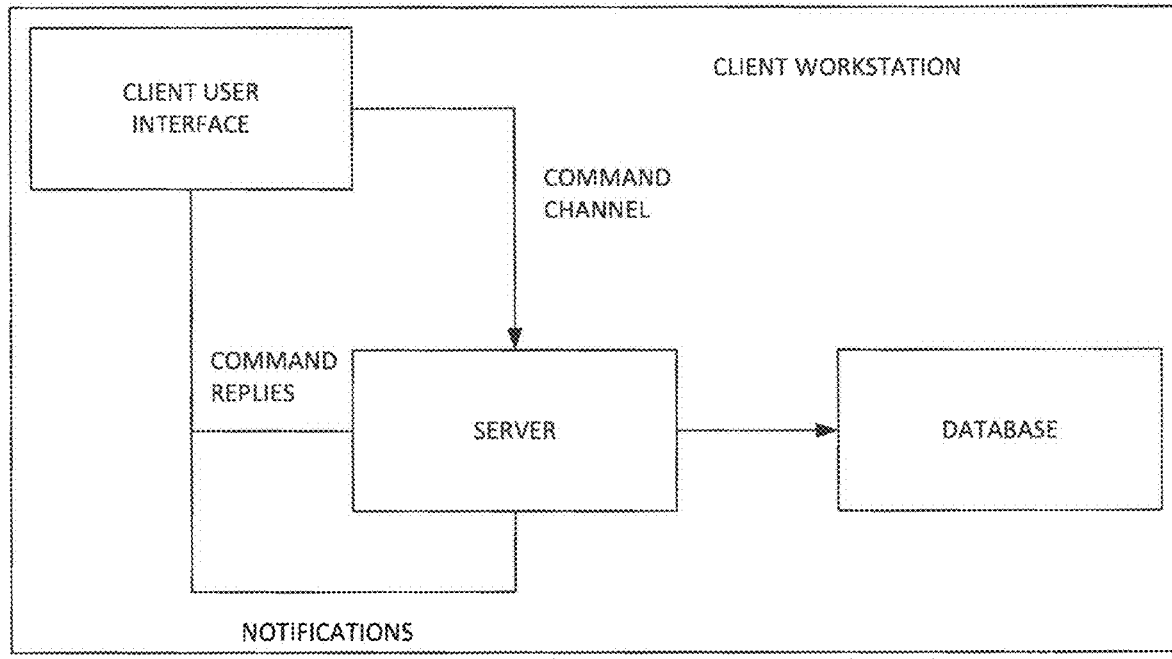
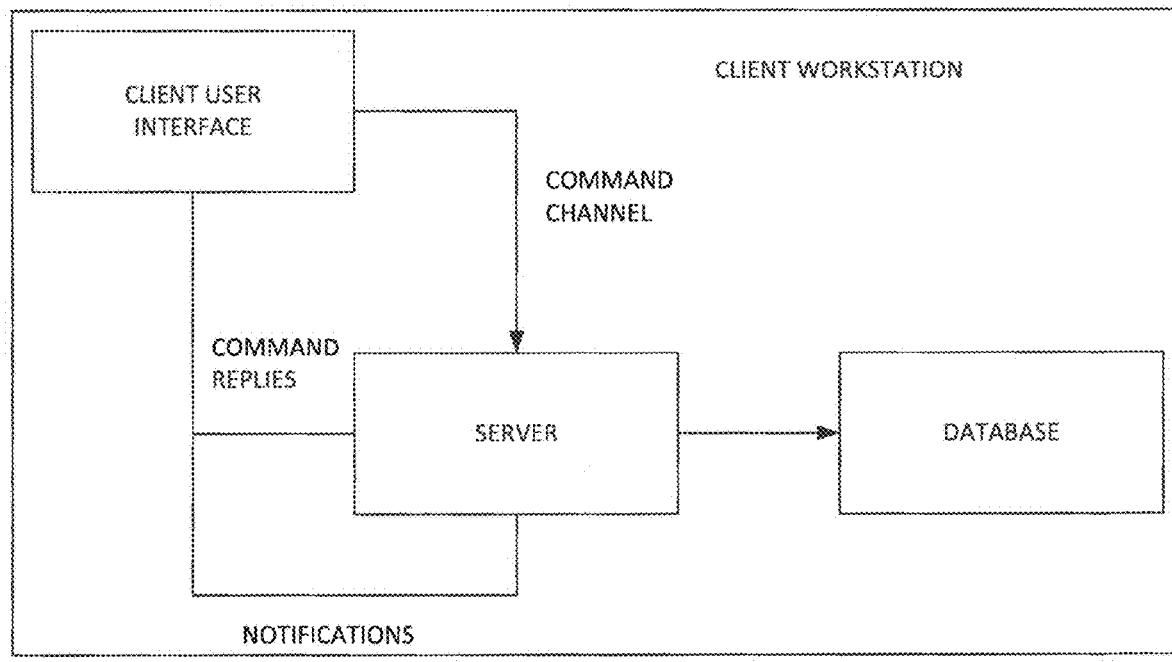
FIG. 15

Investigation — 1900

| Property | Data Type | Description |
|---|---|---|
| Description | String | |
| Unique Key Prefix | String | Prefix just for creating the unique number applied to Digital Files |
| Closed | Boolean | If the investigation is closed |
| Execute Deconfliction | Boolean | If entities in the investigation are subject to deconfliction |
| Only One-Way Deconfliction | Boolean | If deconfliction notices are only set to this investigation |
| Opened Date | FuzzyDate | |
| Grand Jury | Boolean | If the investigation is a Grand Jury |
| Currency | CurrencyType | The base currency type of the investigation |
| Date Created | DateTimeOffset | System Tracking for date investigation was created |
| Days Open | Integer | System Tracking for number of days the investigation has been open |

| Links to | Description |
|---|---|
| Investigation Case numbers | |
| Investigation Types | |
| Investigation Users | |
| Investigation Statuses | |

1950 — Description
1980 — Unique Key Prefix
1940 — Closed
1965 — Execute Deconfliction
1955 — Only One-Way Deconfliction
1910 — Opened Date
1985 — Grand Jury
1975 — Currency
1920 — Date Created
1930 — Days Open
1970 — Investigation Case numbers
1960 — Investigation Types
1990 — Investigation Users
1995 — Investigation Statuses

FIG. 19

Investigation Status

| Property | Data Type | Description |
|---|---|---|
| Start Date | FuzzyDate | |
| End Date | FuzzyDate | |

| Links to | Description |
|---|---|
| Investigation Status Type | |

FIG. 20

Investigation User

| Property | Data Type | Description |
|---|---|---|
| Sync Data File Offline | Boolean | |
| Sync Files Offline | Boolean | |
| Active | Boolean | |

| Links to | Description |
|---|---|
| Investigation User Role | |
| Investigation User Permissions | |

FIG. 21

Action Item (Inherited from ActionItem)

| Links to | Description |
|---|---|
| Investigation | |
| Evidence Items | |
| Entities | |
| Facts | |

FIG. 22

Investigation Document Data

| Property | Data Type | Description |
|---|---|---|
| Document Source Type | | |
| Production Requests | | |
| Grand Jury | Boolean | |
| Page Code | | |
| Not Discoverable | Boolean | |
| Brady | Boolean | |
| Jencks | Boolean | |
| Giglio-Henthorn | Boolean | |

| Links to | Description |
|---|---|
| Witness | |

FIG. 23

Evidence Item

| Property | Data Type | Description |
|---|---|---|
| Date of the Evidence | FuzzyDate | |
| Description of Evidence | String | |
| Physical Evidence | Boolean | |

| Links to | Description |
|---|---|
| Evidence Items | |
| Entities | |
| Evidence Type | |

FIG. 24

Document Production Request Data

| Property | Data Type | Description |
|---|---|---|
| Served Date | FuzzyDate | |
| Due Date of the request | FuzzyDate | |
| Date request was complied with | FuzzyDate | |

| Links to | | Description |
|---|---|---|
| Document Production Request Type | | |
| Status of the request | | |
| The Entity (Person or Business) that was sent the request | | |
| Address Entity or type in the address where was sent | | |

FIG. 25

Facts

| Property | Data Type | Description |
|---|---|---|
| Short Description | String | |
| Description | String | |
| Fact Date | FuzzyDate | |

| Links to | Description |
|---|---|
| User who created Fact (System Tracked) | |
| Investigation | |
| Evidence Items | |
| Entities | |
| Users | |
| Entity Relationships | |
| Entity Identifiers | |
| Investigation Report Paragraph | |
| Document Page Annotation | |
| Investigation Summary Report | |
| Subject Violation Elements | |
| Investigation Summary Report Section Titles | |

2610 — Short Description
2620 — Description
2630 — Fact Date
2640 — User who created Fact
2645 — Investigation
2655 — Evidence Items
2660 — Entities
2650 — Users
2665 — Entity Relationships
2670 — Entity Identifiers
2675 — Investigation Report Paragraph
2680 — Document Page Annotation
2685 — Investigation Summary Report
2690 — Subject Violation Elements

GPS Tracking Data
― 2700

| Property | Data Type | Description |
|---|---|---|
| Beginning Date | FuzzyDate | |
| Ending Date | FuzzyDate | |

| Links to | | Description |
|---|---|---|
| Entity being tracked | | |
| Tracking Type (Example: Tracking Warrant) | | |
| Tracking Events | | |

GPS Tracking Event
― 2800

| Property | Data Type | Description |
|---|---|---|
| Date and Time of Event | FuzzyDate | |
| Latitude | Float | |
| Longitude | Float | |
| Address Description | String | |

| Links to | | Description |
|---|---|---|
| Address Entity | | |

Mail Cover Data

Mail Cover ⎯ 2900

| Property | Data Type | Description |
|---|---|---|
| Reference Number | String | Mail Cover reference number |
| Date Approved | FuzzyDate | |
| Begin Date | FuzzyDate | |
| End Date | FuzzyDate | |

| Links to | | Description |
|---|---|---|
| Investigation Numbers | | |
| Related Person and/or Business Entities | | |
| Address Entity | | |
| Mail Cover Groups | | |

2940 — Reference Number
2950 — Date Approved
2960 — Begin Date
2970 — End Date
2930 — Investigation Numbers
2920 — Related Person and/or Business Entities
2910 — Address Entity
2980 — Mail Cover Groups

FIG. 29

Mail Cover Group ⎯ 3000

| Property | Data Type | Description |
|---|---|---|
| Date Received | FuzzyDate | |
| Number of items Received | Integer | |
| Number of items Returned | Integer | |
| Date Returned | FuzzyDate | |

| Links to | Description |
|---|---|
| Mail Cover Items | |

3010 — Date Received
3020 — Number of items Received
3030 — Number of items Returned
3040 — Date Returned
3050 — Mail Cover Items

FIG. 30

Mail Cover Item

| Property | Data Type | Description |
|---|---|---|
| Item Number | Integer | |
| Letter Date | FuzzyDate | |

| Links to | Description |
|---|---|
| Address Entity | |
| Related Person and/or Business Entities | |

FIG. 31

Telephone Toll Data

Phone Toll

| Property | Data Type | Description |
|---|---|---|
| Beginning Date | FuzzyDate | |
| Ending Date | FuzzyDate | |
| Phone Toll Type | | Example: Pen register |

| Links to | Description |
|---|---|
| Phone Number Entity | |
| Person/Business Entity | |
| Phone Toll Details | |

FIG. 32

Phone Toll Detail

| Property | Data Type | Description |
|---|---|---|
| Date and Time | FuzzyDate | |
| Duration | Integer | |

| Links to | Description |
|---|---|
| Phone Number Entity | |

Financial

Bank Statement (Inherited from Evidence Item)

| Property | Data Type | Description |
|---|---|---|
| Begin Date | FuzzyDate | |
| Begin Balance | Money | |
| End Date (Evidence Date) | FuzzyDate | |
| End Balance | Money | |
| Total Deposits | Money | |
| Total Withdrawals | Money | |
| Reconciled | Boolean | |

| Links to | Description |
|---|---|
| Account | |
| Bank Transactions | |
| Lock Status | |

Bank Transaction

| Property | Data Type | Description |
|---|---|---|
| Check Number | String | |
| Cleared Date | FuzzyDate | |
| Amount | Money | |

| Links to | Description |
|---|---|
| Bank Transaction Details | |
| Entities | |

FIG. 35

Bank Transaction Detail

| Property | Data Type | Description |
|---|---|---|
| Amount | Money | |

| Links to | Description |
|---|---|
| Bank Item | |

FIG. 36

Bank Item (Inherited from Evidence Item)

| Property | Data Type | Description |
|---|---|---|
| Item Date | FuzzyDate | Evidence Date |
| Amount | Money | |
| Memo | String | |
| ABA Number | String | |
| Account Number | String | |
| Bad Unknown Amount | Money | |

| Links to | Description |
|---|---|
| Bank Items | |
| Account | |

FIG. 37

Check (Inherited from Bank Item)

| Property | Data Type | Description |
|---|---|---|
| Check Number | String | |

Case Investigation Report

Violation

| Property | Data Type | Description |
|---|---|---|
| Title | String | Title Number |
| Section | String | Code Section Number |
| Description | String | Text description of the Violation |
| Help Description | String | |

| Links to | Description |
|---|---|
| Violation Element | |

Violation Element

| Property | Data Type | Description |
|---|---|---|
| Element Number | Integer | |
| Description | String | Description of the Element |
| Help Description | String | |

Investigation Summary Report Section Title Default — 4100

| Property | Data Type | Description |
|---|---|---|
| Order | Integer | |
| Title | String | |
| Required | Boolean | |
| Hide | Boolean | |
| User Created | Boolean | |
| Cited Section | Boolean | |
| Display in TOC | Boolean | |
| Subject Section | Boolean | |
| Allow User Section | Boolean | |
| Can Move | Boolean | |

| Links to | Description |
|---|---|
| Agency Form | |
| Investigation Summary Report Section Titles Defaults | |

4130 Order
4140 Title
4150 Required
4160 Hide
4170 User Created
4180 Cited Section
4185 Display in TOC
4190 Subject Section
4195 Allow User Section
4175 Can Move
4110 Agency Form
4120 Investigation Summary Report Section Titles Defaults

FIG. 41

Investigative Summary Report — 4200

| Property | Data Type | Description |
|---|---|---|
| Title | String | |
| Theory | String | |

| Links to | Description |
|---|---|
| Form | |
| Investigation Summary Report Subjects | |
| Investigation Summary Report Section Titles | |
| Investigation Summary Report Appendices | |
| Investigation Summary Report Attachments | |

4220 Title
4230 Theory
4210 Form
4250 Investigation Summary Report Subjects
4260 Investigation Summary Report Section Titles
4270 Investigation Summary Report Appendices
4240 Investigation Summary Report Attachments

FIG. 42

Create an Investigation Summary Report Subject — 4300

| Property | Data Type | Description |
|---|---|---|
| Hide | Boolean | |
| Order | Integer | |
| Venue | String | |
| Description | | |

| Links to | | Description |
|---|---|---|
| Person/Business | | Subject Entity |
| Investigation Numbers | | |
| Investigation Summary Report Subject Violations | | |

4340 Hide
4350 Order
4360 Venue / Description

4210 Person/Business
4320 Investigation Numbers
4330 Investigation Summary Report Subject Violations

FIG. 43

Investigation Summary Report Subject Violations — 4400

| Property | Data Type | Description |
|---|---|---|
| Hide | Boolean | |
| Order | Integer | |
| Date | String | |
| Count | String | |

| Links to | Description |
|---|---|
| Investigation Summary Report Subject Violation Elements | |

4410 Hide
4420 Order
4430 Date
4440 Count
4450 Investigation Summary Report Subject Violation Elements

FIG. 44

Investigation Summary Report Subject Violation Elements (System created) — 4500

| Property | Data Type | Description |
|---|---|---|
| Element Number | Integer | |
| Description | String | |
| Can Modify | Boolean | |

| Links to | Description |
|---|---|
| Facts | |

4510 Element Number
4520 Description
4530 Can Modify
4540 Facts

FIG. 45

Investigation Summary Report Section Title — 4600

| Property | Data Type | Description |
|---|---|---|
| Order | Integer | |
| Title | String | |
| Required | Boolean | |
| Hide | Boolean | |
| User Created | Boolean | |
| Cited Section | Boolean | |
| Display in TOC | Boolean | |
| Subject Section | Boolean | |
| Allow User Section | Boolean | |
| Can Move | Boolean | |

| Links to | Description |
|---|---|
| Agency Form | |
| Investigation Summary Report Section Titles | |
| Investigation Summary Report Subjects | |
| Facts | |

- 4610 Order
- 4615 Title
- 4620 Required
- 4625 Hide
- 4630 User Created
- 4535 Cited Section
- 4640 Display in TOC
- 4645 Subject Section
- 4650 Allow User Section
- 4655 Can Move
- 4660 Agency Form
- 4670 Investigation Summary Report Section Titles
- 4680 Investigation Summary Report Subjects
- 4690 Facts

FIG. 46

Investigation Summary Report Section Attachment — 4700

| Property | Data Type | Description |
|---|---|---|
| Name | String | |
| Order | Integer | |
| Description | String | |
| Hide | Boolean | |

| Links to | Description |
|---|---|
| Document | |
| Investigation Summary Report Attachment Type | Appendix/Attachment |

- 4710 Name
- 4720 Order
- 4730 Description
- 4740 Hide
- 4750 Document
- 4760 Investigation Summary Report Attachment Type

FIG. 47

Case Investigation Report

Investigation Report — 4800

| Property | Data Type | Description |
|---|---|---|
| Start Time | FuzzyDate | |
| End Time | FuzzyDate | |
| Other Location | String | Text description if the location is not an Address Entity |
| Prepared Date | DateTimeOffset | Captured by the system |

| Links to | | Description |
|---|---|---|
| Investigation Report Paragraphs | | |
| Investigation Numbers | | |
| Investigation Report Entity Link Type Roles | | |

Investigation Report Paragraph — 4900

| Property | Data Type | Description |
|---|---|---|
| Number | Integer | |
| Description | String | |
| Entry time | DateTimeOffset | |
| Entry Date | DateTimeOffset | Captured by the system |
| Last Change | DateTimeOffset | Captured by the system |

| Links to | | Description |
|---|---|---|
| Entities | | |
| Evidence Items | | |
| Facts | | |

Search Warrant

Search Warrant — 5000

| Property | Data Type | Description |
|---|---|---|
| Judicial Area | String | |
| Court Reference Number | String | |
| Start Time | FuzzyDate | |
| End Time | FuzzyDate | |

| Links to | Description |
|---|---|
| Investigation | |
| Investigation Numbers | |
| Entity as Search Location | |
| Search Warrant Plan | |
| Entities Present | |
| Search Warrant Persons on Site | |
| Violations | |
| Search Warrant Files | |
| Search Warrant Rooms | |
| Search Warrant Box | |
| Search Warrant Item | |
| Search Warrant Property | |
| Seized Groups | |
| Person/User | Affiant on Search Warrant |

Search Warrant Plan — 5100

| Property | Data Type | Description |
|---|---|---|
| Staging Date and Time | FuzzyDate | |
| Execution Date and Time | FuzzyDate | |
| Objective | String | |
| Plan of Action | String | |
| Other Pertinent Information | String | |

| Links to | | Description |
|---|---|---|
| Address as Staging Location | | |
| Business as Nearest Medical Facility | | |
| Address as Nearest Medical Facility Location | | |
| Possible Entities Present | | |
| Search Warrant Person | | |

FIG. 51

Search Warrant Person — 5200

| Property | Data Type | Description |
|---|---|---|
| Start Time | FuzzyDate | |
| End Time | FuzzyDate | |
| Initials | String | |

| Links to | | Description |
|---|---|---|
| Person/User | | |
| Search Warrant Roles | | |
| Search Warrant Equipment | | |
| Notes | | |

FIG. 52

Search Warrant Person Role

| Property | Data Type | Description |
|---|---|---|
| Description | String | |

| Links to | | Description |
|---|---|---|
| Person Role Type | | |

FIG. 53

Search Warrant Area

| Property | Data Type | Description |
|---|---|---|
| Code | String | |
| Description | String | |

| Links to | | Description |
|---|---|---|
| Search Warrant Items | | |

FIG. 54

Search Warrant Item

| Property | Data Type | Description |
|---|---|---|
| Item Number | Integer | |
| Where Found | String | |
| Contraband | Boolean | |

| Links to | | Description |
|---|---|---|
| Search Warrant Room | | |
| Search Warrant Seized Group | | |
| Search Warrant Person | | Seizing Officer |
| Search Warrant Persons | | Found By |
| Search Warrant Property | | |
| Seized Group | | |
| Entities | | |
| Search Warrant Box | | |

FIG. 55

Search Warrant Box

| Property | Data Type | Description |
|---|---|---|
| Box Number | Integer | |

| Links to | Description |
|---|---|
| Search Warrant Box Type | |

FIG. 56

Search Warrant Property Seized Group

| Property | Data Type | Description |
|---|---|---|
| Item Number | Integer | |
| Description | String | |

FIG. 57

Specific Entity Type Data

Investigation Entity

| Property | Data Type | Description |
|---|---|---|
| OnlyOneWayDeconfliction | Boolean | |

| Links to | Description |
|---|---|
| Notes | |
| Entity Identifiers | |
| Entity Roles | |
| Facts | |
| Evidence | |

FIG. 58

Person (Inherited from Investigation Entity)

| Property | Data Type | Description |
|---|---|---|
| First Name | String | |
| Last Name | String | |
| Suffix | String | |
| Date of Birth | FuzzyDate | |
| Taxpayer Identification Number (TIN) | String | |

| Links to | Description |
|---|---|
| Other Date of Births used | |
| Other TINs used | |

FIG. 59

Business (Inherited from Investigation Entity)

| Property | Data Type | Description |
|---|---|---|
| Name | String | |
| Taxpayer Identification Number | String | |

FIG. 60

Account (inherited from Investigation Entity) — 6100

| Property | Data Type | Description |
|---|---|---|
| Description | String | |
| Number | String | |
| ABA Number | String | |
| Open Date | FuzzyDate | |
| Closed Date | FuzzyDate | |
| Number Decimal Places | Integer | Number of decimal places used by the account |
| Currency | CurrencyType | Account currency type |
| Nickname | String | User defined name for the account |

| Links to | Description |
|---|---|
| Calculation Method | FIFO (First in, First Out) or LIFO (Last in, First Out) for an account that has comingled legal and illegal funds |

- 6110 Description
- 6120 Number
- 6130 ABA Number
- 6140 Open Date
- 6150 Closed Date
- 6160 Number Decimal Places
- 6170 Currency
- 6180 Nickname
- 6190 Calculation Method

FIG. 61

Address (inherited from Investigation Entity) — 6200

| Property | Data Type | Description |
|---|---|---|
| Line 1 | String | |
| Line 2 | String | |
| Line 3 | String | |
| City | String | |
| State | String | |
| Postal Code | String | |
| Country | String | |
| Latitude | Float | |
| Longitude | Float | |
| System will determine and store GPS Data for an address? | Boolean | |

- 6210 Line 1
- 6220 Line 2
- 6230 Line 3
- 6240 City
- 6250 State
- 6260 Postal Code
- 6270 Country
- 6280 Latitude
- 6290 Longitude
- 6295 System will determine and store GPS Data for an address?

FIG. 62

Boat (Inherited from Investigation Entity) — 6300

| Property | Data Type | Description |
|---|---|---|
| Description | String | |
| Boat Name | String | |
| HID | String | Hull Identification Number |

Plane (Inherited from Investigation Entity) — 6400

| Property | Data Type | Description |
|---|---|---|
| Description | String | |
| Tail Number | String | |
| ICAO | String | International Civil Aviation Organization Number |

Phone Number (Inherited from Investigation Entity) — 6500

| Property | Data Type | Description |
|---|---|---|
| Number | String | |
| Extension | String | |

Vehicle — 6600

| Property | Data Type | Description |
|---|---|---|
| Description | String | |
| Plate | String | |
| State of Plate | String | |
| VIN | String | Vehicle Identification Number |

Litigation

Initial Hearing/Arraignment

Initial Appearance (Inherited from Court Activity) — 6900

| Links to | Description |
|---|---|
| Charged Entity Initial Appearance(s) | |

Charged Entity Initial Appearance (Inherited from Charged Entity) — 7000

| Links to | Description |
|---|---|
| Demand Appearance Type | Arrest Warrant/Summons to Appear/Extradition |
| Identity Hearing | |
| Detention Hearing | |

Demand Appearance Type (Arrest Warrant/Summons to Appear/Extradition) — 7100

| Property | Data Type | Description |
|---|---|---|
| Description | String | |

Identity Hearing (Inherited from Court Activity) — 7200

| Property | Data Type | Description |
|---|---|---|
| Proceed as Named | Boolean | |

Detention Hearing (Inherited from Court Activity) — 7300

| Property | Data Type | Description |
|---|---|---|
| Granted | Boolean | |
| Release Amount | Money | |
| Posted Amount | Money | |
| Date Posted | FuzzyDate | |

| Links to | Description |
|---|---|
| Detention Release Type | |

7310 — Granted
7320 — Release Amount
7330 — Posted Amount
7340 — Date Posted
7350 — Detention Release Type

FIG. 73

Detention Release Type (Bail/Bond/Detained/Released own recognizance) — 7400

| Property | Data Type | Description |
|---|---|---|
| Description | String | |

7410 — Description

FIG. 74

*Charging*

Court Activity — 7500

| Property | Data Type | Description |
|---|---|---|
| Scheduled Date | FuzzyDate | |
| Date Occurred | FuzzyDate | |

| Links to | Description |
|---|---|
| Court Activity Type | |
| Court Venue | |
| Testifying Witness(es) | |
| Court Activity Participant | |
| Court Decision | |
| Court Activity Attachment | |

Testifying Witness — 7600

| Property | Data Type | Description |
|---|---|---|
| Order | Integer | |
| Scheduled Date | FuzzyDate | |
| Date Occurred | FuzzyDate | |
| Anticipated Length of Testimony | Integer | |
| Expert Witness | Boolean | |

| Links to | Description |
|---|---|
| Court Evidence | Evidence to Present |
| Court Evidence | Evidence Presented |
| Testifying Witness Question | Direct Questions |
| Testifying Witness Question | Anticipated Cross Questions |
| Testifying Witness Question | Re-Direct Questions |
| Court Activity Attachment | |

Court Activity Type (Examples: indictment/information/complaint) — 7700

| Property | Data Type | Description |
|---|---|---|
| Description | String | |

FIG. 77

Court Venue — 7800

| Property | Data Type | Description |
|---|---|---|
| State | String | |
| Description | String | |

FIG. 78

Charged Entity — 7900

| Links to |
|---|
| Person/Business |
| Charged Entity Violation(s) |
| Court Activity Attachment |

FIG. 79

Court Decision Trial (Dropped/Dismissed with Prejudice/Dismissed without Prejudice/Guilty/Non-Guilty/Hung/Mistrial) — 8000

| Property | Data Type | Description |
|---|---|---|
| Description | String | |

| Links to |
|---|
| Court Activity Type |

FIG. 80

Charged Entity Violation — 8100

| Description |
|---|

| Links to |
|---|
| Violation |
| Charged Entity Element(s) |

FIG. 81

Charged Entity Element

| Links to | Description |
|---|---|
| Violation Element | |
| Charged Entity Element(s) | |

Court Activity Attachment

| Property | Data Type | Description |
|---|---|---|
| Description | String | |

— 8300

8310

| Links to | Description |
|---|---|
| Document | |
| Court Activity Attachment Type | |

Court Activity Attachment Type (Examples: Arrest Warrant/Transcripts/Filed Charging Documents Decision/ Plea Offer/Signed Plea Offer/Filed Plea Offer/Motion Document/Briefs/Affidavit/Ruling/Jury Instructions)

— 8400

| Property | Data Type | Description |
|---|---|---|
| Description | String | |

Court Evidence — 8500

| Property | Data Type | Description |
|---|---|---|
| Unique Identification Number | String | |
| Authenticated On | FuzzyDate | |

8510, 8520

| Links to | Description |
|---|---|
| Evidence | |
| Charged Entity Violation Element | |
| Testifying Witness | |
| Testifying Witness Question | |

Charging Presentation (inherited from Court Activity) — 8600

| Links to | Description |
|---|---|
| Charging Presentation to Type | |
| Charged Entity | |
| Charging Presentation | |

Charging Presentation to Type (Grand Jury/Judge) — 8700

| Property | Data Type | Description |
|---|---|---|
| Description | String | |

Charged Entity Charging Presentation (inherited from Charged Entity) — 8800

| Property | Data Type | Description |
|---|---|---|
| Arrested Prior | Boolean | |
| Arrest Warrant Issued | Boolean | |

*Export*

Export

| Property | Data Type | Description |
|---|---|---|
| Description | String | |
| Reason Description | String | |
| Bates Number Prefix | String | |
| Create Date | DateTimeOffset | System Captured |

| Links to | | |
|---|---|---|
| Investigation | | |
| Export Reason | | |
| Export Headers | | |

FIG. 89

Export Reason (agency/company created)

| Property | Data Type | Description |
|---|---|---|
| Description | String | |
| Allow Not Discoverable | Boolean | |
| Allow Grand Jury | Boolean | |
| Require Reason Description | Boolean | |

FIG. 90

Export Header — 9100

| Property | Data Type | Description |
|---|---|---|
| Actual Output Device | String | |
| Export Option | String | |
| Create Date | DateTimeOffset | System Captured |
| Update Date | DateTimeOffset | System Captured |
| Description | String | |

| Links to | | |
|---|---|---|
| Export | | |
| Export Status | | |
| Export Method | | |
| Export Output Type | | |
| User | | System Captured: who created the Export Header |
| Export Header Shared to Link | | |
| Export Objects | | |

Export Status (agency/company created) — 9200

| Property | Data Type | Description |
|---|---|---|
| Description | String | |

Export Method (agency/company created) — 9300

| Property | Data Type | Description |
|---|---|---|
| Description | String | |

Export Output Type (agency/company created)

| Property | Data Type | Description |
|---|---|---|
| Description | String | |

Export Object (System Defined)

| Property | Data Type | Description |
|---|---|---|
| Export Key Number | Integer | |
| Size | Decimal | |
| Type | String | |
| Path | String | |
| Date Exported | DateTimeOffset | System Captured |

| Links to | | |
|---|---|---|
| Digital File | | |
| Document Page | | |

Export Header Shared to Link

| Links to | Description |
|---|---|
| Person/User | |

*Plea Bargaining*

Plea Offer

| Links to |
|---|
| Charged Entity Plea Offer |

FIG. 97

Charged Entity Plea Offer (Inherited from Charged Entity)

| Property | Data Type | Description |
|---|---|---|
| Sentence Recommendation | String | |
| Restitution Recommendation Amount | Money | |
| Sentence Accepted | String | |
| Restitution Accepted Amount | Money | |

| Links to | Description |
|---|---|
| Plea Offer Resolution | |
| Sentencing | |

FIG. 98

Plea Offer Resolution (Accepted/Charged Entity Rejected/Withdrawn/Judge Rejected)

| Property | Data Type | Description |
|---|---|---|
| Description | String | |

FIG. 99

*Trial*

Pre-Trial Motions

Motion (Inherited from Action Item)

| Property | Data Type | Description |
|---|---|---|
| Joint | Boolean | |
| Date Filed | FuzzyDate | |
| Response Date | | Action Item: Due Date |
| Hearing Date | FuzzyDate | |

| Links to | | Description |
|---|---|---|
| Court Activity Participant(s) | | |
| Motion Ruling Type | | |
| Related Motions | | |
| Testifying Witness | | |
| Motion Hearing | | |

FIG. 100

Motion Stage Type (Pre-Trial/Trial/Post-Trial)

| Property | Data Type | Description |
|---|---|---|
| Description | String | |

FIG. 101

Motion Type (Dismiss, Suppress, Change of Venue)

| Property | Data Type | Description |
|---|---|---|
| Description | String | |

FIG. 102

Motion Ruling Type (Granted/Rejected/Granted in Part) ⎯ 10300

| Property | Data Type | Description |
|---|---|---|
| Description | String | |

Motion Hearing (Inherited from Court Activity) ⎯ 10400

| Links to | Description |
|---|---|
| Motion(s) | |

Trial

Trial (Inherited from Court Activity)

| Links to | Description |
|---|---|
| Trial Statement(s) | |
| Trial Jury(s) | |
| Trial Objection(s) | |
| Charged Entity Trial(s) | |

10510 — Trial Statement(s)
10520 — Trial Jury(s)
10530 — Trial Objection(s)
10540 — Charged Entity Trial(s)

Charged Entity Trial (Inherited from Charged Entity)

| Property | Data Type | Description |
|---|---|---|
| In Custody | Boolean | |

Trial Statement

| Property | Data Type | Description |
|---|---|---|
| Order | | |

| Links to | Description |
|---|---|
| Trial Statement Type | |
| Facts | |

10710 — Order
10720 — Trial Statement Type
10730 — Facts

Jury Selection

Trial Jury

| Links to | Description |
|---|---|
| Jurors | |
| Jury Selection(s) | |
| Jury Question(s) | |
| Charged Entity Trial(s) | |

Jury Selection

| Property | Data Type | Description |
|---|---|---|
| Number of Peremptory Challenges | Integer | |

— 10900

10910

| Links to | Description |
|---|---|
| Juror(s) | |
| Questionnaire | |

Trial Jury Questionnaire

| Property | Data Type | Description |
|---|---|---|
| Question | String | |

Trial Jury Questionnaire Question

| Property | Data Type | Description |
|---|---|---|
| Number | Integer | |
| Question | String | |

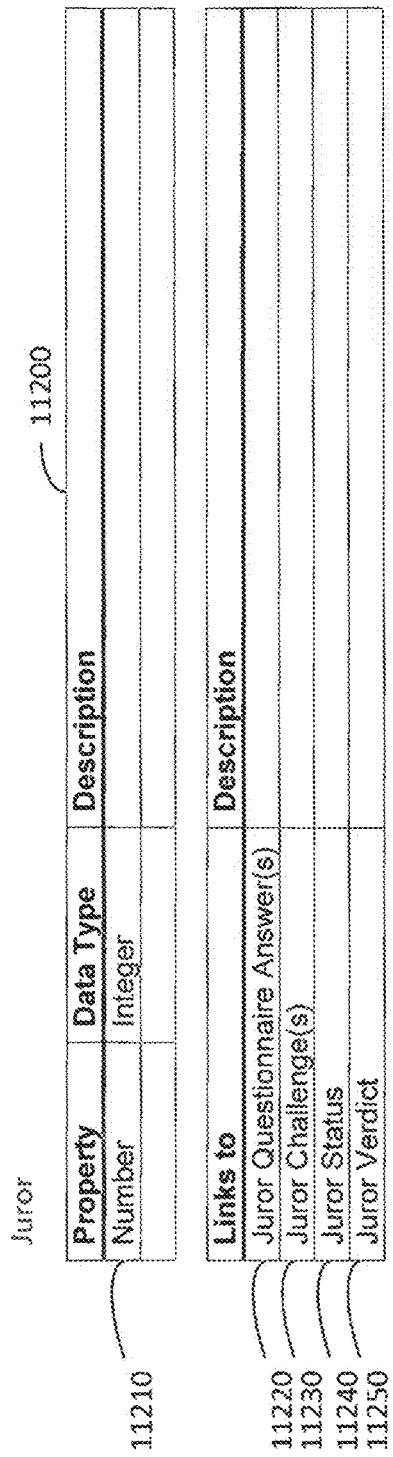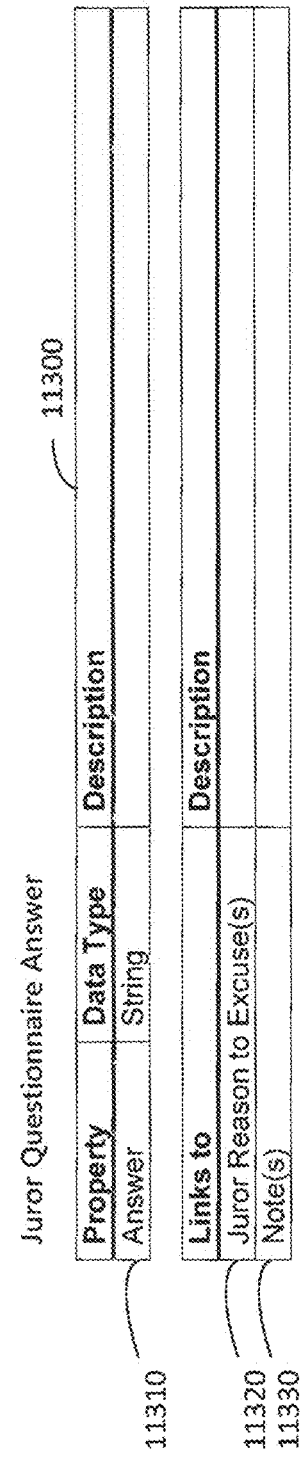

Juror Reason to Excuse (Rule 47) — 11400

| Property | Data Type | Description |
|---|---|---|
| Description | String | |

Juror Challenge — 11500

| Links to | Description |
|---|---|
| Court Activity Participant | Challenged by |
| Juror Challenge Type | |
| Juror Challenge Ruling | |

Juror Challenge Type (For Cause/Peremptory) — 11600

| Property | Data Type | Description |
|---|---|---|
| Description | String | |

Juror Challenge Ruling (Granted/Denied) — 11700

| Property | Data Type | Description |
|---|---|---|
| Description | String | |

Juror Status (Pool/Excused/Selected/Alternate/Forman) — 11800

| Property | Data Type | Description |
|---|---|---|
| Description | String | |

Juror Verdict (Guilty/Not Guilty)

| Property | Data Type | Description |
|---|---|---|
| Description | String | |

Jury Question

| Property | Data Type | Description |
|---|---|---|
| Description | String | |

| Links to | Description |
|---|---|
| Court Evidence | |
| Entities | |
| Charged Entity Violation | |
| Charged Entity Violation Element | |

Presentment of Cases

Objections

Trial Objections — 12100

| Property | Data Type | Description |
|---|---|---|
| Description | String | |
| Objection to Answer | Boolean | |

- 12110 Description
- 12120 Objection to Answer

| Links to | Description |
|---|---|
| Trial Objection Type | |
| Trial Objection Ruling | |
| Witness Question | |
| Court Evidence(s) | |
| Testifying Witness | |

- 12130 Trial Objection Type
- 12140 Trial Objection Ruling
- 12150 Witness Question
- 12160 Court Evidence(s)
- 12170 Testifying Witness

FIG. 121

Trial Objection Type (Hearsay/Relevance/Leading/Asked and Answered) — 12200

| Property | Data Type | Description |
|---|---|---|
| Description | String | |

- 12210 Description

FIG. 122

Trial Objection Ruling (Sustain/Overrule) — 12300

| Property | Data Type | Description |
|---|---|---|
| Description | String | |

- 12310 Description

FIG. 123

*Sentencing*

Sentencing (Inherited from Court Activity)

| Links to | Description |
|---|---|
| Charged Entity Sentencing(s) | |

Charged Entity Sentencing (Inherited from Charged Entity) — 12500

| Property | Data Type | Description |
|---|---|---|
| Sentence Recommendation | String | |
| Restitution Recommendation Amount | Money | |
| Sentence Accepted | String | |
| Restitution Accepted Amount | Money | |

*Appeal*

Trial Appeal

| Links to | Description |
|---|---|
| Trial Appeal Type | |
| Charged Entity Trial | |
| Charged Entity Sentencing | |

FIG. 126

Trial Appeal Type (Trail/Verdict/Sentence)

| Property | Data Type | Description |
|---|---|---|
| Description | String | |

FIG. 127

State – Search Results

Search Results X

All Projects > Stevens, Russel > Evidence > Search: "marriage"

Categories
  Court Activity
  Entities
  ☑ Evidence
  Facts
  Search Warrants
Objects
  Bank Item 1
  Bank Statement 1
  Bank Transaction 1
  Check 4
  Deposit 1
  EFT 1
  Evidence 8
  Investigation Report 2
  Wire 1

Search Within:
Filters: Category: Evidence X 21 results found
Sort By: Item Type ▶

Marriage Certificate
Boone-Douglas – 12/13/2014

Marriage Certificate
Hunter-King - 05/06/2006

Marriage Certificate
Smith-Lincoln – 06/06/2001

Marriage Certificate
Dade-Whatcom – 07/09/1999

Marriage Certificate
Marshall-Bibb - 08/01/1995

Marriage Certificate
Pike-Wilcox – 07/09/1989

Marriage Certificate
Montgomery-Yavapai - 08/01/1986

Boone-Douglas Marriage
Date: On or About 6/12/2013  Description: Boone and Alexander marriage happened in Las Vegas, Nevada, at the Chapel on the Strip.

Check # 1701
Amount: $8559.00 - Cleared Date: 06/14/2013 - Memo: For our marriage services

State – Search Results

Search Results X

All Projects > Stevens, Russel > Evidence > Search "marriage"

Search Warrants
Objects
  Bank Item 1
  Bank Statement 1
  Bank Transaction 1
  ☑ Check 4
  Deposit 1
  EFT 1
  Evidence 8
  Investigation Report 2
  Wire 1
Properties
  OCR Text 2
  Physical Evidence 1
  Discoverable 4
  Grand Jury 4
  Giglio-Henthorn 1
Date
On or About ▶
MM/DD/YYY ▭
Amount ____ to ____

Search Within:

Filters: Category: Evidence x   Object: Check x

Check #9076
Amount: $135.99 : Cleared Date: 09/30/2016 Memo Catering at marriage

4 of 21 results showing

Sort By: Item Type ▶

Witness Interview Report: Blaine Cisco
Date: 04/22/2016 – Case Number: 65-2215473
"On June 28, 2014, Cisco wrote a check to GCR Investments for $650,000."
"One poker night, Russel showed Cisco a contract between GCR Investments and a company in China."

| Start Date | Between | ▼ | 08/03/2016 - 08/18/2016 | 🗓 | |
|---|---|---|---|---|---|
| | | 2016<br>Wed,<br>Aug 3<br>through<br>Thu,<br>Aug 18 | August ▼            2016 ▼<br>Sun Mon Tue Wed Thu Fri Sat<br>31   1   2  ③  4   5   6<br>7   8   9   10   11   12   13<br>14   15   16   17  ⑱  19   20<br>21   22   23   24   25   26   27<br>28   29   30<br>ADD TIME        CANCEL    OK | | |

FIG. 134

PLATFORM FOR INVESTIGATIVE ANALYSIS

CROSS-REFERENCE TO RELATED APPLICATIONS

The present application claims the benefit of U.S. Provisional Application No. 62/549,652 filed Aug. 24, 2017 entitled Platform For Investigative Analysis.

BACKGROUND OF THE INVENTION

The present invention relates to a platform suitable for investigative analysis, and suitable for being utilized in collecting, organization, visualizing, and sharing of data.

Individuals across a range of different endeavors, such as law enforcement, scientific research, historical research, insurance, and litigation, gather and organize a significant amount of data as part of their day-to-day activities. As part of their activities, the individuals are generally required to organize and present this collected data (such as presenting a case against a defendant or presenting results of experiments to colleagues) In an organized manner. Furthermore, as part of their activities, the individuals need to track the type of data that is obtained and the nature of the data. Unfortunately, it is burdensome to create a logical, time-oriented narrative based on the collected data, as the collected data is generally from numerous different sources, and generally in numerous different formats. Moreover, conventional tools are generally not suitable to facilitate creating such a narrative.

BRIEF DESCRIPTION OF THE DRAWINGS

FIG. 3 illustrates an architecture of a computing system.
FIG. 5 illustrates an exemplary project type with data types.
FIG. 6 illustrates exemplary datatypes.
FIG. 10 illustrates an action items area of the dashboard.
FIG. 15 illustrates a disconnected client architecture.
FIG. 19 illustrates an investigation data table.
FIG. 20 illustrates an investigation status data table.
FIG. 21 illustrates an investigation user data table.
FIG. 22 illustrates an action item data table.
FIG. 23 illustrates an investigation document data table.
FIG. 24 illustrates an evidence item table.
FIG. 25 illustrates a document production request data table.
FIG. 26 illustrates a fact table.
FIG. 27 illustrates a GPS tracking event period table.
FIG. 28 illustrates a GPS tracking event table.
FIG. 29 illustrates a mail cover table.
FIG. 30 illustrates a mail cover group table.
FIG. 31 illustrates a mail cover item table.
FIG. 32 illustrates a phone toll table.
FIG. 33 illustrates a phone toll detail table.
FIG. 34 illustrates a bank statement table.
FIG. 35 illustrates a bank transaction table.
FIG. 36 illustrates a bank transaction detail table.
FIG. 37 illustrates a bank item table.
FIG. 38 illustrates a check table.
FIG. 39 illustrates a violation table.
FIG. 40 illustrates a violation element table.
FIG. 41 illustrates an investigation summary report section title default table.
FIG. 42 illustrates an investigative summary report table.
FIG. 43 illustrates a create an investigation summary report subject table.
FIG. 44 illustrates an investigation summary report subject violations table.
FIG. 45 illustrates an investigation summary report subject violation elements table.
FIG. 46 illustrates an investigation summary report section title table.
FIG. 47 illustrates an investigation summary report section attachment table.
FIG. 48 illustrates an investigation report table.
FIG. 49 illustrates an investigation report paragraph table.
FIG. 50 illustrates a search warrant table.
FIG. 51 illustrates a search warrant plan table.
FIG. 52 illustrates a search warrant person table.
FIG. 53 illustrates a search warrant person role table.
FIG. 54 illustrates a search warrant area table.
FIG. 55 illustrates a search warrant item table.
FIG. 56 illustrates a search warrant box table.
FIG. 57 illustrates a search warrant property seized group table.
FIG. 58 illustrates an investigation entity table.
FIG. 59 illustrates a person table.
FIG. 60 illustrates a business table.
FIG. 61 illustrates an account table.
FIG. 62 illustrates an address table.
FIG. 63 illustrates a boat table.
FIG. 64 illustrates a plane table.
FIG. 65 illustrates a phone number table.
FIG. 66 illustrates a vehicle table.
FIG. 69 illustrates an initial appearance table.
FIG. 70 illustrates a charged entity initial appearance table.
FIG. 71 illustrates a demand appearance type table.
FIG. 72 illustrates an identity hearing table.
FIG. 73 illustrates a detention hearing table.
FIG. 74 illustrates a detention release type table.
FIG. 75 illustrates a court activity table.
FIG. 76 illustrates a testifying witness table.
FIG. 77 illustrates a court activity type table.
FIG. 78 illustrates a court venue table.
FIG. 79 illustrates a charge entity table.
FIG. 80 illustrates a court decision trial table.
FIG. 81 illustrates a charged entity violation table.
FIG. 82 illustrates a charged entity element table.
FIG. 83 illustrates a court activity attachment table.
FIG. 84 illustrates a court activity attachment type table.
FIG. 85 illustrates a court evidence table.

FIG. 86 illustrates a charging presentation table.
FIG. 87 illustrates a charging presentation to type table.
FIG. 88 illustrates a charged entity charging presentation table.
FIG. 89 illustrates an export table.
FIG. 90 illustrates an export reason table.
FIG. 91 illustrates an export header table.
FIG. 92 illustrates an export status table.
FIG. 93 illustrates an export method table.
FIG. 94 illustrates an export output type table.
FIG. 95 illustrates an export object table.
FIG. 96 illustrates an export header shared to link table.
FIG. 97 illustrates a plea offer table.
FIG. 98 illustrates a charged entity plea offer table.
FIG. 99 illustrates a plea offer resolution table.
FIG. 100 illustrates a motion table.
FIG. 101 illustrates motion stage type table.
FIG. 102 illustrates a motion type table.
FIG. 103 illustrates a motion ruling type table.
FIG. 104 illustrates a motion hearing table.
FIG. 105 illustrates a trial table.
FIG. 106 illustrates a charged entity trial table.
FIG. 107 illustrates a trial statement table.
FIG. 108 illustrates a trial jury table.
FIG. 109 illustrates a jury selection table.
FIG. 110 illustrates a trial jury questionnaire table.
FIG. 111 illustrates a trial jury questionnaire question table.
FIG. 112 illustrates a juror table.
FIG. 113 illustrates a juror questionnaire answer table.
FIG. 114 illustrates a juror reason to excuse table.
FIG. 115 illustrates a juror challenge table.
FIG. 116 illustrates a juror challenge type table.
FIG. 117 illustrates a juror challenge ruling table.
FIG. 118 illustrates a juror status table.
FIG. 119 illustrates a juror verdict table.
FIG. 120 illustrates jury question table.
FIG. 121 illustrates a trial objections table.
FIG. 122 illustrates a trial objection type table.
FIG. 123 illustrates a trial objection ruling table.
FIG. 124 illustrates a sentencing table.
FIG. 125 illustrates a charged entity sentencing table.
FIG. 126 illustrates a trial appeal table.
FIG. 127 illustrates a trial appeal type table.
FIG. 130 illustrates a search result.
FIG. 131 illustrates a search result with additional filters.
FIG. 134 illustrates fuzzy date ranges.

DETAILED DESCRIPTION OF PREFERRED EMBODIMENTS

Figure 1:
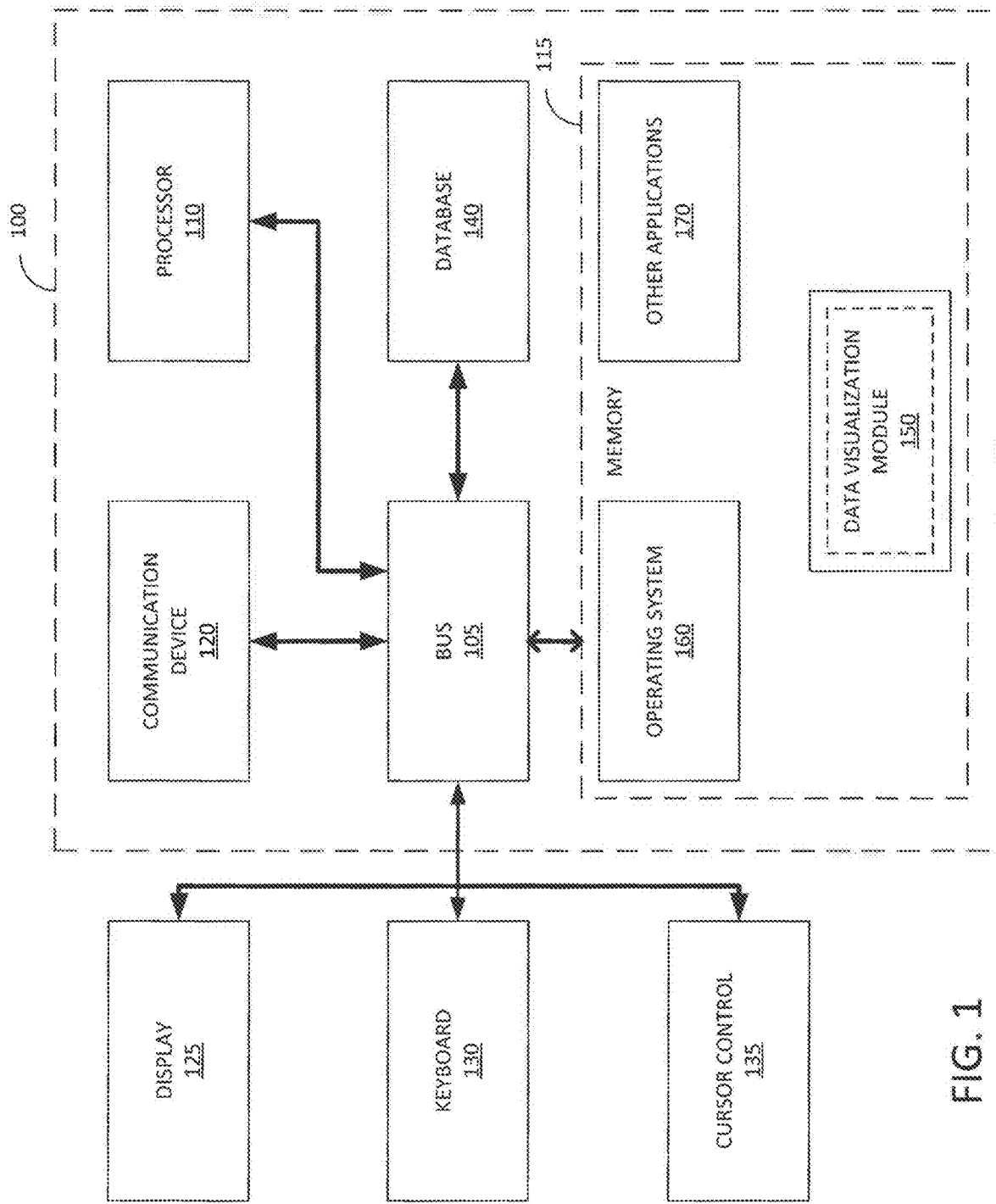
FIG. 1 illustrates a block diagram of a computing system.

FIG. 1 illustrates an exemplary block diagram of a system 100. As described in greater detail, the system 100 may be a client(s) and/or a server(s), as desired. The system 100 may include a bus 105 or other communications mechanism for communicating information between components of system 100. The system 100 may include a processor 110, operatively coupled to the bus 105, for processing information and executing instructions or operations. The processor 110 may be any type of general or specific purpose processor. The system 100 may also include a memory 115 for storing information and instructions to be executed by processor 110. The memory 115 may include any combination of random access memory (RAM), read only memory (ROM), static storage such as a magnetic or optical disk, or any other type of machine or computer-readable medium. The system 100 may include a communication device 120, such as a network interface, wireless interface, cellular interface, or other communications interface, to provide access to a network or otherwise another device. As a result, a user may interface with the system 100 directly, or remotely through a network or any other manner.

A computer-readable medium may be any available medium that may be accessed by the processor 110. The computer-readable medium may include both a volatile and a nonvolatile medium, a removable and non-removable medium, and a storage medium. The storage medium may include RAM, flash memory, ROM, erasable programmable read-only memory (EPROM), electrically erasable programmable read-only memory (EEPROM), registers, hard disk, a removable disk, a compact disk read-only memory (CD-ROM), or any other form of storage medium.

The processor 110 may be operatively coupled via the bus 105 to a display 125, such as a Liquid Crystal Display (LCD). The display 125 may display information to the user. A keyboard 130 and a cursor control device 135, such as a computer mouse, can also be operatively coupled to bus 105 to enable the user to interface with system 100.

The processor 110 may be operatively coupled via the bus 105 to one or more databases 140. The database 140 may store data in an integrated collection of logically-related records or files. The database 140 may be an operational database, an analytical database, a data warehouse, a distributed database, an end-user database, an external database, a navigational database, an in-memory database, a document-oriented database, a real-time database, a relational database, an object-oriented database, a NoSQL database, or any other database, or any combination thereof.

The memory 115 may store software modules that provide functionality when executed in combination with the processor 110. The modules can include a data visualization module 150. The data visualization module 150 may include a data visualization application that can collect, organize, synchronize, and display case data. The data visualization module 150 may comprise a plurality of modules that each provide specific individual functionality for collecting, organizing, synchronizing, entering, modifying, and displaying data.

The memory 115 may also store an operating system 160. The operating system 160 may provide operating system functionality for the system 100. The memory 115 may also store one or more additional applications 170 to include additional functionality for an overall system 100.

Figure 2:
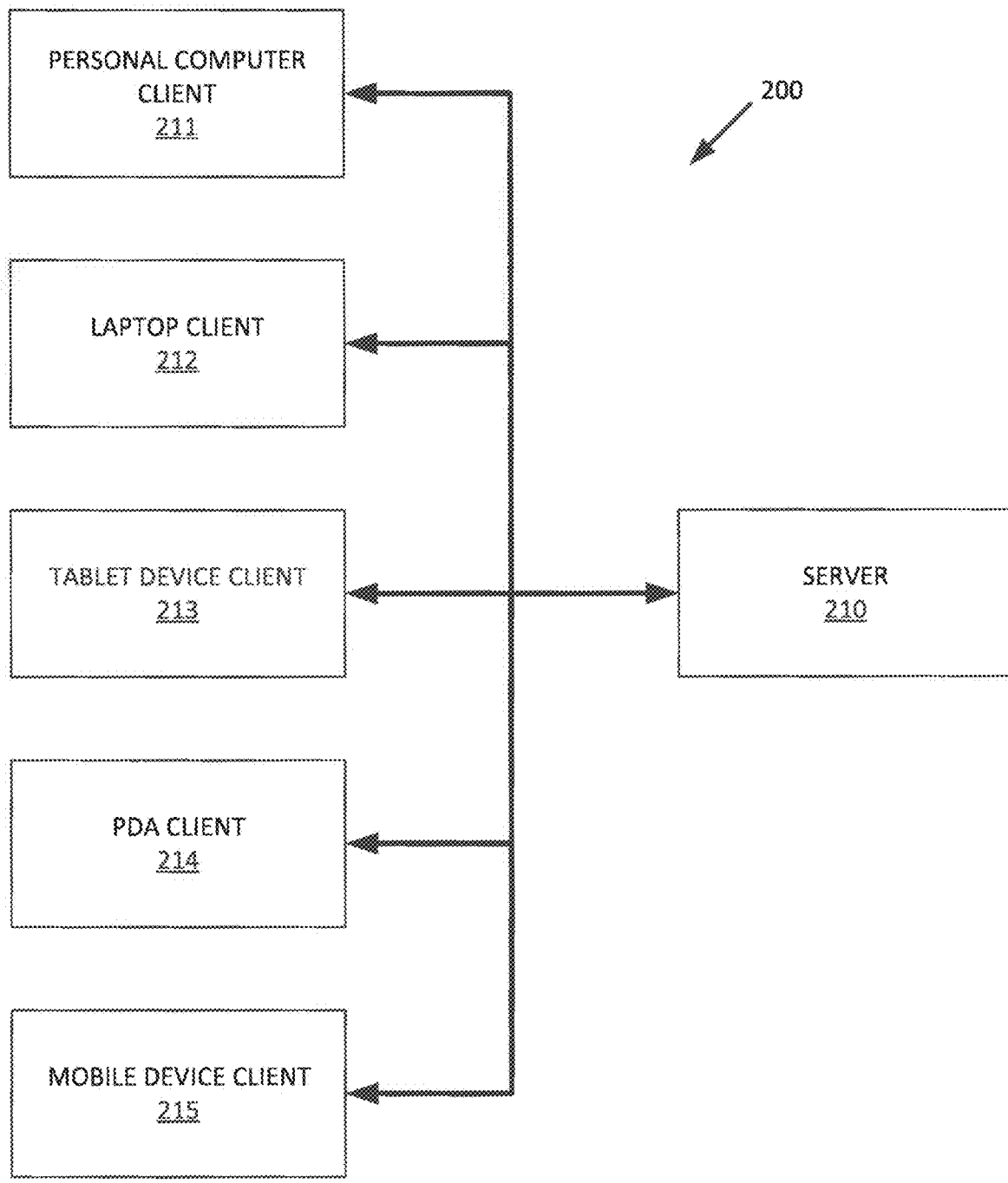
FIG. 2 illustrates another block diagram of a computing system.

FIG. 2 illustrates a block diagram of a system 200. The system 200 includes a server 210. The server 210 can be any computer system or software application that provides a service. The server 210 can be any type of server configured to synchronize or otherwise organize data. The server 210 can be the same as the system 100 of FIG. 1, if desired. In alternate embodiments, the server 210 can represent a distributed software-as-a-service (SaaS) that comprises a plurality of servers. The server 210 may utilize a data visualization module (such as data visualization module 150 of FIG. 1) to provide a data visualization application that may synchronize data.

The system 200 also includes one or more clients, such as a personal computer client 211, a laptop client 212, a tablet device client 213, a personal digital assistant (PDA) client 214, and a mobile device client 215, where a client can be any computer system or software application that accesses a service on a remote computer system, such as a personal computer, a laptop computer, a tablet computer, a PDA, and a mobile device. A client, such as the personal computer client 211, the laptop client 212, the tablet device client 213, the personal digital assistant (PDA) client 214, and the mobile device client 215, may be configured to collect, organize, and display data, each of which may be identical to the system of FIG. 1, if desired. The client can utilize a data visualization module (such as data visualization module 150 of FIG. 1) to provide a data visualization application that can collect, organize, and display data.

System Architecture

Figure 3:
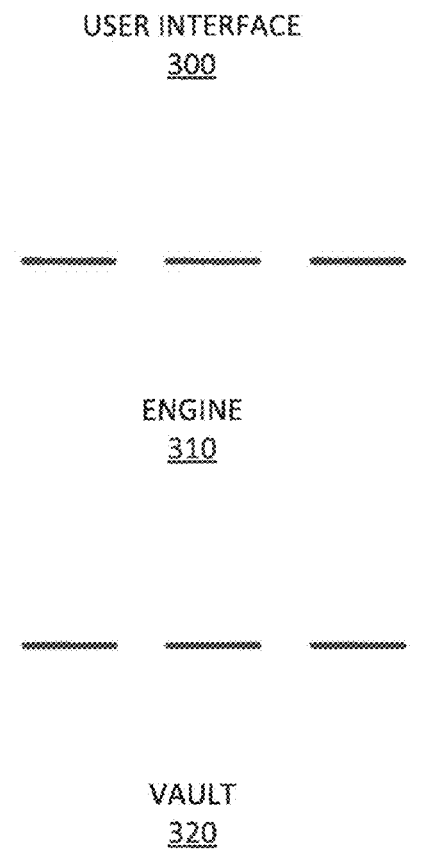

Referring to FIG. 3, the system may be implemented using a tiered object model. A user interface 300 tier may be included to provide a user interface to a user for viewing of the data, configuration of the data, modification of the data, etc. An engine 310 tier may be included to provide for data caching, object management, security, communication, etc. A vault 320 tier may be included to provide data storage, etc. A set of project types may be created and utilized to define the data models to manage user information, as well as user interface and processing elements to enable the system to perform user-initiated and automatically executed processes. By way of example, one of the processes may include data replication services that replicates data among devices that are detachable from a server so that when a device is attached to the server the data is replicated and the data is available when a device is not attached to the server.

Object Management

In the case of a server/client architecture, preferably, the server includes a windows service such as Windows Server®, and the clients include a windows service such as Microsoft Windows®. The Windows® service is especially suitable for providing data storage, management, security, auditing, and replication services. In the case that the system uses an object based model for the data, the data may be organized and stored using a "state chained property bag" model, in which an object is created which may contain one or more properties. Every "state" of a property's value is recorded in a state chain to facilitate replication, auditing, history, and unlimited "undo" capabilities. The state chain expressly or inherently tracks each of the objects as they are included, and their relationship to one or more other objects, in a temporal fashion so that they may likewise be removed in an orderly fashion.

The system may include objects that are project type data models that are defined as .NET assemblies, which may contain classes derived from base classes.

The system may include objects that are project type UI/workflow models that are defined as .NET assemblies, which may contain classes derived from base classes.

The system may include objects that are project types which may be the definition of the data schema, and workflow processing metadata.

Figure 4:
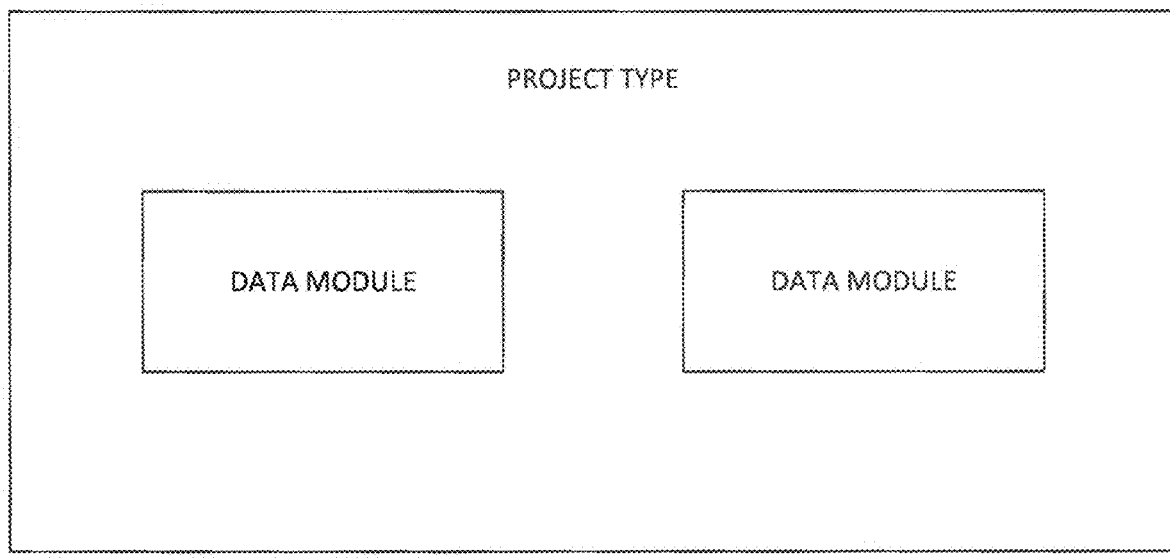
FIG. 4 illustrates a project type with multiple data modules.

Referring to FIG. 4, each project type may include one or more data module assemblies. The data module assemblies contain the definitions for the objects and their properties. An example of a project type with an object type "Child" defined with four properties, "WontEat", "FavoriteToy", "ItemKey", and "IsGrounded" with data types for each, is illustrated in FIG. 5. Furthermore, the properties of each of the objects may be modified by the system and/or the user to create customizable properties.

Each project type configuration may include one or more DLL's (dynamic link libraries) that include workflow definitions. The workflow definitions provide processing and user interface instructions and elements facilitating the system response to user interface and data events, and to prompt users for information, and to execute unattended processing workflows.

Object State Storage

The properties and an audit history of the objects may be stored in the form of selected datatypes. Referring to FIG. 6, exemplary datatypes are illustrated. Fewer and/or additional datatypes may be included, as desired.

So that the system is suitable for "on-line" use when a device is interconnected to a server, and is suitable for "off-line" use when a device is not interconnected to a server, it is desirable to assign unique identification numbers to the documents and other items. The unique identification may be achieved in any suitable manner, and preferably using a unique sequential identification number for the documents.

One technique to support the unique identification numbers may be as follows. In the project type data model, an object may be defined as an ItemKeyCollection. Once this designation is made, this causes the system to create and maintain a sequential numbering scheme for child objects of the designated "collection" object. When an object is defined as an ItemKeyCollection, the configurator may provide an ItemKeyPrefix (alphanumeric data prepended to the sequential number), an ItemKeySuffix (alphanumeric data appended to the sequential number), an ItemKeyNumberOfDigits (setting to define the zero-padded length of the sequential number), an ItemKeyAllowTemporaryItemKey (property to define if the system is allowed to assign an ItemKey when the Node operating the ProjectMaster role is not accessible (as when the user is operating in a disconnected state)), an Item KeyTemporaryPrefix (alphanumeric data prepended to the Temporary sequential number), and Item KeyTemporarySufffix (alphanumeric data appended to the Temporary sequential number). These properties may (or may not) be visible to the end-user, and may allow modification by the end-user.

Any object property may then be defined as an "ItemKeyProperty". This indicates to the system that an automatically generated value should be created for this property. The generation of the value may occur as one of two different methods depending on connectivity.

When the object is committed to the vault, the "ItemKeyProperty" is detected, and if a connection may be made to the platform node that is operating the ProjectMaster role, that node will create the unique value and this value will be saved as the new state for the Property. If the ItemKeyGenerator node cannot be reached, a "Temporary" ItemKey may be generated by the local system node. This will be replaced with a permanent value when replication completes with the ProjectMaster node.

One of the objects allows configurators to readily generate, present, and operate on aggregations of values stored as properties of object. Different aggregation techniques may be included, such as sum, median, mode, min, max, average, etc.

Object Security and Auditing

For some applications, and in particular for criminal investigations, it is desirable to have object security and auditing of changes made to the data. One of the inherent capabilities of the system is the maintenance of an audit trail of all actions performed on objects. Since object property values are stored as a "State Chain", with beginning and ending timestamps, every historical value for any given property may be retrieved from the data store. In addition to the begin and ending timestamps, a UnitOfWork identifier is included for a UnitOfWork that created the new property state. This facilitates a specific property state to be traced back to the time, workstation, and user that created the new property state.

Object deletion may be handled in a similar fashion—objects are not actually deleted from the data store (under normal operations). A "deletion" of an object is recorded as a new ObjectState for the object in which the state is "Deleted". This allows the same audit trail as described above for object properties.

Object security may be implemented with an AccessControlList (ACL) assigned to each object. This ACL contains Access Control Entries (ACEs) that define the roles that are allowed certain operations (read, write, etc.). Objects inherit ACEs from their parent objects (through Lists, etc.), with the resulting ACEs controlling visibility, modifiability, and delectability of an object or its properties.

Physical Data Store

In addition to object security and auditing, the physical data store should persist in a secure manner. The system may include within the data store persistent user and configuration data, and is preferably agnostic of any particular database technology used for a particular implementation.

With the system being agnostic of the particular database being used in conjunction therewith, the database may be selected for the particular implementation. Exemplary databases include relational, graph, document, etc. Moreover, with multiple servers and/or clients, they may include different databases which may be especially suitable for devices with different capabilities.

Objects may have properties that may be assigned values. These values may be "active" from a specific point in time to another point in time. This provides the concept of a "State Chain" for the property value. A data modification is recorded as an end to the previous property state, and the creation of another. This gives the system the ability to retrieve data at any point in time across any (or all) projects. Detecting data change, auditing user actions, unlimited "undo" capabilities may all be supported by the property based state storage architecture. In this manner, especially suitable for a criminal investigation, the user may determine what the state of the investigation was at any point in time or during a particular time frame, so that relevant data may be ascertained at a particular time or range of times.

Binary Object Store

Binary objects (BLOBs) may be stored, for example, in one of two mechanisms using the system, (1) as an array of bytes, or (2) as a .net stream. The .net stream mechanism provides stream mechanisms for seeking, reading, random positioning, etc. Internally, the data store stores stream data as a set of zero or more "Stream Fragments" of a configurable size. This configuration is flexible, and may vary from object to object, project to project, or node to node. The optimal fragment size will generally be a function of the underlying database technology in use.

Providing a .net stream API enables access for developers utilizing binary data (rendering video or audio, displaying documents or graphics, etc.). The array of bytes mechanism stores data as a single object node in the underlying data store, and is appropriate for smaller BLOB data where seeking and random reading is not necessary.

The system may store an ordered list of objects as the value of an object property. A list's state may be the set of "Member" objects. The membership in a list may be stored in a similar fashion to other property values in that they are stored with timestamp, and UOW information. Adding an object to a list creates a relationship between the "owner" and "member" objects. Removing the member is recorded by ending the membership state. The physical implementation of this may be dependent on the database technology being used. For example, when utilizing a graph database technology, list membership may be implemented as graph edges.

Every data modification may be recorded as a Unit of Work (UOW), and replicated to the node that is performing the "Project Master" role. These changes are then replicated to other nodes as they are each connected. The data replication is scoped to an entire project.

Each installation of the system is considered a "Node" in the replication/installation topography. Nodes perform various functions (Node Roles) for each project, depending on the node's intended use, replication topology choices, security decisions, and/or user/enterprise choice. It is noted that the nodes roles are preferably per project—not global. Therefore, a user workstation node may be the "Project Master" for several projects, while a "Project Member" role for several others. Preferably, there is always one, and only one node operating the "Project Master" role for a given enterprise, user, and/or project.

The replication may occur between two nodes. Each node may initiate a replication session with the nodes acting as the "Project Master" for each project contained on the node. Generally, this will provide the mechanism for an occasionally-connected client to "upload" data changes to the project master node, and "download" changes from the project master, thereby achieving an eventual-consistency model.

The replication process sends changes between nodes by using the recorded unit of work information that reflects all changes made to project data. Each unit of work is replicated, and applied in an atomic operation to ensure data consistency.

Each node that contains a replica copy of a project may optionally provide data change notifications to a connected client application. This permits changes received via replication to be presented by the UI via the system notifying the UI that a change to an object and/or property has occurred.

Communications

The system may include protocols for wired and wireless communications to ensure secure communications. For example, communications between the client and the server, and between server instances may be performed over an encrypted communications channel, such as a transport layer security or similar technique. The encrypted channel prevents "man in the middle" and other types of security risks to the data.

The system may include a flexible object querying model that may be used within project type configurations, and from client applications.

A data management API, providing the ability to export and import data into a project may be used. This permits data to be exported/imported to/from a variety of data formats, including, but not limited to, XML, JSON, CSV, etc. Particular export formats (such as EDRM in the legal e-discovery area) may be implemented as workflows within the specific project type. This allows the configurator to tailor exports to specific standards.

Depending on the deployment models being utilized, backup and data management tasks may be included. By way of example, for standard "Windows®" backup utilities may be sufficient to protect from data loss.

Workflows

A workflow's functionality may be provided using a "Wizard" functionality accessed and graphically implemented using the user interface to execute "background" or "Server-side" operations on data. Workflows may be implemented using one or more "steps"—these may be UI-based, or Processing-based steps. For example, the movement of one 'icon' to overlap with another 'icon' may result in generating a connection between the two icons, so that a relationship is made between the data. This provides an intuitive manner of a user tracking the interrelationships between the data, which is especially useful for criminal investigations as bits of evidence are obtained or developed.

By way of example, a user drags an object of type "person" (object types are defined in the project type data model) onto another object—this one of type "business". The project type has defined that in the case of a "person" connected to a "business", an intermediary object ("employee title") is required. The project type configuration would be written as to initiate a workflow to collect data elements required by the "employee title" object, and to complete the linking operation. This is an example of a "UI Workflow"—a workflow that involves prompting the user for interaction in real-time.

By way of example, a user drags a group of 100 PDF documents into the client workspace, intending that they be imported. The application then prompts the user to confirm the import operation. The application then initiates "queued" workflows to perform the import operation, any OCR or other data management operations in the background. This is an example of a "Server-side", or "background" workflow.

"UI" Workflow steps involve the user in an interactive way—this may be as a notification, or as a multi-step "Wizard" style interface. These are defined in the project type UI workflow DLL.

"Processing" workflow steps provide a mechanism for the system to perform work on a user's behalf, or to perform "system" tasks as necessary for the operation of the system. Processing workflows may be initiated by user actions (importing a document, for example), or by timed or interval-based schedules for system tasks.

As workflows are executed, information about their processing state is recorded in the system. The state information includes all data necessary to continue processing if it becomes interrupted, as well as providing an audit trail of workflow steps. This data is retained in the related project scope.

Workflows may be "Queued" by the user to allow a long-running operation to continue without interrupting or requiring the user's attention. The user interface provides a way to monitor "queued" workflows, and for users and administrators to interact with them.

Processing workflows may often require hours (or perhaps days) of processing time. The system may include a distributed workflow processing architecture to allow a single workflow to be executed on multiple nodes, thereby processing the work in parallel.

An application programming interface allows external access to data stored in the system, as well as facilitating data import/export, reporting, and other integration tasks.

Client Design

The client application may be a metadata-driven user interface. The client application may include user interface "building blocks" that may be used by different project type configurations, as desired, for the type of data being managed. The meta-data may be included in any suitable model, including project type data models and user interface workflow models.

Preferably, any user action that results in the change to any project data is "saved" automatically and does not require the user to click on a "Save" icon, button, or similar element. This enables an "always saved" working environment for the user and decreases the likelihood of changes being lost due to user or system failures. This assists in ensuring that data is not lost, which is especially useful for criminal investigations.

The system may include cache and heap management components to provide a transparent layer that provides data caching, change management, unit of work generation, and the ability for the user interface applications to determine when changes are committed to the project or otherwise abandoned. When a client application informs the caching and heap management layer that pending changes should be committed, this bundles the changes into a single unit of work, and commits these changes to the server. The server will harden these changes to the underlying data store to ensure no data loss occurs.

User Interface

The user interface may include objects displayed thereon. The objects may show the interconnections between the different objects to show their interrelationships. Further, the nature of the interrelationships may also be illustrated on the user interface. This permits the user to identify the nature of the data and its interrelationships in a graphical intuitive manner, and facilitate identification of those relationships that have yet to be established.

The user interface may be based upon the concept of "panels" of information, which may be docked, torn off, and positioned on secondary monitors, hidden, or otherwise re-arranged. In this manner, the interface may be customized to the user's preferences.

Figure 7:
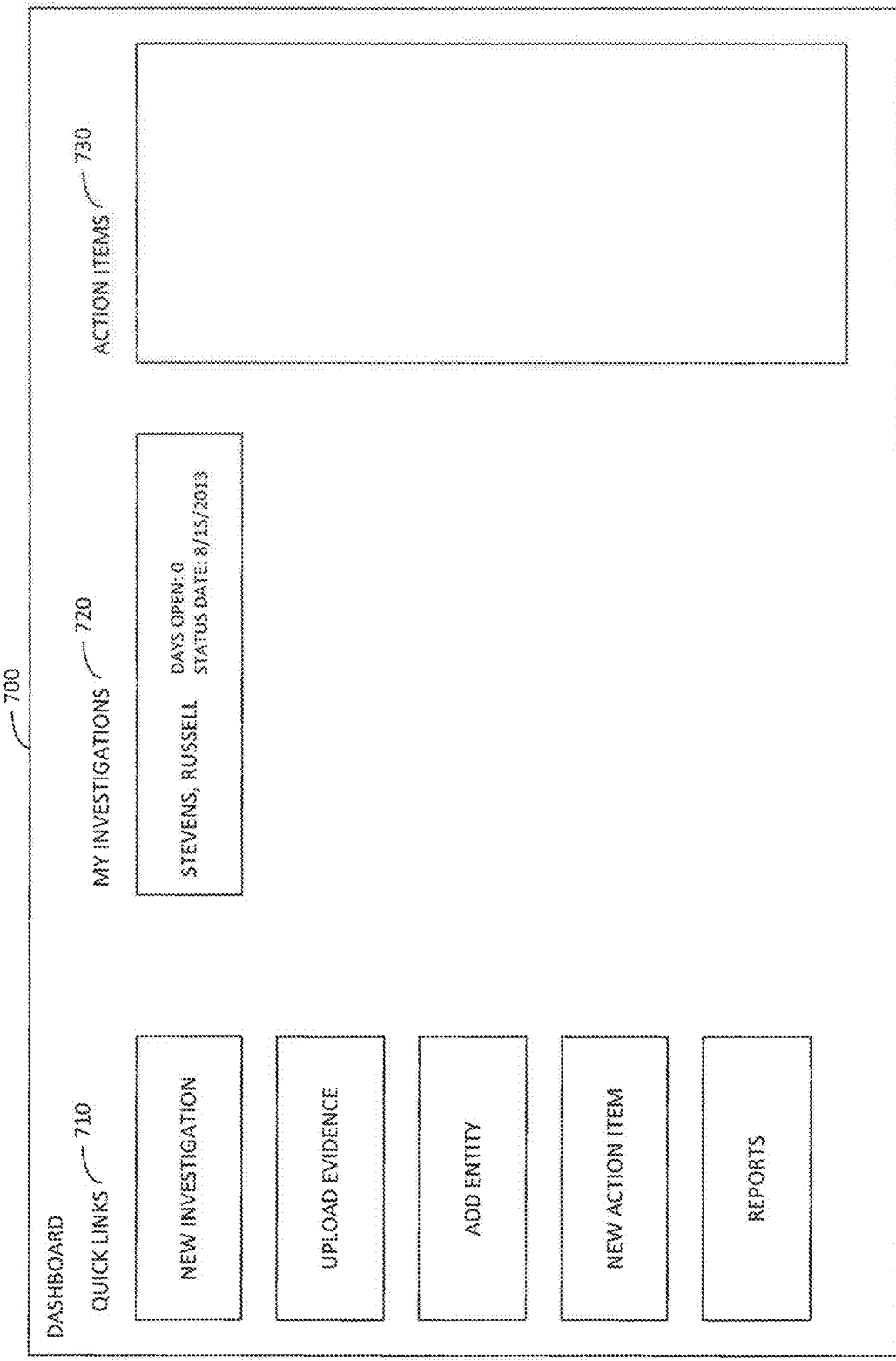
FIG. 7 illustrates a dashboard.

Referring to FIG. 7, by way of example, after logging in, the user may be presented with their personalized dashboard 700. The dashboard 700 may include a quick links 710 section, a my investigations 720 section, and an action items 730 section. In addition, customized widgets may be added to the dashboard 700, either through integration with other products or customized widgets.

Figure 8:
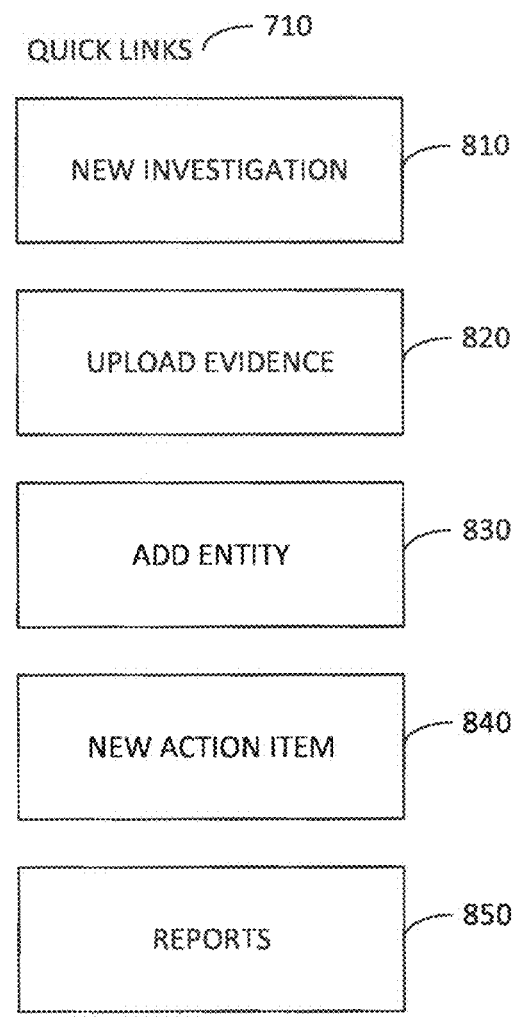
FIG. 8 illustrates a quick links area of the dashboard.

Referring to FIG. 8, the quick links 710 section may include a set of default widgets, one or more of which may be removed, re-ordered, or supplemented with additional widgets. By way of example, the widgets may include a "New Investigation" 810 which initiates a new investigation, an "Upload Evidence" 820 which uploads evidence to an existing investigation, an "Add Entity" 830 which adds a new entity to an existing investigation, a "New Action Item" 840 which adds a new action item to an existing investigation, and a "Reports" 850 which selects one or more of available reports from the investigation.

Figure 9:
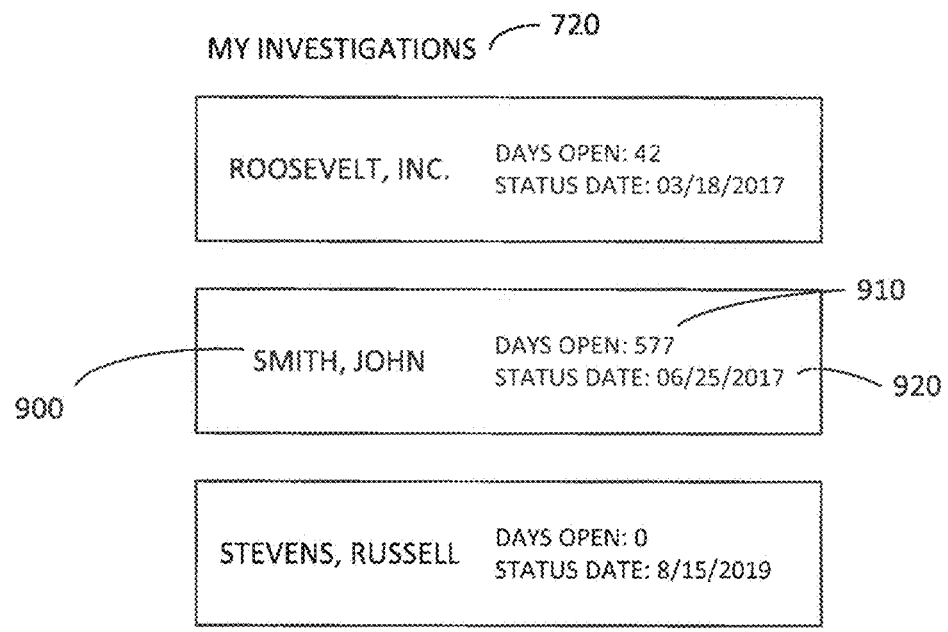
FIG. 9 illustrates a my projects area of the dashboard.

Referring to FIG. 9, the my investigations 720 section may include a list of projects for the user. By way of example, the projects may include an identifying name 900 for the project, the number of days that the project has been open 910, and the statute date indicating a deadline by which the project should be completed 920, typically indicative of a statute of limitations for a criminal event. Further, the other information being presented may be customized by the Project Type configuration.

Referring to FIG. 10, the action items 730 section may be used to create tasks 1000 that the user may then link to other items within the application. Action items 730 may have the following functional abilities: the user may apply tags to an Action item, assign a priority level 1020, define the full description of an action item 1030, set an optional due date 1040, store who created an action item, assign an action item to a user, view outstanding action items from all projects on the dashboard, mark action items as complete 1010, define when an action item is completed, define the percentage complete for an action item, link an action item to one or more other action items, and delete an action item 1050. The user may also create a link to one or more other users. In addition, the user may select and/or highlight OCR text and be presented with a list of commands which may act upon the selected and/or highlighted text. The user may highlight the text, create an action item, create a fact, and create an entity. The commands may use the selected text to perform the selected action.

File Viewer

Figures 11, 12:
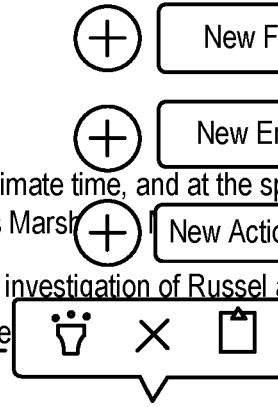
FIG. 11 illustrates a file viewer.
FIG. 12 illustrates database matches.

Using a file viewed, the user sees defined uploaded files within the system. The user may also view PDF files, images, multimedia files, Word files, Excel® files, etc. From within the file viewer, the user may listen to audio files and may listen and view video files, in addition to viewing the other types of files. Referring to FIG. 11, the user may also highlight and select text from within the PDF Files or other types of files inclusive of multimedia files. This selected text may be used by the application to create action items and other defined project data models. Also, all or a portion of audio file and video files and other multimedia files may be selected to create action items and other defined project data models. The user may select areas within a PDF page, or other file, and create a new child document, or other file, of the selected area. The user may select areas or portions thereof and create annotations. These annotations may be linked to project objects.

Referring to FIG. 12, potential database matches are dotted-underlined for users to easily click on them and confirm the database match.

System Canvas

Figure 13:
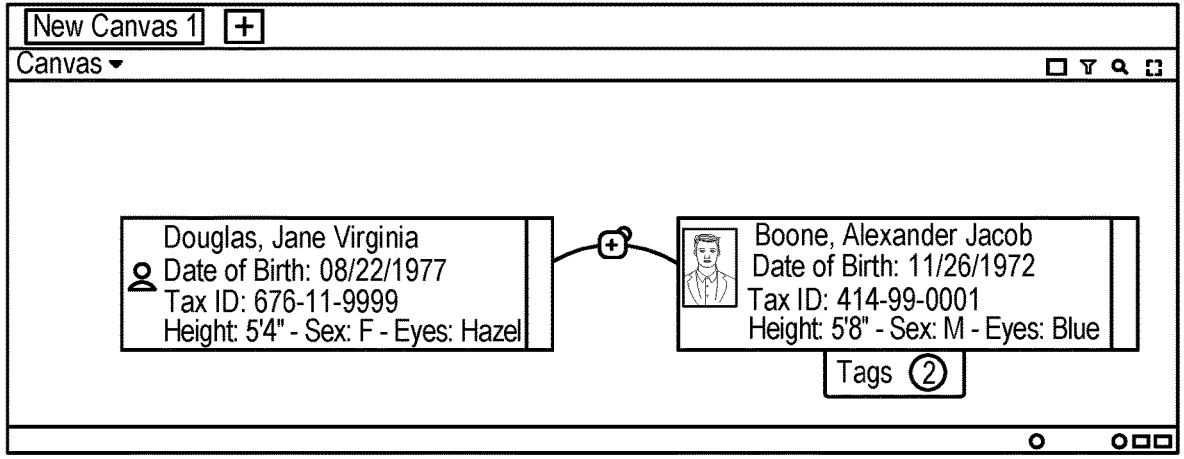
FIG. 13 a canvas with linked cards.

Referring to FIG. 13, the user may drag objects from choosers the canvas. The user may move and reposition objects on the canvas. The user may select multiple objects on the canvas at the same time. The user may remove an object(s) from the canvas. The user may link allowed objects by dragging an object(s) on top of another objects(s). The system may show links (relationship) between objects with a line between them. The user may link allowed object(s) to the relationship between objects. The user may reset the canvas to a "logical" default view of the objects on the canvas. The user may zoom in and out of the canvas.

The selected Object(s) in the canvas may be linked to the properties pane, so the user may define the properties of the selected object(s). Objects on the canvas will also be displayed in the table pane.

Figure 14:
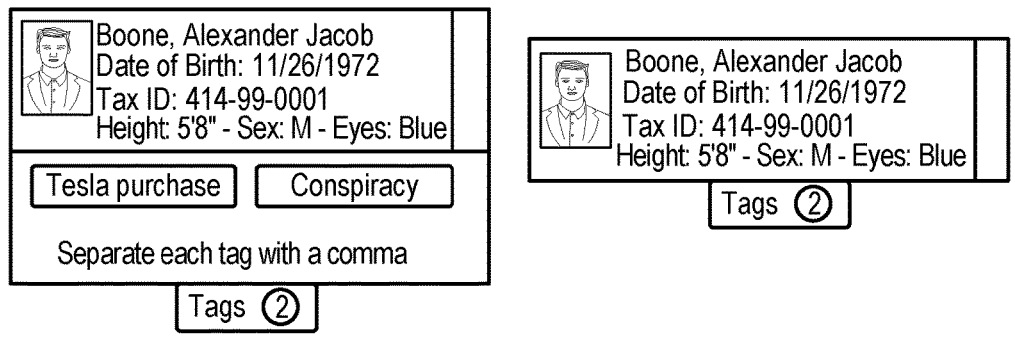
FIG. 14 illustrates canvas cards with tag drawers open and closed.

Referring also to FIG. 14, objects on the canvas may be displayed via a canvas card. A canvas card may have one or more fields displayed from the properties of the object. The canvas card may display a title line and an icon or image. Each object may have a default card defined with the properties to display in the card. The system may allow a user to define the layout of a canvas card so that a user may create a visual object that contains object properties to be viewed in the canvas.

The system may allow a user to save a workspace which may contain one or more canvases so that a user may store the current canvas views for later use. The user may select from a list of saved canvas views so that a user may work with that saved workspace. The user may create a new canvas and/or workspace.

The user may either have a canvas set as private or share a canvas with one or more users that have access to the project. The user may set the permissions (Read Only or Read-Write) to the user(s) of a shared canvas.

The user may print the entire canvas or a selected area of the canvas to a printer. The user may export the entire canvas or a selected area of the canvas to an external file.

Table

The user may manage objects and their properties in a table panel. The user may edit, sort, filter, and group objects in the table. The user may print or export the objects and properties displayed in the table. The user may select one or more objects in the table. The selected object(s) in the table are linked to the properties pane, so the user may define the properties of the selected object(s). The user may select an object(s) and drop objects onto the table. The canvas and the table may display the same objects. The user may remove objects from the table. The table may display objects as a hierarchical tree of tables.

There may be a suitable set of datatypes for the user interface. For example, the datatypes may include base data types, list data types, object data types, stream data types, FuzzyDate data types, money data types, DocumentKey data types, and summarization object data types.

For example, the user may select Objects with like kinds of defined properties (e.g. Integer, Long, Double, Money, FuzzyDate) and put them into a Summary Object. This Summary Object will be capable of providing to the user the following information about the Objects selected: Count (total number of selected Objects), Average (the average value of the selected Objects), Minimum (the minimum value of the selected Objects), Maximum (the maximum value of the selected Objects), and Sum Total (the total sum of the selected Objects).

For example, the end user may define a query for Objects with like kinds of defined properties (e.g. Integer, Long, Double, money, FuzzyDate) and put them into a Summary Object. This Summary Object is able to provide the user with the following information about the objects selected: Count (total number of selected Objects), Average (the average value of the selected Objects), Minimum (the minimum value of the selected Objects), Maximum (the maximum value of the selected Objects), and Sum Total (the total sum of the selected Objects).

Documents and other information may be digitally uploaded or otherwise digitally scanned into the system.

Also, real time information such as security cameras, process monitoring equipment, etc., may be directly imported into the system.

Deployment Architectures

The system components may be deployed in a variety of different architectures depending on system requirements, security requirements, and preferences.

Figure 17:
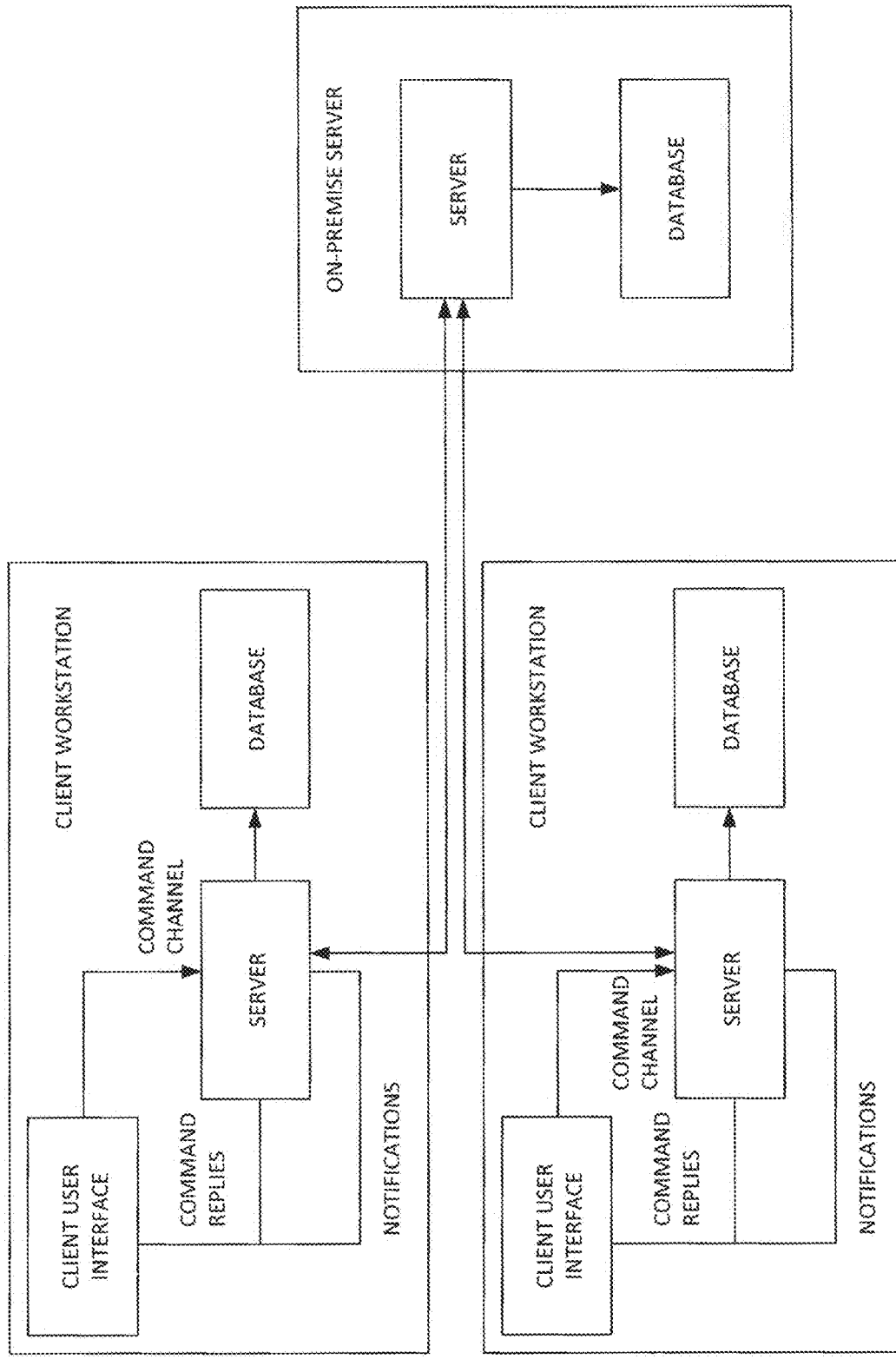
FIG. 17 illustrates a client plus on premise enterprise architecture.
Figure 18:
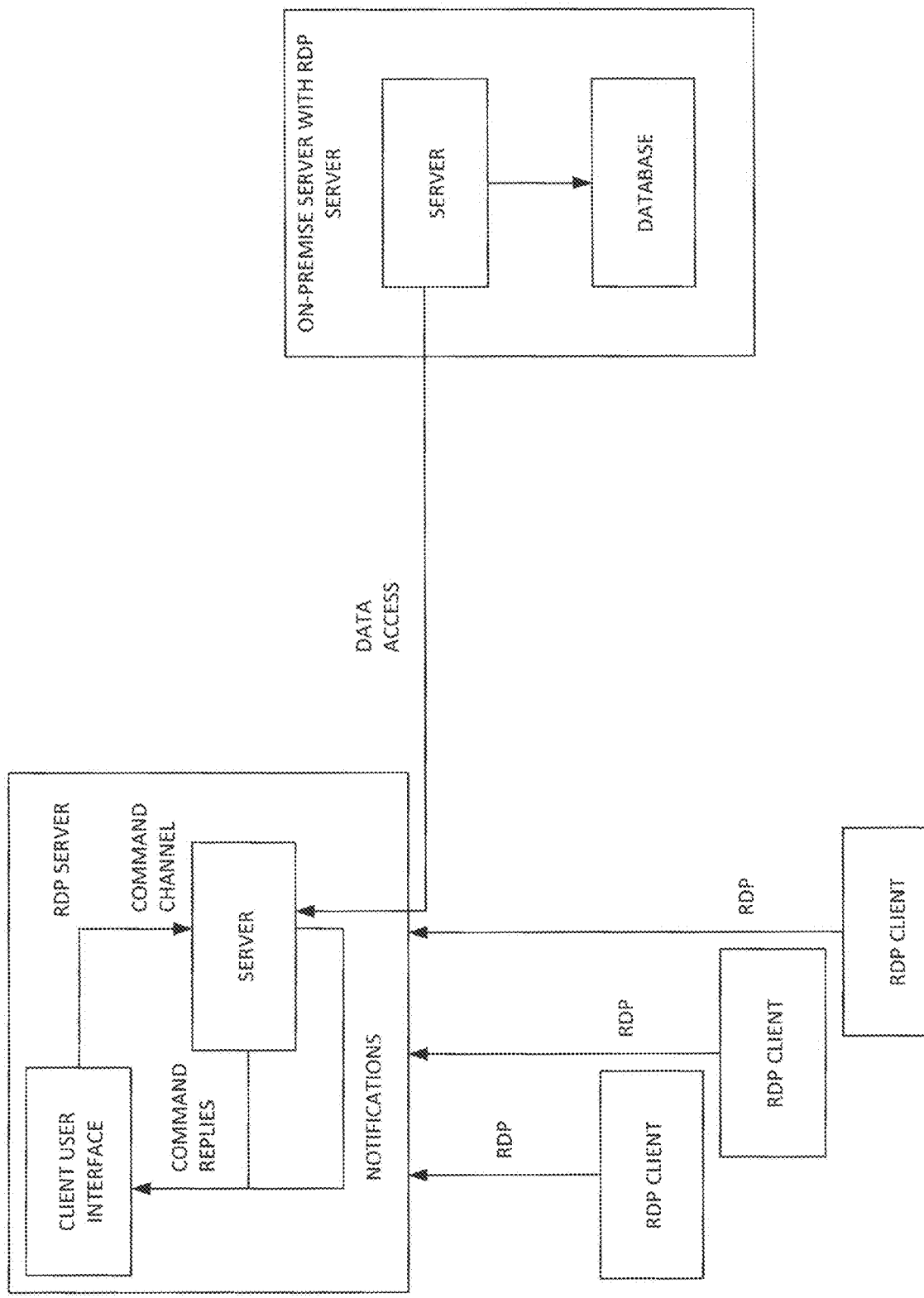
FIG. 18 illustrates a thin client on premise enterprise architecture.

The four primary architectures may include a "Disconnected Client" (see FIG. 15), a "Client Plus Cloud" (see FIG. 16), a "Client Plus On-Premise Enterprise" (see FIG. 17), and a "Thin Client On-Premise Enterprise" (see FIG. 18).

Referring to FIG. 15, in the Disconnected Client model, all components of the system are installed on the user's workstation, and there is no network connectivity to other Nodes. This is, in essence, a single-node Enterprise. The single Node operates as the Project Master role for all data. If a customer installs multiple "Disconnected Client" installations, each is independent with no data sharing between the nodes. In this deployment model, data is stored locally on each workstation Node. This ensures a maximum amount of data security, which is especially useful for sensitive criminal investigations.

Figure 16:
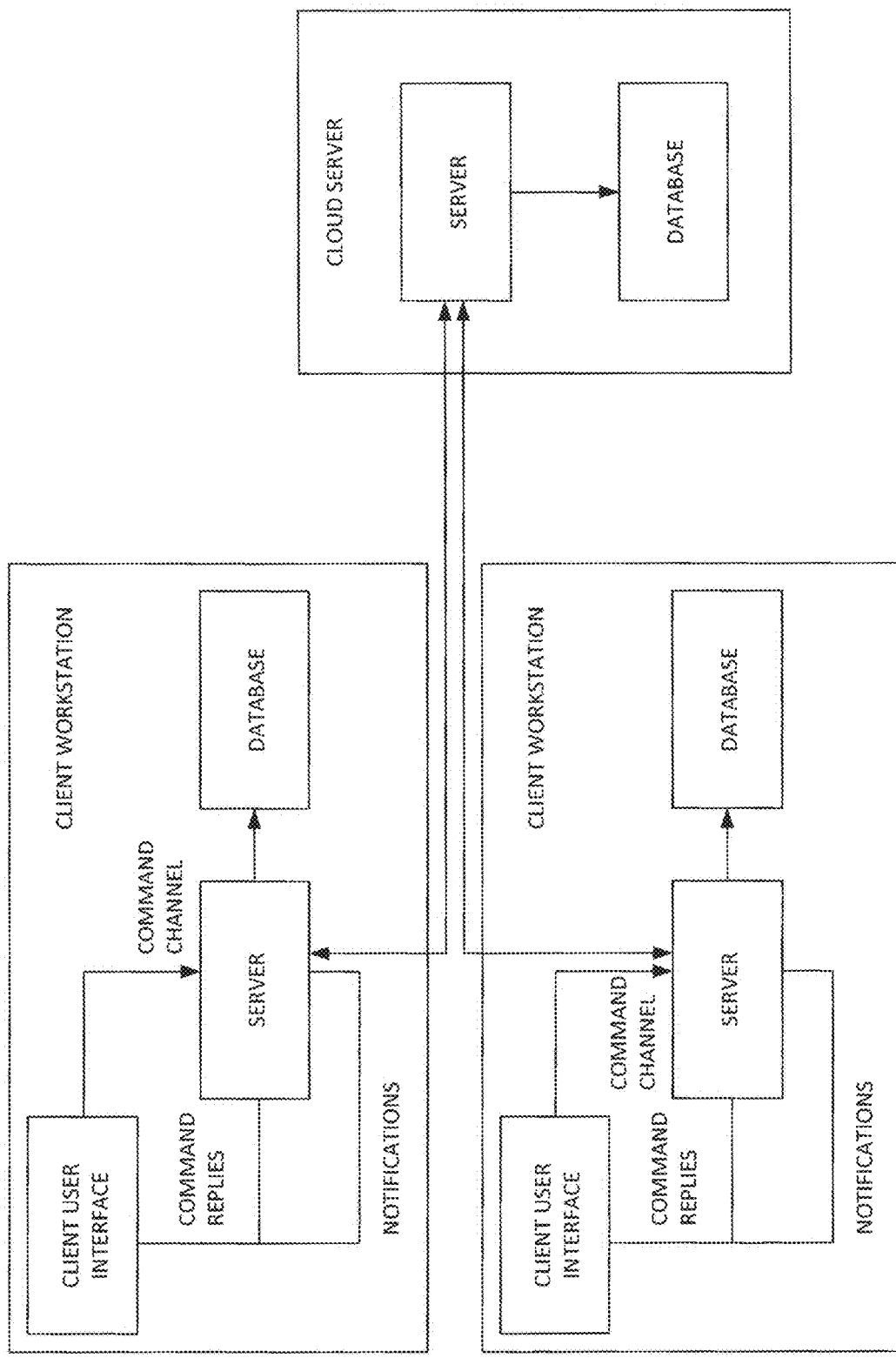
FIG. 16 illustrates a client plus cloud architecture.

Referring to FIG. 16, in the "Client Plus Cloud" deployment model, a hosted, cloud-based Enterprise Master is installed and provided as a SAAS to the client. This hosted Node serves as the Project Master node for the Enterprise, hosting the "master" copy of all Enterprise-wide data (project types, projects, users, etc.) The system is then installed on each user's workstations, and made a part of the Enterprise with a Node enrollment process. This establishes that this new Node is a part of the Hosted Enterprise, and replica copies of relevant Projects are replicated to the new Node. This provides increased flexibility when multiple users are accessing a project or otherwise working remotely on multiple devices.

Referring to FIG. 17, the "Client Plus On-Premise Enterprise" is functionally identical to the Client Plus Cloud model, with the exception that the "Server" is hosted in the customer's own datacenter. This provides additional data security and independence to the users.

Referring to FIG. 18, the "Thin Client On-Premise Enterprise" Model provides a deployment model for users who require no data be housed on user's local workstations. This is generally done for data security reasons. In this model, the system is installed on a RDP server, hosted within the customer's datacenter, and users access the application(s) through standard Remote Desktop protocols, likely already in-place at the users site. In this deployment model, all data is housed within the customer's data center, and nothing is stored or installed on users' workstations.

Criminal Investigation Process

The aforementioned structures and architectures are especially suitable for being used in conjunction with a criminal investigation to manage, organize, and process information. By way of example, the criminal process for the federal system will be used as an example. Each state has its own court system and set of rules for handling criminal cases, and varies from the federal system in several ways. A few examples of differences between the state and federal criminal processes are as follows.

Titles of people involved. State cases are brought by prosecutors or district attorneys while federal cases are brought by United States Attorneys. State court trial judges have a range of titles, but federal judges are always called district court judges. Federal magistrate judges are used in federal cases to hear initial matters (such as pre-trial motions), but they do not generally decide cases. The use of grand juries to charge defendants is not required by all states, but it is a requirement in federal felony cases unless the defendant waives the grand jury indictment. States and the federal government have laws making certain acts illegal, and each jurisdiction is responsible for setting punishments for committing those crimes. A state may punish a certain crime more harshly than the federal government (or vice versa), but a defendant can be charged and convicted under both systems.

A non-exhaustive list of the fundamental steps involved in a case are listed below.

(1) Investigation
(2) Charging
(3) Initial Hearing/Arraignment
(4) Discovery
(5) Plea Bargaining
(6) Preliminary Hearing
(7) Pre-Trial Motions
(8) Trial
(9) Post-Trial Motions
(10) Sentencing
(11) Appeal An investigator using the system ("user") typically begins a criminal investigation after receiving information or an allegation from one of many possible sources, including the general public, an informant, or another law enforcement agency. If the user deems the information suitable for additional review, they may initiate an Investigation in the system.

Investigation Opening Date

Referring to FIG. 19, for an investigation table 1900 for the database, the user will enter the Investigation opened date 1910 for their agency. For investigations worked in cooperation with other agencies, the user may enter the date that the investigation was previously opened by another agency for this value. In this manner, the system includes a date related to the start of the investigation rather than the start of the investigation for a particular agency. The date is a fuzzy date. The investigation table may also include the data the investigation was created 1920 in the database, which may be different than the opened date 1910. The software will track how long the investigation has been open based on a days open 1930 entry that is based on the opened date 1910. The investigation table 1900 may also include whether the investigation is open or closed based upon a closed 1940 entry.

Investigation Status

Referring to FIG. 20, for an investigation status table 2000 the user may define the investigation status type 2010 for an investigation such as Investigation Initiated, Indicted, Guilty Plea, etc., from a predefined list set by the agency/company, or a type entered by the user. For each of the types of investigations defined by the investigation status type 2010, a corresponding start date 2020 and end data 2030 may be defined. For example, when a new status type is selected the start date 2020 may be automatically entered to be the current start date. For example, when another status type is selected the end date 2030 for the previous investigation status type 2010 may be entered as the current date.

In this manner, the current date may be automatically used for the end date 2030 of the previous type and be automatically used for the start date 2020 of the new type. The start date and end date for each type of the investigations may be used to ensure that each portion of the investigation is resolved in a timely manner.

Investigation Name

The user may enter an investigation name in a description 1950 field which is a short description for semantic meaning, such as the subject's name or operation name. The user may set an investigation type 1960 such as investment fraud, money laundering, murder, etc. The investigation type 1960 may further be used to add, subtract, or populate additional properties of one or more tables. The user may select a set of users for a particular investigation 1990 (or set of related investigation case numbers) and the investigation statuses 1995 with the particular investigation (or set of related investigation case numbers).

Sync Data Offline

In one embodiment, referring to FIG. 21, based upon an investigation user table 2100 the user can define sync data file offline 2110, which if selected permits the data from a server to be provided to a user's local machine for subsequent use and modifications. If not selected, principally for security reasons, the data is not permitted to be provided to a user's local machine for offline usage. In a similar manner, based upon the investigation user table 2100 the user can define synch files offline 2120, which if selected permits the files from a server to be provided to a user's local machine for subsequent use and modifications. Further the investigation user table 2100 may include an active 2130 selection which selects whether other investigators are permitted to simultaneously work on the same investigation, which is especially important for highly sensitive criminal investigations.

The agency may define a user's role for investigations 2140, such as an investigator or supervisor, together with the permissions for the data by the user 2150, such as read-only access, or read-write access or read-only on server access. For example, a supervisor may have read-only-local-access to a particular investigation.

The user may link their agency case number(s) 1970 that are related to the Investigation. Investigations may have one or more cases/subjects, which may be linked together for identification and reporting purposes.

A user can define the user role 2140. If the user A is working a case with another user B then a user A can define user B a user role to allow access to another user to access the investigation. The user can define the user's permissions such as read only and the ability to view different sections of the investigation.

The user will define a unique key prefix 1980 that will identify each digital image and document with the unique prefix within the system. The system may verify that the prefix is indeed unique within the system, and if not, require the user to select another prefix. The unique key prefix permits the organization and separation of work among multiple simultaneous investigations.

The user will define the investigation closed 1940. The definition of closed may vary based upon the particular agency, and associated archiving and rules applicable to a particular agency may be used to process the investigation data as a result.

The user will define when an investigation is a grand jury investigation 1985. The grand jury's power, although expansive, is limited by its function toward possible return of an indictment. An agency may be invited into a grand jury investigation by the Federal or State Attorney's office or the investigating agency can request a grand jury investigation from the Federal or State Attorney's office. There are different procedures and approvals that apply to a grand jury investigation than an administrative (non-grand jury investigation) and evidence obtained through the grand jury process may be specifically separated from non-grand jury evidence.

The user will define currency 1975 as the currency the investigation is based upon. Investigations may involve different currencies and different countries.

The user will define execute deconfliction 1965, on which entities in the investigation that are subject to deconfliction. Both users that have a deconfliction hit, will be notified. The user will also define only one-way deconfliction 1955, which only notifies the user that defined the entity as a one way deconfliction entity. This definition is useful when there is a sensitive investigation and other users should not be notified of the existence of the investigation.

Referring also to FIG. 7, a user can upload one or more digital files that can be associated with a project, and a sequential number is applied to all documents. A unique identification number for each project is applied to all documents in that project, which is locked and cannot be changed by the user. The system will perform optical character recognition (OCR) on digital files to allow searching. The system will also perform importing and OCR processing in the background with a display of the queue of files being imported into the system.

The system will convert multi-page documents like PDF files into single-page documents, and create a numbered document page for each single page. The system will store the following information about digital files: date and time the file was imported into the system, original file name, file size, and the unique identification number. The system may redefine page breaks in multi-page PDF documents. The user will also be able to select an area of a page of a document and create a new document child for that specific area. A sequential suffix number will be applied to the selected area. For example: RPL000234.001 where "0.001" is the suffix number. The same thing can be applied to select segments of audio and video files that are in the system to create a new document child for that segment. A sequential suffix number will be applied to the child segment. The user can annotate PDF documents and the system will store the user who created the annotation. Annotations can be linked to an existing fact or create a new fact in the system. The user can select from predefined annotations. When a file is converted to a PDF document the system will store the original files, which will be linked to the files converted. Users will have the ability to select text in digital files that have been OCR'd, which the system can use to create Objects. Emails can be added as digital files into the system. Digital files can also be added directly from a computer operating system.

Entities

Referring to FIG. 58, an investigation entity table 5800 may identify entities that are essentially all the things in an Investigation. Examples of entities include: person, business, address, vehicle, boat, plane, application user, phone number, email, IP address, etc. The user can define Entity Type and link Entity Roles 5810 in the Investigation which are selected from a predefined agency list of role types and user-defined investigation types. The user can also link Entity Identifiers 5820 (user defined characteristics of an entity. examples: Person: Height, Weight, Hair Color, Sex; Business: Incorporation Data, Business Type; Vehicle: Make, Model, Year, Color). Entity Identifiers 5820 can be selected for use in reports. Template Files can be used to create Entities that can be imported into the system and Entities can also be imported from an outside source. An Entity can be deleted from an Investigation and imported from another Investigation. Selected OCR text in Digital Files can be used to create Entities. The Entity can be marked as one-way deconfliction 5830. Depending on agency rules, this type of deconfliction is when only one side of the deconfliction (users or agencies) is notified of the deconfliction hit. A Fact 5840 can be created which defines the relationship between Entities. The user can create links with Evidence 5850 and define the relationship from a list of predefined and previously used relationships or create a new relationship. They can also create links to Facts 5840 and Evidence Items 5850. The user may also enter notes 5860 about the entities.

As previously mentioned, entities are all the things in an investigation. Examples include but are not limited to: Person, Business, Address, Vehicle, Boat, Plane, Phone Number, Email and IP address. Within the Investigation, the user will open (or create a new Investigation) and create an Entity. Creating an Entity is a part of the investigative process and will link to other parts of the system. Entities will be Deconflicted against other entities in other investigations.

Once an Entity is created, the user will define the Entity Type. The Entity Type will be chosen from predefined list.

Referring to FIG. 59, one type of entity that a user may define is a person using a person table 5900. The person table 5900 may include, for example, a first name 5910, a last name 5920, a suffix 5930, a date of birth 5940, a taxpayer identification number 5950 (e.g., social security number). In some investigations, the same person will use different dates of birth and social security numbers. In such cases, the user can also define other date of births used 5960 and other taxpayer identification numbers used 5970.

The user can define the Person as First Name, Middle Name, Last Name, Suffix, Date of Birth (Fuzzy Date), Taxpayer Identification Number (Social Security Number (SSN)). In some investigations people will use different dates of birth and SSN's. In these cases, the user can also define Other Date of Births used and Other Taxpayer Identification Numbers used by the person.

Referring to FIG. 60, one type of entity that a user may define is a business using a business table 6000. The user can define the business using a name 6010 of the business and a business taxpayer identification number (EIN) 6020.

Address

Referring to FIG. 62, one type of entity that a user may define is an address using an address table 6200. The user can define an address as a Line1 6210, a Line2 6220, a Line3 6230, a City 6240, a State 6250, a Postal Code 6260, and/or a Country 6270. The system will determine and store, based upon the address information, GPS Data (Latitude 6280, Longitude 6290) for a defined address if a determine field 6295 is selected.

Referring to FIG. 63, one type of entity that a user may define is a boat using a boat table 6300. The user can define a boat as Description 6310, a HID 6330 (Hull Identification Number), and a boat name 6320, such as Pacific Seacraft Orion 27. The HID Number is a unique identifier for boats.

Referring to FIG. 64, one type of entity that a user may define is a plane using a plane table 6400. The user can define a Plane as a Description 6410, a Tail Number 6420, and a ICAO number (International Civil Aviation Organization number) 6430. The Description is a text description of the Plane such as 1973 Boeing 747. The Tail Number of an aircraft is another name for aircraft. The ICAO number is a member number to the ICAO, which is a specialized agency of the United Nations that codifies the principles and techniques of international air navigation and fosters the planning and development of international air transport to ensure safe and orderly growth.

Referring to FIG. 65, one type of entity that a user may define is a phone number using a phone number table 6500. The user can define a Phone Number as a Number 6510 and an Extension 6520.

Referring to FIG. 66, one type of entity that a user may define is a vehicle using a vehicle table 6600. The user can define a Vehicle as a Description 6610, a Plate 6620, a State of Plate 6630, and a VIN (Vehicle Identification Number) 6640. The Description is the text description of the Vehicle such as 2007 Lexus GX 470. The Plate is the license plate numbers and letters. The state of plate is the state of issuance of the plate. The VIN is the vehicle identification number.

Figure 67:
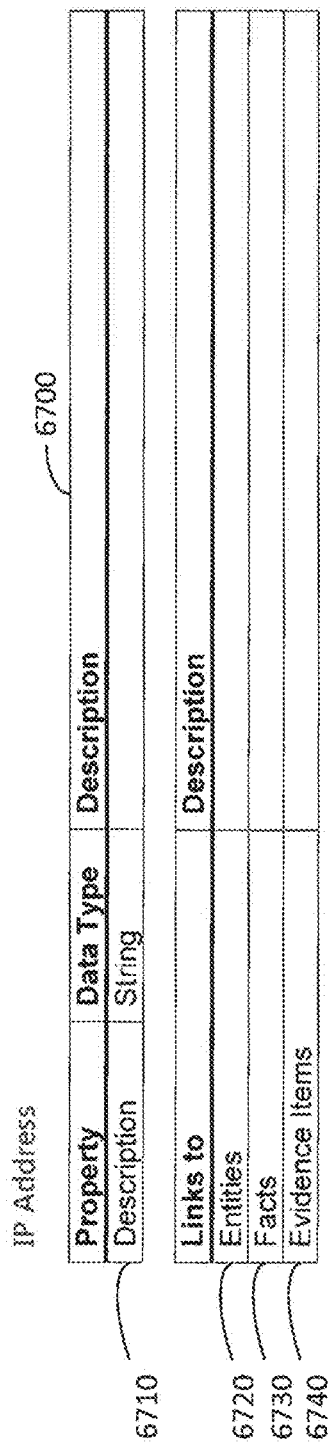
FIG. 67 illustrates an IP address table.

Referring to FIG. 67, one type of entity that a user may define is an IP address using an IP address table 6700. The user can define the IP Address as a Description 6710 which is a text description of the IP Address. Also, the IP address may be linked to entities 6720, facts 6730, and evidence items 6740.

Figure 68:
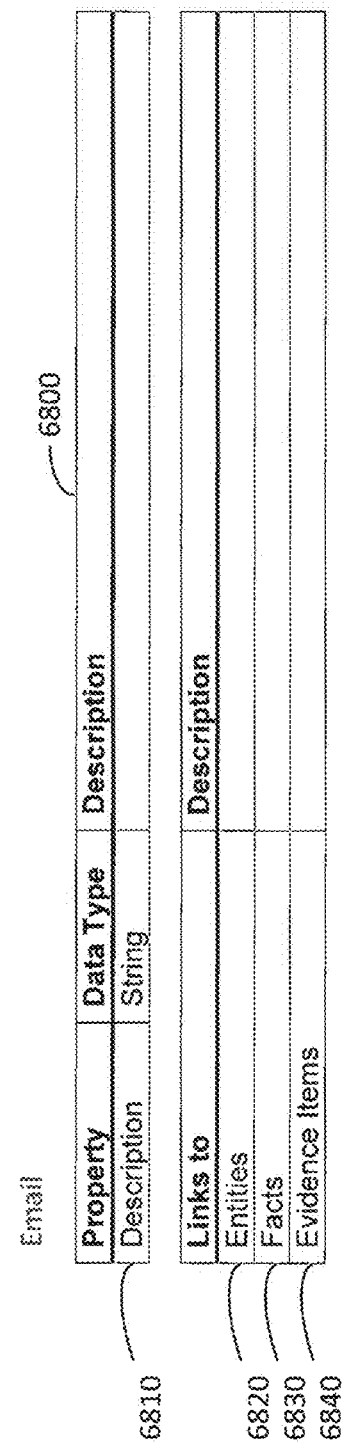
FIG. 68 illustrates an Email table.

Referring to FIG. 68, one type of entity that a user may define is an Email using an Email table 6800. The user can define the Email Address as a Description 6810 which is a text description of the email address. Also, the Email may be linked to entities 6820, facts 6830, and evidence items 6840.

In a similar manner, one type of entity that a user may define is a Web Address using a Web Address table. The user can define the Web Address as a Description which is a text description of the web address. Also, the web address may be linked to entities, facts, and evidence items.

In a similar manner, one type of entity that a user may define is a computer using a computer table. The user can define the computer as a Description which is a text description of the computer and serial number. Also, the computer may be linked to entities, facts, and evidence items.

In a similar manner, one type of entity that a user may define is a cell phone using a cell phone table. The user can define the cell phone as a Description which is a text description of the cell phone and an IMEI. The IMEI—(International Mobile Equipment Identity) is a unique 15-digit serial number given to every mobile phone which can then be used to check information such as the phone's Country of Origin, the Manufacturer, and its Model Number. Also, the cell phone may be linked to entities, facts, and evidence items.

For communication purposes a user will generate a public-private key pair, such as a PGP key (stands for Pretty Good Privacy). You share your public key with others so that they can send you encrypted messages or files, while keeping your private key secret so that you can decrypt the data. The user can store the PGP Keys in a key table, and define the PGP Key as a Description, which a text description of the PGP Key, together with the keys.

When a user creates a key, they provide details, like their name, email, and a key description. This information together constitutes a user ID. A good user ID helps people to recognize their key when they are trying to retrieve or import it. The user can define the PGP Key ID as a Description, a text description of the PGP Key ID.

The user may create a handle which is a person's online alias or shortened-name, often referred to as a 'nickname' or, from a systems perspective, 'username'. The user can define the User Handle as a Description which is a text description of the user handle.

The user may set a virtual currency address as a set of letters and numbers that allows funds to be sent to or from their virtual currency. The user can define the Virtual Currency Address as a Description, a text description of the virtual currency address.

Account

Referring to FIG. 61, one type of entity that a user may define is an Account using an Account table 6100. The user can define an Account as a description 6110, a Number 6120, an ABA Number 6130, an Open Date 6140, a Closed Date 6150, a Number Decimal Places 6160, a Currency 6170, a Nickname 6180, and a Calculation Method 6190. These identifiers for an Account are suitable for financial investigations. Number is the number assigned the account. Open Date is the date the account is opened. Closed Date is the date the account is closed. Number of Decimal Places is the number of decimal places used by the account. Currency is the currency type applicable to the account. If the account is a bank account, then the user can define the ABA Number which is the American Banking Association's nine-digit routing transit number on the bottom of negotiable instruments that identify the financial institution on which it was drawn. Nickname is a used defined name for the account. When a user has many similar accounts, a Nickname makes it more easily identifiable than an account number. For example, "Kris & JohnSavings" could be a nickname. Calculation Method relates to an account that has legal and illegal (comingled) funds. The definition is made by the user. The Calculation Method defines if the account method of FIFO (First In First Out) or LIFO (Last In First Out) is used for the account analysis.

Entity Roles

Once an Entity Type is defined, the user can define the Entity Role 5820. The user can select Entity Role 5820 from a predefined agency list of types or define their own role type. Examples of an Entity Role Type could be the user itself or a Supervisor. Entity Role Types will also be defined as the investigation Entity Role Type such as a Witness, Subject or Co-Conspirator. These Role Types are Entity's outside the agency. The Entity Role Types will link to the Investigation Case Number and Entity.

Entity Identifiers

Once an Entity is created, a user can define its Entity Identifiers 5820. Entity Identifiers are user to define characteristics of an Entity. The user can define the Entity Identifiers Type of a Person which could be Height, Weight, Hair Color, Tattoos or Sex. The user will further define the Entity Identifier Type of the Entity Identifiers such as the Person has Hair Color that is brown. Entity Identifiers of a Business could be that it is a Limited Liability Company.

The user will select which Entity Identifiers will be used in the agency reports. For example, a user may not want the Weight and Tattoo identifier of a Witness in the particular report because it is not relevant. The user can link Evidence to an Entity Identifier to document the source of the identifier.

The user can link an Entity to the Fact 5840, the Evidence 5850 and the Action Items (see FIG. 22). One use of linking Entity to Fact and Evidence items is to produce a report linking the evidence of a crime to the witnesses.

The user can link Entities to each other and define the relationship between the two from a list of predefined and previously used relationships or create a new relationship. The user will have ability to create a Fact, which defines the relationship between the Entities. The user can then link Evidence to these Facts to prove the relationship. This is a suitable technique for defining relationships, and defining the supporting evidence that supports and proves the relationships.

Users can set the Entity for One-Way Deconfliction. One-Way Deconfliction could be set by agency as a rule or by the user. It is used so that notification of a Deconfliction hit is only on one side. For example, it is useful in sensitive investigations.

Users may use a Template File to create Entities that can be imported into the application. This is especially useful in large cases with many witnesses. For example, the Template File gives the user the ability for an assistant to enter the information for the user and then the user can import the Entities into the application.

Users may Import Entities from an outside source. For example, in joint investigations when the other agency already has a witness list.

Users may Import Entities from another Investigation within the application. Users will have the ability to Delete an Entity from an Investigation.

Users may create an Entity using the OCR text on digital files. For example, when a user has Imported Evidence into the application and is viewing the file, the user can create an Entity from within the digital file they are viewing.

"Deconflict" was originally a military term describing efforts to reduce the risk of collision between aircraft and airborne weaponry operating in the same airspace. In law enforcement, the term refers to the process of ensuring that agencies and/or law enforcement officers are aware of other agencies/law enforcement officers investigating or interested in the same entity.

The system allows entities to be Deconflicted across all entered investigations. The deconfliction process compares entities in all investigations to look for instances where the same entity is listed in multiple investigations. If potential conflicts are found, notifications are sent each case agent (i.e., user).

The system may create an action item for the deconfliction hit that states 'The investigation [Investigation Name] [Entity Type] [Entity Description] has a possible deconfliction hit with [Other Lead Investigation User], [Other Lead Investigation User Phone Number], [Other Lead Investigation User Email address]. The action item may have entity subject to the deconfliction hit linked to the action item and the user from the other investigation linked to the action item. The system may send an option e-mail or a text of the deconfliction hit to the users.

Deconfliction matches may be performed by, one or more of the following:
    Account numbers on description,
    Email on description, Email on email prefix only,
IP Address on description,
Person on Last Name,
Person DOB,
Person SSN,
Person on Last Name and SSN,
Person on SSN and additional Person SSNs,
Phone number on description,
Web address on description,
Business on EIN,
Plane on Tail Number,
Plane on ICAO,
Boat on Boat Name,
Boat on HID,
Address on Geo Location,
Vehicle Deconflicted on VIN, and/or
Vehicle on State of Plate and Plate Number.

Investigation Document Data

Referring to FIG. 23, an investigation document may be referenced by an investigation document data table 2300, which is a type of digital file that has additional information related to investigations, which has a classification that may be defined. For example, when a file is imported into the system, it could be Evidence or another type of information.

A document source type 2310 defines the source of document, such as for example, a Search Warrant, a Document Production Request 2390, a Government Document, a Public Document, etc.

A witness 2320 may be linked by the system to define the Witness (Entity Data) for the digital file. The witness 2320 is the person who will testify as to the authenticity of the document, such that the document may be admitted into evidence.

A grand jury 2330 may be used by the system to define the digital file as whether it was obtained through the Grand Jury process, if applicable. Whether a document was obtained as a result of the grand jury process is related to the Discovery process for court.

A page code 2340 may be used by the system to define the Page Code which is an image boundary setting that shows the document's position in the document collection's hierarchy. By way of example, an example (D) may indicate that the image is the first in a document. By way of example, boundary flags may include a S (source), a B (box), a F (folder), and C (child).

In a legal proceeding, some documents are discoverable to the other party and some documents are not. To determine whether a document is discoverable to the other party in a litigation, the system may define whether the digital file is Not Discoverable 2350, if applicable. If selected as Not Discoverable 2350, the digital file will not be subject to the Discovery process.

There are several categories of materials for a document, one of which the system may define as containing Brady Material 2360. Brady Material is information or evidence that is known by the prosecution to be favorable to the defendant in a criminal case. It is required that the prosecution turn it over to the defense. In this manner of categorization of material, the prosecution can ensure that all such Brady Material is effectively identified so it can be turned over.

Another of the categories of materials for a document the system may define are ones containing Jencks Material 2370. Jencks Material is evidence that is used during a federal criminal prosecution in the United States of America. It mostly consists of documents relied upon by government witnesses who testify at trial. The documents/evidence are described as inculpatory. Inculpatory evidence favors the U.S. government's prosecution of the criminal defendant. It is required that the prosecution turn it over to the defense. In this manner of categorization of material, the prosecution can ensure that all such Jencks Material is effectively identified so it can be turned over.

Another of the categories of materials for a document the system may define are ones containing Gigilo-Henthorn Material 2380. Gigilo-Henthorn Material is material that can be used to impeach a testifying law enforcement officer. The prosecution is required to be turn it over to the defense. In this manner of categorization of material, the prosecution can ensure that all such Jencks Material is effectively identified so it can be turned over.

Evidence Data

Referring to FIG. 24, an evidence item table 2400 may be used to categorize an Evidence Item referencing evidence Imported into the system. Evidence is a type of digital file that has been brought in as an investigation document. The user can create links to one or more evidences and/or entities and define the relationships from a list of predefined and previously used relationships or create a new relationship. The application will automatically search evidence for investigative entities and report potential hits to the user for linking.

The user may enter a Date of the Evidence 2410, for the associated evidence. For example, a date of a Bank North bank statement is Aug. 2, 2016.

The user may define the Evidence Type 2420 which is preferably selected from a list of predefined and previously used values or a new type value may be created. For example, an Evidence Type can be a Signature Card, Bank Statement, Check, Deposit, Invoice, or Receipt.

The user may include a Description of Evidence 2430. This provides a field for additional description of the evidence, which may occur if the date of the evidence 2410 and evidence type 2420 is not likely sufficiently descriptive.

The user may include a Physical Evidence 2440 field to define whether such evidence exists as either paper, such as a bank statement, or a physical object, such as a vehicle. With the unique number prefix of the digital files, the user can readily import all such evidence items based upon the unique number prefix.

For example, the user can Import Evidence Types from other investigations. The user can define the hierarchy of evidence. The user can create links to one or more Evidence Items 2450 and define the relationship from a list of predefined and previously used relationships or create a new relationship.

The user can create links to one or more Entities 2460 and define the relationship between the linked Entities from a list of predefined and previously used relationships or create a new relationship. The application may automatically search evidence for Investigative Entities and report potential hits to the user for linking.

Facts

Referring to FIG. 26, a fact table 2600 may be used to characterize facts. A Fact is an incident, act, event, or circumstance. A Fact is something that has already been done or an action in process. Within an Investigation, the user will create a Fact.

The user will define a Short Description 2610 of the Fact. For example, a short description could be Marriage License.

The user may define a fuller Description 2620. For example, John and Sally were married at the Little Chapel in Las Vegas, Nev.

The user may define a fact date, which is the date of the factual occurrence. For example, John and Sally were married on Aug. 8, 2016.

The Fact can be automatically linked to the user who created the fact 2640. In this manner, another user will know who to inquire to obtain more information about the fact.

The user can link the Fact to an Investigation 2645, users 2650, Evidence Items 2655, Entities 2660, Entity Relationships 2665, and Entity Identifiers 2670. Each of these links assist in the creation of the Fact.

The user can link the Fact to an Investigation Report Paragraph 2675. The Investigation Report Paragraph is a paragraph where the Fact has been populated because the user has determined that the Fact is relevant to the report. The Full Description would be populated to the report.

The user can link the Fact to a Document Page Annotation 2680. The Document Page Annotation is an annotation in the Investigation Report Paragraph that links to the Fact and supporting evidence. For example, if the Fact is John and Sally were married, the Document Page Annotation will link the Marriage License, which is the Evidence Item, to the Investigation Report Paragraph.

The user can link the Fact to an Investigation Summary Report Section Titles 2690. For example, the section title could be Subject Violations. The Subject Violations are defined from a predefined agency list.

The user can link the Fact to an Investigation Summary Report Subject Violation Elements 2685. These are linking the Facts and supporting Evidence Items to the Subject Violations Elements. The Subject Violations Elements are the legal requirements necessary to prove a violation occurred. For example, if the violation is Wire Fraud, the Fact could be that on Aug. 9, 2016, the subject wired funds to a co-conspirator.

Fact Connector

Figure 128:
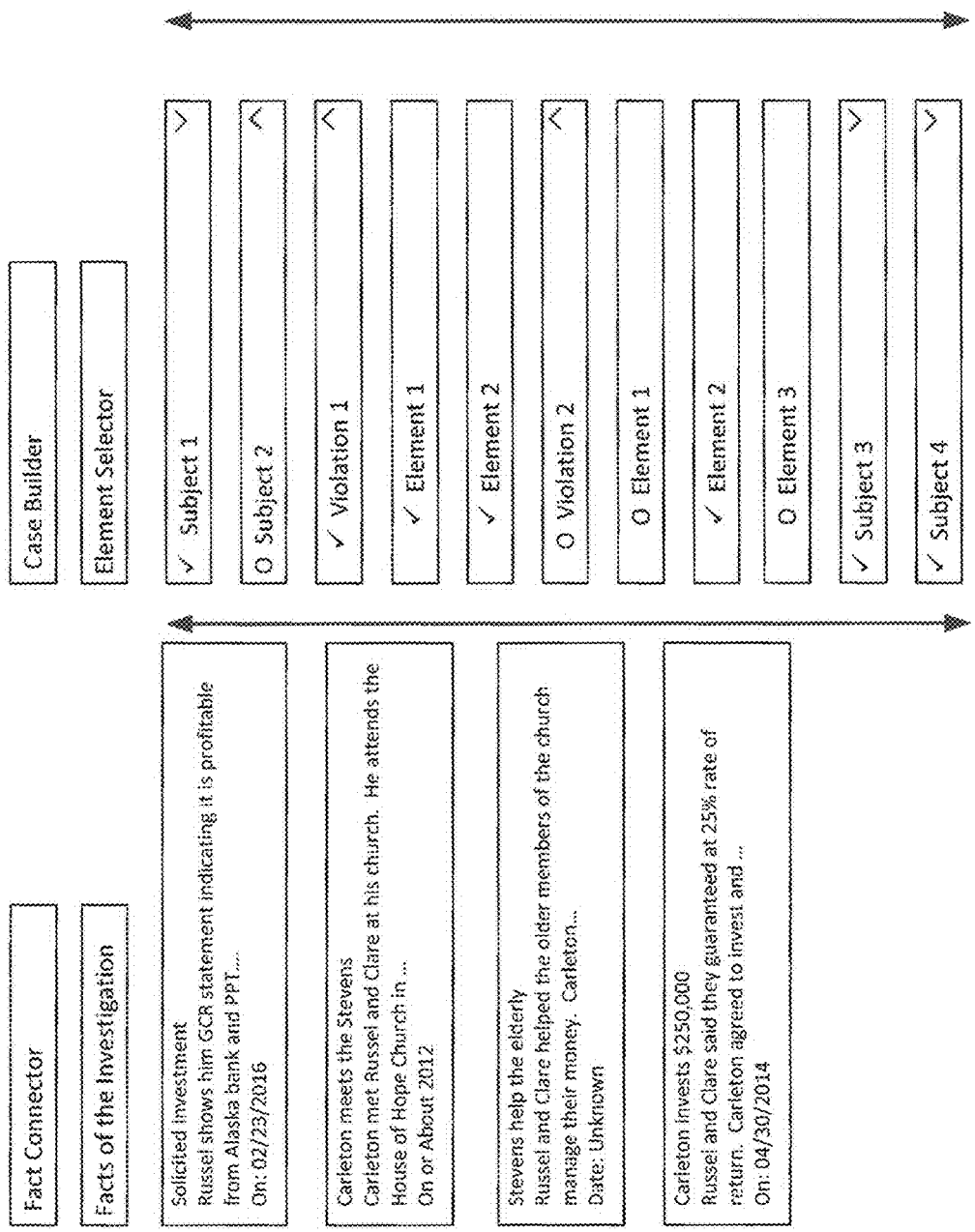
FIG. 128 illustrates an exemplary fact connector user interface table.

Referring to FIG. 128, the system may present a fact connector using a user interface to the user. By using the fact connector, users can effectively view the Facts of an Investigation and select elements of a crime that are related to that are connected to subjects in the Investigation. Once all the elements in a specific violation are met, the user interface indicates it. Once all the Violations for a subject are met, the user interface also indicates that.

The Fact Connector will display all the defined Facts in an Investigation on one side of the form and display defined Case Investigation Reports on the other side of the form. Using the Fact Connector, users can walk through the Facts of an Investigation and link the Facts to user defined Investigation Summary Report Subject Violation Elements of a crime in the Investigation. These links are used to relate Facts of the Investigation to possible subject Violations. These links will be used to generate a Case Investigation Report. The user can also use the Fact Connector to link Facts to other pre-defined and user defined Investigation Summary Report Section Titles of the Case Investigation Report. The Fact Connector assists the user in "writing" the Case Investigation Report by linking defined Facts to sections of the report without having to retype the information that is already defined in an Investigation.

Within the Fact Connector the user can define Hide, Order, Date, and Count for Investigation Summary Report Subject Violation(s). The Hide is when the user does not want to show this specific violation in the report. This can occur when working a case and not know until the end that there is not enough evidence to prove the violation. Rather than deleting the violation and lose all the facts identified, the user can just hide them for the final report. The Order (if there are multiple violation) is where the order of the violation appears with in the subject. The Date is the date (or year) description the violation occurred. The Count is the description of the number of counts related to the violation. Investigation Summary Report Subject Violation Element(s) are created from for the user from Violation Elements for the selected Violation when an Investigation Summary Report Subject Violation is created. The application will define Element Number, Description, and Can Modify. The Element Number and Description are defined from the Violation Element. The Can Modify defines if the end user can modify the properties of Investigation Summary Report Subject Violation Element.

Within the Fact Connector the user can create Investigation Summary Report Section Title(s) and define Order, Title, Required, Cited Section, Hide, Display In TOC, and Subject Section. The Order is the location this section appears in the defined report. The Title is the text that appears in the default report. The Required is if this section must have Facts linked to the section. The Hide determines if the section is visible in the end report. The Cited Section determines if the linked Facts must have Evidence linked to prove the Facts. The Display In TOC (Table of Contents) determines if this section is displayed in the TOC. The Subject Section determines if the section is then further broken down by the subjects defined in the report. The user can create and link Investigation Summary Report Section Title(s) to other Investigation Summary Report Section Titles.

Action Item Data

Action Items are used to create tasks, and maintain a list of tasks to do, that the user can then link to other items within the application. Within the Investigation, the user will open (or create a new Investigation) and create an Action Item using an action item table 2200. Action Items may link to many elements, such as Entities 2310, Users, Investigation 2330, facts 2340, and Evidence Items 2320. Also, the user can also Delete an Action Item.

For example, user can assign a Priority Level to the Action Item.

For example, the user can define a full Description of the Action Item. The description may be a few words or many words copies and pasted from another location.

For example, the user can define a Due Date

For example, the user can set a Due Date of the Action Item. The Due Date could be a follow up on the Action Item. For example, the Due Date could be the date to call the attorney about a subpoena request if the user has not been notified that the subpoena is ready for pick up.

Action Items can be assigned to a User, such as a manager. The application will store the creator of the Action Item. The User will have the ability to link one or more Users to an Action Item. For example, if a User is tasking another User to complete the Action Item.

Once the user has completed the Action Item, they can mark the items as Completed. The user will define when an Action Item is Completed. For example, for one user, an Action Item is complete when a subpoena is issued, for another user, an Action Item is Complete when the subpoenaed records are received. The user can also define the Percentage of Complete Action Items.

The user will have the ability to link a Tag to an Action Items. Tags allow grouping of Action Items.

The user will be able to view all of the Action Items on all of their investigations on the application Dashboard. For example, when a user begins their work day, they will know what Action Items are pending on all their investigations from one place.

A user may link an Action Item to one or more Action Items. For example, the user could have several Action Items pending that relate to the same subject matter.

Mail Cover

Referring to FIG. 29, a mail cover table 2900 is illustrated to describe mail cover. Mail Cover is a law enforcement investigative tool in which the United States Postal Service (USPS), acting at the request of a law enforcement agency, records the data on the outside of any class of mail matter [letter, parcel, circular, etc.] before they are delivered to the addressee and then sends the recorded information to the requesting agency. The request usually requires management approval and they are usually limited to thirty days at a time.

Referring to FIG. 30, a mail cover group table 3000 is illustrated to describe Mail Cover Groups that links to one or more mail cover items (see FIG. 29). There may be many groups particularly if the Mail Cover is renewed for an additional 30 days.

Within the Investigation, the user requests a Mail Cover request through their agency to the USPS. The user links an Address Entity 2910, and links Related Person Entities and/or Businesses Entities 2920 associated to the address in which the mail cover will be conducted. The user links related Investigation Numbers 2930 to the Mail Cover. The user defines a Reference Number 2940, a Date Approved 2950, a Begin Date 2960, and an End Date 2970. The Date Approved is defined by the agency. It could be the date approved by the USPS or the date approved by the requesting agency. The Begin Date and End Date are the dates the user defines as the dates the mail cover will be in effect. The user will also define the Reference Number, a number relating to that mail cover request.

Once the USPS complies with the request by providing the agency with the data collected, the user may create a Mail Cover Group 2980 for each group of items received for the mail cover request. The Mail Cover Group 2980 is a grouping of the mail cover data collected and sent to the requesting agency. Data collected by the USPS is sent to the requesting agency in groups. The user defines the a Date Received 3010, and a Number of Items Received 3020. The mail cover group may include links to mail cover items defined by a mail cover item table 3100.

Referring to FIG. 31, the user will define each Mail Cover Item in the Mail Cover Group with an Item Number 3110 and a Letter Date 3120. The user also links an Address Entity 3130 and related Person Entities and/or Business Entities 3140 in which the letter came from.

After the information, has been processed and returned to the USPS, the user enters a Number of Items Returned 3030 and a Date Returned 3040 to the USPS.

Telephone Toll Analysis Data

There are various methods to obtain Telephone Toll Analysis. Pen registers and trap-and-trace devices are a law enforcement investigative techniques that capture the phone numbers dialed on outgoing telephone calls and capture the numbers of incoming calls if caller ID is present. No conversations are recorded using such techniques and a court order is required. Law enforcement also receives telephone toll data from Search Warrants and Document Production Requests.

Referring to FIG. 32, a phone toll table 3200 may be used to describe telephone based information. Within the Investigation, the user will create a Telephone Toll Analysis to document the analysis.

The system links to a Phone Number Entity 3210, which is the phone number of the toll analysis.

The system links to a Person/Business Entity 3220 associated with the phone number.

The system defines a Beginning Date 3230 which is when the toll analysis starts and an Ending Date 3240 which is when the toll analysis ends.

The system defines a Phone Toll Type 3250 for the investigation. By way of example, the Phone Toll Type could be a Pen Register or a Trap and Trace Device.

The phone toll detail may be linked to the Phone Number Entity 3210, the Person/Business Entity 3220, and the Phone Toll Details 3260.

Referring to FIG. 33, the system links the phone toll details 3260 to a phone toll detail table 3300. When the Phone Toll Data is received, the user will define the details of the Phone Toll Detail. The details for each of the phone toll detail entries may include a data and time 3310 of the data received and a duration 3320 of the phone call. An outgoing and incoming Phone Number Entity 3330 may be included as the telephone number the call was placed to or received from.

Financial Data

Referring to FIG. 34, a bank statement may be included in a bank statement table 3400 to describe bank statement data. The bank statement may include a begin date 3410, a begin balance 3420, an end date (evidence date) 3430, an end balance 3440, a total deposits 3450, a total withdrawals 3460, and a reconciled 3470. This provides the basic bank statement information suitable for providing evidence for a court. The bank statements may link to an account 3480, a bank transactions 3485, and a lock status 3490.

Referring to FIG. 35, a bank transaction may be included in a bank transaction table 3500 to describe bank transaction data. The bank transaction may include a check number 310, a cleared date 3520, and an amount 3530. The bank transaction may link to a bank transaction details 3540, and an entities 3550.

Referring to FIG. 36, a bank transaction detail may be included in a bank transaction detail table 3600 to describe bank transaction detail data. The bank transaction detail may include an amount 3610. The bank transaction detail may link to a bank item 3620.

Referring to FIG. 37, a bank item may be included in a bank item table 3700 to describe bank identification data. The bank item may include an item date 3710, an amount 3720, a memo 3730, an ABA number 3740, an account number 3750, and a bad unknown amount 3760. The bank item may link to a bank items 3770 and an account 3780.

Referring to FIG. 38, a check may be included in a check table 3800 to describe check data. The check may include a check number 3810.

GPS Tracking Data

Global Positioning System (GPS) tracking can track vehicles and people. A GPS Tracking Device, GPS tracking, and surveillance are some of the tracking methods. A GPS tracking device are trackers placed on vehicles. A search warrant may be required for a GPS Tracking Device.

Referring to FIG. 27, a GPS tracking event period table 2700 may be used to track GPS data.

The system may link to tracking events 2710 as events related to the GPS tracking (see FIG. 28).

The system may link to a tracking type 2720, which may be for example, GPS tracking device, foot surveillance, etc.

The system may create a Tracking Event Period that includes a beginning date 2730 and an ending date 2740 of the tracking activities.

The system may include a link to an entity being tracked 2750.

The system may include a Tracking Event table 2800 for tracking events.

A Tracking Event includes details of the tracking, such as a Date and Time of Event 2810, a latitude 2820 which is an angular distance of a place north or south of the earth's equator, a longitude 2830 which is an angular distance of a place east of west of the earth's equator, and an address description 2840 which may be a location, an address, a business, an area, etc. describing the address.

The user will also link to an Address Entity 2850 to the Tracking Event. The user will link the Entity Being Tracked 2750, the Tracking Type 2720, and the Tracking Events 2710 to the event period.

Search Warrant Data

A Search Warrant is a court order authorizing law enforcement officers to search a person or place with the intent to discover stolen property, contraband, or evidence of guilt to be used in the prosecution of a criminal action. Law enforcement officers obtain Search Warrants by submitting affidavits and other Evidence to a judge or magistrate. The affidavit must establish Probable Cause to believe that a search will yield Evidence related to a crime. If the judge or magistrate believes that probable cause was met in the affidavit, he/she will issue the warrant.

Search Warrant Boxes hold the items to be seized. Each box usually contains like kind items (Search Warrant Box Type) being seized, like digital, contraband, valuables (currency, jewelry, etc.) and all other items. Each box is given a number for ease of tracking.

Seized Groups are the items listed in the affidavit to be seized (usually Attachment B). This will allow for the ability to link the items to be seized in to a search warrant and to the item seized.

Search Warrant Address

Referring to FIG. 50, usually when planning a search warrant for an address there is a significant amount of planning that goes into the execution of the search warrant. In the application for the search warrant, the user opens (or create a new Investigation) and creates a Search Warrant using a search warrant table 5000. The user defines a Judicial Area 5010 the search warrant will be executed, link related investigation Case Number(s) 5050, link an Entity as a search location 5055 that is to be searched, link to an investigation 5085, link to a search warrant plan 5075, link to search warrant files 5065, link to search warrant rooms 5055, link to a search warrant item 5045, and link to search warrant property seized groups 5035. The user can also link the Violation(s) 5030 identified in the affidavit for the search warrant. The user can also link a Person/User 5040 who is the affiant of the search warrant.

Referring to FIG. 51, a search warrant plan table 5100 may be used for data regarding a search warrant plan. The user would then create a Search Warrant Plan in the application. The user defines an Objective 5110, a Plan of Action 5120, and Other Pertinent Information 5130. The user defines a proposed Execution Date and Time 5140. Based on the location of the search the user links an Address as the Staging Location 5150 and defines the Staging Date and Time 5160 for the search warrant. The staging location is where law enforcement will gather prior to the execution of the search warrant. The user would then link all proposed Search Warrant Personal 5170 who will assist with the execution of the search warrant.

Referring to FIG. 52, the user can include search warrant person data in a search warrant person table 5200. The user will define Initials 5270 and link to any Notes 5210 for that person. Then the user can link to a proposed Search Warrant Role(s) 5220 for each Search Warrant Person 5240 has in the execution of the search warrant and the Search Warrant Equipment(s) 5230 each Search Warrant Person 5240 is responsible for bringing to the search warrant.

Referring to FIG. 53, the user can include search warrant person role data in a search warrant person role table 5300. The search warrant person role data may include a description 5310 of the person's role and a link to the person role type 5320.

The user will link a Business Entity to define the Nearest Medial Facility 5180. The user will link the Address to the Nearest Medial Facility Address 5190. The user will then link all possible Entities 5195 expected to be present at the execution of the search warrant. In this manner, in the event the execution of the search warrant results in injury, the user can readily locate the nearest medical facility.

After the search warrant and affidavit have been signed by a judge, the user will scan (Import as a Documents) and link a copy of the signed search warrant document and affidavit to the search warrant in the application and make any needed changes to the Violation(s) in the affidavit that are linked to the search warrant. Then the user can define a Court Reference Number 5020.

Referring to FIG. 57, the user may then create Search Warrant Seized Property Groups using a search warrant seized property groups table 5700 from the items lists to be seized which is usually attachment B to the search warrant. The user may define an Item Number 5710 and a Description 5720 of the Search Warrant Seized Property Group.

The user can also attach any agency specific required approval documents to the Search Warrant. The user would scan and/or Import as a Document and linked to the Search Warrant as Search Warrant File Link Type "Approval Document".

After entry has been made to the search location and the site is secure, the user will setup their computer and open the application. Then the user can set the Start Time 5060 of the Search Warrant. The user can enter any Entities (people, vehicles, boats, etc.) 5070 that are present at the search warrant. The user can also add all (or import from the Search Warrant Plan) Search Warrant Personal 5080 that are present to assist in the execution of the search warrant. The user can define (or correct from the import) each Search Warrant Person Role(s) 5220 and Search Warrant Person Equipment(s) 5230. Whenever any Search Warrant Personal 5240 leave, the user can enter an End Time 5250 into the system. The system can also enter the initials 5260 of the user.

The law enforcement officers on site will document the condition of the search site immediately after the search location is secure with pictures and/or video. These files will be imported as Documents linked to the Search Warrant as Search Warrant File Link Type "Entry Condition".

Usually a law enforcement officer on site will draw a sketch of the search location. This sketch will be scanned (Import as a Document) after the warrant and linked to the Search Warrant as Search Warrant File Link Type "Location Sketch".

Referring to FIG. 54, the search location will be divided into logical areas (usually in a business it would be offices and in a residence, it would be bedrooms, kitchen, office, living room, etc.) These will be linked to the Search Warrant as a Search Warrant Area in the search warrant area table 5400. Each Search Warrant Area will have a Code 5410 defined which is usually a letter of the alphabet (A, B, C, D, etc.) and a Description 5420 of the area like Master Bedroom, Kitchen, Office, etc.) and links to search warrant items 5430. The area codes should be notated on the sketch for later reference later.

Referring to FIG. 56, usually one person is designated to manage the evidence being seized at the search location. When evidence is found, it is usually placed into a like kind Search Warrant Box which may be identified using a search warrant box table 5600. Boxes are usually organized into Search Warrant Box Type 5620, like digital, contraband, valuables (currency, jewelry, etc.) and all other items. These boxes will be linked to the Search Warrant as Search Warrant Box 5090. Each Search Warrant Box will have a Box Number 5610 and the Search Warrant Box Type 5620.

Referring to FIG. 55, during the search phase of the search warrant execution, law enforcement officers will find evidence that is defined in the items to be seized in the search warrant. Usually a photo(s) are taken of the evidence where it is found. Then the item of evidence can be entered into the system as a Search Warrant Item in a search warrant item table 5500. The system will generate the Item Number 5510 (based on the last Item entered). The user will link a Search Warrant Area 5530, a Search Warrant Box 5540, a Search Warrant Property Seized Group(s) 5550, a Search Warrant Person as the Seizing Officer 5555, and a Search Warrant Person(s) 5520 who found the evidence item. The user will also define Where Found 5560 (a description of where the item was found in the Search Warrant Area). The user can also link any Entities 5570 identified in the item of evidence found. If the item found was contraband 5580 (an item that possession of is not legal), then the user would set the Contraband value to true. The photo(s) of the evidence will be imported as Documents and linked to the Search Warrant as Search Warrant File Link Type "Evidence item"

During the search of the location law enforcement may take additional video or pictures. These files will be imported as Documents and linked to the Search Warrant as Search Warrant File Link Type "Search Warrant Photo" or "Search Warrant Video".

The law enforcement officers on site will document the condition of the search site at the end of the search warrant with pictures and/or video. These files will be imported as Documents and linked to the Search Warrant as Search Warrant File Link Type "Exit Condition"

After the inventory is printed from the application, the user can enter the End Time 5095 of the search warrant which will log the End Time 5250 all remaining Search Warrant Personal as leaving as well.

Search Warrant Person

By way of example, usually when planning a search warrant for a person there is a significant amount of planning that goes into the execution of the search warrant. In the application, the user would open (or create a new Investigation) and create Search Warrant. Then the user would define the Judicial Area the search warrant will be executed, link the related investigation Case Number(s), link the Person Entity that is to be searched. The user can also link the Violation(s) identified in the affidavit for the search warrant. The user can also link the User or Person who is the affiant of the search warrant.

The user would then create a Search Warrant Plan in the application. Then the user will define the Objective, Plan of Action, and Other Pertinent Information. User will define the proposed Execution Date and Time. Based on the location of the search the user will link the Address Entity for the Staging Location and define the Staging Date and Time for the search warrant. The staging location is where law enforcement will gather prior to the execution of the search warrant. The user would then link all the proposed Search Warrant Personal who will assist with the execution of the search warrant. The user will define the Initials and any Notes for that person. Then the user can assign the proposed Search Warrant Role(s) for each Search Warrant Person has in the execution of the search warrant and the Search Warrant Equipment(s) each Search Warrant Person is responsible for bringing to the search warrant. Even though it may not be known where the person is located it is still good to associate a Business Entity to define the Nearest Medial Facility. The user will link the Address to the Nearest Medial Facility Address. The user will then link all possible Entities expected to be present at the search warrant.

After the search warrant and affidavit have been signed by a judge, the user will scan (Import as a Documents) and link a copy of the signed search warrant document and affidavit to the search warrant in the application and make any needed changes to the Violation(s) in the affidavit that are linked to the search warrant. Then the user can define the Court Reference Number. The user can then create Search Warrant Seized Property Groups from the items lists to be seized which is usually attachment B to the search warrant. The user would define Item Number and Description of the Search Warrant Seized Property Group.

The user can also attach any agency specific required approval documents to the Search Warrant. The user would scan and/or Import as a Document and linked to the Search Warrant as Search Warrant File Link Type "Approval Document".

After the person is secure, the user will setup their computer and open the application. Then the user can set the Start Time of the Search Warrant. The user can enter any Entities (people, vehicles, boats, etc.) that are present at the search warrant. The user can also add all (or import from the Search Warrant Plan) Search Warrant Personal that are present to assist in the execution of the search warrant. The user can define (or correct from the import) each Search Warrant Person Role(s) and Search Warrant Person Equipment(s). Whenever any Search Warrant Personal leave, the user can enter the End Time into the system.

The search location will usually only be the person itself, but could be divided into logical areas if necessary (could be wallet, purse, briefcase, etc.) These will be linked to the Search Warrant as Search Warrant Area. Each Search Warrant Area will have a Code defined which is usually a letter of the alphabet (A, B, C, D, etc.) and a Description of the area like wallet, purse, briefcase, etc.).

Usually one person is designated to manage the evidence being seized at the search location. If there is a large amount of evidence, it may be placed into a like kind Search Warrant Box. Boxes are usually organized into Box Types, like digital, contraband, valuables (currency, jewelry, etc.) and all other items. These boxes will be linked to the Search Warrant as Search Warrant Box. Each Search Warrant Box will have a Box Number and Box Type.

During the search phase of the search warrant execution, law enforcement officers will find evidence that is defined in the items to be seized in the search warrant. Usually a photo(s) are taken of the evidence where it is found. Then the item of evidence can be entered into the system as a Search Warrant Item. The system will generate the Item Number (based on the last Item entered). The user will link the Search Warrant Area, Search Warrant Box, Search Warrant Property Seized Group(s), Search Warrant Person as the Seizing Officer, and Search Warrant Person(s) who found the evidence item. The user will also define Where Found (a description of where the item was found in the Search Warrant Area). The user can also link any Entities identified in the item of evidence found. If the item found was contraband (an item that possession of is legal), then the user would set the Contraband value to true. The photo(s) of the evidence will be imported as Documents and linked to the Search Warrant as Search Warrant File Link Type "Evidence item"

During the search of the location law enforcement may take additional video or pictures. These files will be imported as Documents and linked to the Search Warrant as Search Warrant File Link Type "Search Warrant Photo" or "Search Warrant Video"

After the inventory is printed from the application, the user can enter the Ending Time of the search warrant which will log the End Time all remaining Search Warrant Personal as leaving as well.

Search Warrant Vehicle, Boat, or Plane

Usually when planning a search warrant for a Vehicle, Boat, or Plane there is a significant amount of planning that goes into the execution of the search warrant. In the application, the user would open (or create a new Investigation) and create Search Warrant. Then the user would define the Judicial Area the search warrant will be executed, link the related investigation Case Number(s), link the Vehicle, Boat, or Plane that is to be searched. The user can also link the Violation(s) identified in the affidavit for the search warrant. The user can also link the User or Person who is the affiant of the search warrant.

The user would then create a Search Warrant Plan in the application. Then the user will define the Objective, Plan of Action, and Other Pertinent Information. User will define the proposed Execution Date and Time. Based on the location of the search the user will link the Address Entity for the Staging Location and define the Staging Date and Time for the search warrant. The staging location is where law enforcement will gather prior to the execution of the search warrant. The user would then link all the proposed Search Warrant Personal who will assist with the execution of the search warrant. The user will define the Initials and any Notes for that person. Then the user can assign the proposed Search Warrant Role(s) for each Search Warrant Person has in the execution of the search warrant and the Search Warrant Equipment(s) each Search Warrant Person is responsible for bringing to the search warrant. Even though it may not be known where the person is located it is still good to associate a Business Entity to define the Nearest Medial Facility. The user will link the Address to the Nearest Medial Facility Address. The user will then link all possible Entities expected to be present at the search warrant.

After the search warrant and affidavit have been signed by a judge, the user will scan (Import as a Documents) and link a copy of the signed search warrant document and affidavit to the search warrant in the application and make any needed changes to the Violation(s) in the affidavit that are linked to the search warrant. Then the user can define the Court Reference Number. The user can then create Search Warrant Seized Property Groups from the items lists to be seized which is usually attachment B to the search warrant. The user would define Item Number and Description of the Search Warrant Seized Property Group.

The user can also attach any agency specific required approval documents to the Search Warrant. The user would scan and/or Import as a Document and linked to the Search Warrant as Search Warrant File Link Type "Approval Document".

After the Vehicle, Boat, or Plane is secure, the user will setup their computer and open the application. Then the user can set the Start Time of the Search Warrant. The user can enter any Entities (people, business, etc.) that are present at the search warrant. The user can also add all (or import from the Search Warrant Plan) Search Warrant Personal that are present to assist in the execution of the search warrant. The user can define (or correct from the import) each Search Warrant Person Role(s) and Search Warrant Person Equipment(s). Whenever any Search Warrant Personal leave, the user can enter the End Time into the system.

The search location will usually only be the Vehicle, Boat, or Plane itself, but could be divided into logical areas if necessary (could be trunk, glove compartment, inside vehicle, etc.) These will be linked to the Search Warrant as Search Warrant Area. Each Search Warrant Area will have a Code defined which is usually a letter of the alphabet (A, B, C, D, etc.) and a Description of the area like trunk, glove compartment, inside vehicle, etc.

Usually one person is designated to manage the evidence being seized at the search location. If there is a large amount of evidence, it may be placed into a like kind Search Warrant Box. Boxes are usually organized into Box Types, like digital, contraband, valuables (currency, jewelry, etc.) and all other items. These boxes will be linked to the Search Warrant as Search Warrant Box. Each Search Warrant Box will have a Box Number and Box Type.

During the search phase of the search warrant execution, law enforcement officers will find evidence that is defined in the items to be seized in the search warrant. Usually a photo(s) are taken of the evidence where it is found. Then the item of evidence can be entered into the system as a Search Warrant Item. The system will generate the Item Number (based on the last Item entered). The user will link the Search Warrant Area, Search Warrant Box, Search Warrant Property Seized Group(s), Search Warrant Person as the Seizing Officer, and Search Warrant Person(s) who found the evidence item. The user will also define Where Found (a description of where the item was found in the Search Warrant Area). The user can also link any Entities identified in the item of evidence found. If the item found was contraband (an item that possession of is legal), then the user would set the Contraband value to true. The photo(s) of the evidence will be imported as Documents and linked to the Search Warrant as Search Warrant File Link Type "Evidence item"

During the search of the location law enforcement may take additional video or pictures. These files will be imported as Documents and linked to the Search Warrant as Search Warrant File Link Type "Search Warrant Photo" or "Search Warrant Video"

The law enforcement officers on site will document the condition of the search site at the end of the search warrant with pictures and/or video. These files will be imported as Documents and linked to the Search Warrant as Search Warrant File Link Type "Exit Condition"

After the inventory is printed from the application, the user can enter the Ending Time of the search warrant which will log the End Time all remaining Search Warrant Personal as leaving as well.

Search Warrant Computer or Cell Phone

Usually when planning a search warrant for a Computer or Cell Phone there isn't a significant amount of planning that goes into the execution of the search warrant. In the application, the user would open (or create a new Investigation) and create Search Warrant. Then the user would define the Judicial Area the search warrant will be executed, link the related investigation Case Number(s), link the Computer or Cell Phone that is to be searched. The user can also link the Violation(s) identified in the affidavit for the search warrant. The user can also link the User or Person who is the affiant of the search warrant.

After the search warrant and affidavit have been signed by a judge, the user will scan (Import as a Documents) and link a copy of the signed search warrant document and affidavit to the search warrant in the application and make any needed changes to the Violation(s) in the affidavit that are linked to the search warrant. Then the user can define the Court Reference Number. The user can then create Search Warrant Seized Property Groups from the items lists to be seized which is usually attachment B to the search warrant. The user would define Item Number and Description of the Search Warrant Seized Property Group.

The user can also attach any agency specific required approval documents to the Search Warrant. The user would scan and/or Import as a Document and linked to the Search Warrant as Search Warrant File Link Type "Approval Document".

The law enforcement officer would have a digital image made of the Computer or Cell Phone. The user can import in the items to be seized, these files be imported as Documents and linked to the Search Warrant as Search Warrant File Link Type "Evidence Item".

After the inventory is printed from the application, the user can enter the Ending Time of the search warrant.

Search Warrant Email or Online Server

Usually when planning a search warrant for an Email or on-line server there isn't a significant amount of planning that goes into the execution of the search warrant. In the application, the user would open (or create a new Investigation) and create Search Warrant. Then the user would define the Judicial Area the search warrant will be executed, link the related investigation Case Number(s), link the Email, or Businesses/Person who controls the on-line server that is to be searched. The user would also link the Business Entity or Person Entity controlling the Email, computer, or server. The user can also link the Violation(s) identified in the affidavit for the search warrant. The user can also link the User or Person who is the affiant of the search warrant.

After the search warrant and affidavit have been signed by a judge, the user will scan (Import as a Documents) and link a copy of the signed search warrant document and affidavit to the search warrant in the application and make any needed changes to the Violation(s) in the affidavit that are linked to the search warrant. Then the user can define the Court Reference Number. The user can then create Search Warrant Seized Property Groups from the items lists to be seized which is usually attachment B to the search warrant. The user would define Item Number and Description of the Search Warrant Seized Property Group.

The user can also attach any agency specific required approval documents to the Search Warrant. The user would scan and/or Import as a Document and linked to the Search Warrant as Search Warrant File Link Type "Approval Document".

The law enforcement officer would send the search warrant to the controlling Business or Person entity. After the controlling Business or Person entity return the information defined in the items to be seized, these files be imported as Documents and linked to the Search Warrant as Search Warrant File Link Type "Evidence Item".

After the inventory is printed from the application, the user can enter the Ending Time of the search warrant.

Document Production Request Data

Document Production Requests are Investigation requests that command or request others to produce documents to the requesting party. There are different types of requests. In general, they include a Summons, a Subpoena, a Letters Rogatory, and a Mutual Legal Assistance Treaty (MLAT) request. Summons and Subpoenas compel testimony and documents domestically. A Letters Rogatory is a judicial request for information from aboard. MLATS are exchanges of information for criminal purposes between countries.

Referring to FIG. 25, a document production request data may be identified within a document production request data table 2500. Within the Investigation, the user will request a Document Production Request. The user will define a Document Production Request Type 2510 within the Investigation. The Document Production Request Type may be from a predefined list. The list may include, for example, Summons, Subpoena, Letter of Rogatory and a MLAT. The user will define a Served Date 2520 as the date the request was effectively served on the entity to which it was addressed. The user will define a Due Date 2530 of the Request as the date the testimony or documents are due to be in compliance. The user will define a Date request was Complied with 2540 as the actual date the recipient complied with the request. (e.g. the date the witness produced the documents requested). The user will link to a Status of the Request 2550 (e.g. Pending or Completed). The user will link to The Entity that was sent the Request 2560 which is typically a Person or a Business Entity. The user will link to the Address of the entity 2570, where the document production request was sent.

The system may also include suitable tables to track the issuance, service, and results of summons and subpoenas.

Case Investigation Report

Investigation Reports document the information and documents received while conducting an investigation. Information can be obtained from informants, subjects, and third party witnesses. Investigation Reports also document activities that the law enforcement officer has conducted in the investigation. These can include trash runs, surveillance, and drive-bys. Investigation Reports can also be questionand-answer statements, which are transcripts of the questions and answers documented during an interview.

Referring to FIG. 48, an investigation report can be included within an investigation report table 4800. The investigation report may include a start time 4810, an end time 4820, an other location 4830, and a prepared date 4840. The investigation report may link to an investigations report paragraphs 4850, an investigation numbers 4860, and an investigation report entity link type roles 4870.

Referring to FIG. 49, an investigation report paragraph can be included within an investigation report paragraph table 4900. The investigation report paragraph may include a number 4910, a description 4920, an entry time 4930, an entry date 4940, and a last change 4950. The investigation report paragraph may include links to an entities 4960, an evidence items 4970, and a facts 4980.

Investigation Summary Report

Referring to FIG. 39, investigators create a case investigation report that may be based upon a violation table 3900. Investigators create a summary report of the subject information, witness information, Violations, Elements and Facts they are investigating. The Case Investigation Report allows the user to create reports with the subject(s) being investigated. Then the user can select the Violation or Violations for which the subject is being investigated. These Violations and Elements are defined by the agency or company. The user can use the Fact Connector to link the Facts created in the system and link them to the Defined Elements and other sections of the Report. The application will then convert these links to a defined report format that the user can either export to a Linked Report or print.

The agency or company will create all the Violations that they are investigating so the end users can select them for use while working investigations. The agency or company will define a Title 3920, a Section 3930, a Description 3940 (Text description of the violation), and Help Description 3950 (Guidance for the end user on how and when to use the violation). The agency or company can create and link Violation Elements 3910.

Referring to FIG. 40, violation elements may be determined based upon a violation element table 4000. Then the agency or company would define an Element Number 4010, a Description 4020 (Description of the Element), and a Help Description 4030 (Guidance for the end user on how and when to use the element)

Referring to FIG. 41, an investigation summary report section title default may be determined based upon an investigation summary report section title table 4100. The agency or company will create default Case Investigation Reports defined report format(s). The agency or company will create an Agency Form 4110 which is linked in which the user can link Summary Report Section Title Defaults. This gives the user the ability to define the default sections of defined reports. A Summary Report Section Title Default can have linked Summary Report Section Title Defaults 4120 so that the agency or company can create titles with sub titles.

The agency or company can create and link Summary Report Section Title Default and then define an Order 4130, a Title 4140, a Required 4150, a Hide 4160, a User Created 4170, a Cited Section 4180, a Display In TOC 4185, a Subject Section 4190, an Allow User Section 4195, and a Can Move 4175. The Order 4130 is the location this section appears in the defined report. The Title 4140 is the text that appears in the default report. The Required 4150 is if this section may have Facts linked to the section. The Hide 4160 determines if the end user can hide the section in the end report. The Cited Section 4180 determines if the linked Facts may have Evidence linked to prove the Facts. The Display in TOC (Table of Contents) 4185 determines if this section is displayed in the TOC. The Subject Section 4190 determines if the section is then further broken down by the subjects defined in the report. The Allow User Section 4195 defines if the end user can create child sections within this default section. The Can Move 4175 defines if the end user can move where the section is displayed in the report.

Referring to FIG. 42, an investigative summary report may be determined based upon an investigative summary report table 4200. The user can create an Investigative Summary Report which will be selected from a defined Agency Form 4210 which has the Summary Report Section Title Defaults defined. The system will create an Investigation Form based on the Agency Form 4210 and then Summary Report Section Titles that are generated from the Summary Report Section Title Defaults. The user can define a Title 4220, a Theory 4230, and the Table of Contents (If the report will have one or not). The Title 4220 is the name of the report so the end user can organize their investigation if they have several Investigative Summary Reports in a single investigation. The Theory 4230 is a summary narrative of the theory of the investigation. The user can link additional Investigation Summary Report Section Title(s) to the Investigative Summary Report. This will allow the user to create custom sections and link to each Investigative Summary Report to account for the uniqueness of each investigation. The user can create Investigation Summary Report Attachment(s) 4240 and link to each Investigative Summary Report. This attachment can be an Investigation Document or Summary Object. This allows the user to add additional information to the Investigative Summary Report. The user may link to an investigation summary report subjects 4250, an investigation summary report section titles 4260, and an investigation summary report appendices 4270.

Referring to FIG. 46, an investigation summary report section title may be determined based upon an investigation summary report section title table 4600. The user can create Investigation Summary Report Section Title and define an Order 4610, a Title 4615, a Required 4620, a user created 4630, a Cited Section 4635, a Hide 4625, a Display In TOC 4640, a Subject Section 4645, an allow user section 4650, and a can move 4655. The Order 4610 is the location this section appears in the defined report. The Title 4615 is the text that appears in the default report. The Required 4620 is if this section may have Facts linked to the section. The Hide 4625 determines if the section is visible in the end report. The Cited Section 4635 determines if the linked Facts may have Evidence linked to prove the Facts. The Display In TOC (Table of Contents) 4640 determines if this section is displayed in the TOC. The Subject Section 4645 determines if the section is then further broken down by the subjects defined in the report. The user can create and/or link Investigation Summary Report Section Title(S) 4670 to other Investigation Summary Report Section Titles, create and link Investigation Summary Report Subjects 4680, link to facts 4690, and create and/or link to an agency form 4660.

Referring to FIG. 43, an investigation summary report subject may be determined based upon an investigation summary report subject table 4300. Once the Investigative Summary Report is created the user can link (or create) Investigation Summary Report Subject(s). The Investigation Summary Report Subject is the subject (Person or Business under investigation) of the summary report. The user can link a Person or Business 4310 as the subject. The user can link related Investigation Number(s) 4320. The user can link Investigation Summary Report Subject Violation(s) which are the Violation(s) 4330 the subject is being investigated. The user can define a Hide 4340, an Order 4350, and a Venue Description 4360. The Hide 4340 is when the user does not want to show this Subject in the report. This can occur when working a case and not know until the end that there is not enough evidence to prove the violation(s). Rather than deleting the subject and lose all the facts identified, the user can just hide them for the final report. The Order 4350 (if there are multiple subjects) is where the order of the subject appears in the report. The Venue Description 4360 is the description of the location of the venue. Venue is the judicial district in which a crime occurred and where a trial can be held.

Referring to FIG. 44, an investigation summary report subject violations may be determined based upon an investigation summary report subject violations table 4400. The user can define a Hide 4410, an Order 4420, a Date 4430, and a Count 4440 for Investigation Summary Report Subject Violation(s). The Hide 4410 is when the user does not want to show this specific violation in the report. This can occur when working a case and not know until the end that there is not enough evidence to prove the violation. Rather than deleting the violation and lose all the facts identified, the user can just hide them for the final report. The Order 4420 (if there are multiple violation) is where the order of the violation appears with in the subject. The Date 4430 is the date (or year) description the violation occurred. The Count 4440 is the description of the number of counts related to the violation. The user may link Investigation Summary Report Subject Violation Element(s) 4450 from Violation Elements of FIG. 45 for the selected Violation when an Investigation Summary Report Subject Violation is created.

Referring to FIG. 45, an investigation summary report subject violation elements may be determined based upon an investigation summary report subject violation elements table 4500. The application may define an Element Number 4510, a Description 4520, and a Can Modify 4530. The Element Number 4510 and Description 4520 are defined from the Violation Element. The Can Modify 4530 defines if the end user can modify the properties of Investigation Summary Report Subject Violation Element.

Referring to FIG. 47, an investigation summary report section attachment may be determined based upon an investigation summary report section attachment table 4700. The application may define a name 4710, an order 4720, a description 4730, and a hide 4740. The user may include links to a document 4750 and investigation summary report attachment type 4760.

Linked Report

The user can create a PDF Linked Report from an investigation summary report (generally referred to as "report" for purposes of identification) that has Document Objects linked to the report. The Linked Report will reference the linked Document Objects in the report by the Document's Unique Document Number. The application will use the report and create a PDF file that will be used to generate a Linked Report. The application will attach the linked Document Objects to the end of the Linked Report. The application will create hyperlinks between the Unique Document Number in the report to the attached Document at the end of the Linked Report. The Linked Report will generate a list of Document Objects and attach that list the Linked Report. The Linked Report will apply an optional "stamp" of the Unique Document Number to each attached Document Object.

Litigation Introduction

Although this narrative includes description on how a criminal investigation transitions from the investigative stage to the litigation stage, the civil process is quite similar and the application aides civil investigations and civil litigation as well as criminal investigations.

The system may be utilized to manage investigations from the very first lead to the time the investigation works through the investigative and litigation stages. The following steps of the litigation stage are highlighted in this report for purposes of illustration:

Charging
Discovery
Plea Process (Resolution)
Trial
Sentencing
Appeal

During an investigation, Investigators gather information. Most Investigators and prosecutors utilize the term evidence to describe all the information gathered during the investigation, although much of the information gathered during an investigation will never be admitted as evidence in court or utilized by the grand jury during the indictment process. The two generalized types of evidence are:

Direct evidence is evidence that supports a fact without an inference. Testimony of an eyewitness to a crime would be considered direct evidence because the person actually saw the crime. Circumstantial evidence is testimony related to something that happened before or after the crime.

Circumstantial evidence is evidence or statements or information that is not obtained by first hand experience but instead obtained indirectly. Circumstantial evidence can include what people's impressions about an event that happened which they didn't see. For example, if you went to bed at night and there was no snow on the ground but you awoke to snow, while you didn't actually see it snowing, you assume that it snowed while you slept.

Once the investigator has completed their investigation, they consider recommending the case for prosecution. Many federal agencies either work a case administratively with the use of agency in-house legal counsel and administratively with legal demands, for records and evidence, such as a summons or other administrative legal demand.

Often times agents will work a case through a grand jury (federal or state). A prosecutor or attorney will be assigned and the process includes the use of grand jury subpoenas for records or evidence. Also, cases might start as an administrative investigation and transition to a grand jury investigation during the investigative portion of the case.

Whether an investigation is worked administratively or through a grand jury, the agent(s) will consider recommending charges via a formal report at the conclusion of the investigative. This report will summarize the evidence gathered throughout the investigation and will summarize the violation(s), the target(s) associated with each violation, and the evidence that supports the elements of each violation.

Also, the final report could recommend forfeiture of certain assets traced to the proceeds generated by the criminal activity. Forfeiture at a state or local level is governed by local rules and statutes and can differ from state to state. The federal government may bring two types of asset forfeiture proceedings; civil or criminal. There are also administrative forfeiture actions which are a type of civil action.

Federal civil forfeiture proceedings are actions brought directly against specific types of properties such as boats, airplanes, parcels of real estate, stores, factories, inventory, or any type of real or personal property. The actions are entitled "The United States of America v. One Parcel of Real Property Located at 23 Hall Rd, Shrine, Tenn. . . . " or some similar name. To prevail in such an action, in general, the government may show probable cause that the property facilitated or was the proceed of certain unlawful activity. To prevail against the government, the owner of the property, or a claimant, may contest the government's showing of probable cause. The Government's burden of proof to forfeit property is a preponderance of the evidence.

Administrative forfeiture proceedings are a type of civil forfeiture initiated and conducted by law enforcement agencies. Law enforcement agencies have great autonomy in handling administrative forfeitures up until the time that the administrative forfeiture is contested, and sent to a U.S. Attorney for prosecution.

In criminal forfeiture proceedings, the other type of federal asset forfeiture procedure, forfeiture is sought as part of a criminal proceeding against a particular person. Criminal forfeiture proceedings are directly connected to a pending criminal prosecution, unlike a federal civil forfeiture action Charging After the prosecutor reviews the information and evidence presented by the investigators, he decides whether to present the case to the grand jury. When a person is indicted, he is given formal notice that it is believed by the grand jury that he committed a crime. The indictment contains the basic information that informs the person of the charges against him.

For potential felony charges, a prosecutor will present the evidence to an impartial group of citizens called a grand jury. The proceedings and statements made before a grand jury are sealed. Witnesses may be called to testify, evidence is shown to the grand jury, and an outline of the case is presented to the grand jury members. The grand jury listens to the prosecutor and witnesses, and then votes in secret on whether they believe that enough evidence exists to charge the person with a crime. If the grand jury decides that based on the evidence, there is probable cause to believe that the individual committed the crime, they will be indicted (a True Bill). The grand jury is a constitutional requirement for certain types of crimes.

Grand juries are made up of approximately 16-23 members. Their proceedings can only be attended by specific persons. For example, witnesses are not allowed to have an attorney present. At least twelve jurors must concur in order to issue an indictment. The Constitution has been interpreted, by the Supreme Court, to mean that only the federal government is required to use grand juries for all felony crimes. After the defendant is charged, he can either hire a defense attorney; one can be appointed if they are indigent. The defense attorney assists in understanding the facts of the case and law and represents the defendant just as the prosecutor will represent the Government.

Court Activity

Referring to FIG. 75, court activity may be included within a court activity table 7500. Within the Investigation, the user can create a Court Activity. The user can define a Scheduled Date 7510 and a Date Occurred 7520. The user can link to a Court Activity Type 7530, a Testifying Witness(es) 7540, a Court Activity Participant 7550, a Court Decision 7560, a court venue 7570, and a Court Activity Attachment 7580. For example, the Court Activity Type 7530 could be an Indictment, Information or Complaint and the Court Activity Participant 7550 could be the Judge, Witness or Attorney. The Court Decision 7560 could be Dropped, Dismissed with Prejudice, Dismissed without Prejudice, Guilty, Not Guilty, Hung Jury, or Mistrial.

Referring to FIG. 78, the court venue may be included within a court venue table 7800. The Court Venue 7570 is where the case is being prosecuted. The user can define a Description 7810 and a state (e.g., Location) 7820. For example, the Description could be the Maryland Circuit Court and Location could be Rockville, Md.

Referring to FIG. 29, the charged entity for the court venue may be included within a charged entity table 7900. The changed entity may include a link to a Person/Business 7910, a Charged Entity Violation(s) 7920, and a Court Activity Attachment 7930.

The venue is either where the crime was committed or the location where the trial is held. Federal cases are tried in a United States District Court. There are 94 district courts in the United States including the District of Columbia and territories. Many states have more than one district court so the venue will depend on where you live in the state. Within each district, there may be several courthouse locations. The agency or company will create all the Court Venues where they are prosecuting cases so the end users can select them for use in the application.

Within the Investigation, the user can create an Investigative Summary Report. It can be selected from a defined Agency Form that has the Summary Report Section Title Defaults defined. The system will create an Investigation Form based on the Agency Form and then Summary Report Section Titles are generated from the Summary Report Section Title Defaults. The user can define the Title, Theory and the Table of Contents (if the report has one). The Title is the name of the report so the end user can organize their investigation if they have several Investigative Summary Reports in a single investigation. The Theory is a summary narrative of the theory of the investigation. The user can link additional Investigation Summary Report Section Title(s) to the Investigative Summary Report. This will allow the user to create custom sections and link to each Investigative Summary Report to account for the uniqueness of each investigation. The user can create Investigation Summary Report Attachment(s) and link to each Investigative Summary Report. This attachment can be an Investigation Document or Summary Object. This allows the user to add additional information to the Investigative Summary Report.

The user can create Investigation Summary Report Section Title(s) and define Order, Title, Required, Cited Section, Hide, Display in Toc, and Subject Section. The Order is the location this section appears in the defined report. The Title is the text that appears in the default report. The Required is if the section may have Facts linked to the section. The Hide determines if the section is visible in the end report. The Cited Section determines if the linked Facts may have Evidence linked to prove the Facts. The Display in TOC (Table of Contents) determines if this section is displayed in the TOC. The Subject Section determines if the section is then further broken down by the subjects defined in the report. The user can create and link Investigation Summary Report Section Title(s) to other Investigation Summary Report Section Titles.

Once the Investigative Summary Report is created the user can link (or create an) Investigation Summary Report Subject(s). The Investigation Summary Report Subject is the subject (Person or Business under Investigation) of the summary report. The user can link a Person or Business as the subject. The user can link the related Investigation Number(s). The user can define Hide, Order, Venue Description. The Hide is when the user does not want to show this Subject in the report. This can occur when working a case and not knowing until the end that there is not enough evidence to prove the violation(s). Rather than deleting the subject and losing all the facts identified, the user can just hide them in the final report. The Order (if there are multiple subjects) is the order the subject appears in the report. The Venue Description is the description of the location of the venue. Venue is the judicial district in which a crime occurred and where a trial can be held. The user can link Investigation Summary Report Subject Violation(s) which are the Violation(s) the subject is being investigated.

The user can define Hide, Order, Date, and Count for Investigation Summary Report Subject Violation(s). The Hide is when the user does not want to show this specific violation in the report. This can occur when working a case and not knowing until the end that there is not enough evidence to prove the violation. Rather than deleting the violation and losing all the facts identified, the user can just hide them in the final report. The Order (if there are multiple violations) is the order the violation appears with in the subject. The Date is the date (or year) description the violation occurred. The Count is the description of the number of counts related to the violation. Investigation Summary Report Subject Violation Element(s) are created from for the user from Violation Elements for the selected Violation when an Investigation Summary Report Subject Violation is created. The application will define Element Number, Description, and Can Modify. The Element Number and Description are defined from the Violation Element. The Can Modify defines if the end user can modify the properties of Investigation Summary Report Subject Violation Element.

Referring to FIG. 76, the testifying witness may be included within a testifying witness table 7600. The user can define an Order 7610, a Scheduled Date 7620, a Date Occurred 7630, an Anticipated Length of Testimony 7640, and an Expert Witness 7650. The user can link to a Court Evidence 7670, which is the evidence to present in court, a Court Evidence 7670, which is the evidence that was presented in court, a Testifying Witness Question 7680, which are the Direct Questions asked of the witness, a Testifying Witness Question 7685, which are the anticipated Cross Examination Questions, a Testifying Witness Question 7690, which are the Re-Direct Questions, and a Court Activity Attachment 7695.

Referring to FIG. 77, court activity type may be included within a court activity type table 7700. The user can define the Court Activity Type as a Description 7710.

Referring to FIG. 84, a court activity attachment type for the court activity type may be included within a court activity attachment type table 8400. The Court Activity Attachment Type includes a description 8410 that could be an Arrest Warrant, Transcripts, Filed Charging Documents Decision, Plea Offer, Signed Plea Offer, Filed Plea Offer, Motion Document, Briefs, Affidavit, Ruling, Jury Instructions, etc.

Referring to FIG. 83, a court activity attachment for the court activity type may be included within a court activity attachment table 8300. The user can define the Court Activity Attachment as a Description 8310. The user can link to a Court Activity Attachment Type 8320 and a Document 8330.

The user can link the Charged Entity to the Person/Business 7910, the Charged Entity Violation(s) 7920, and the Court Activity Attachment 7930.

Referring to FIG. 81, a charged entity violation may be included within a charged entity violation table 8100. The Charged Entity Violation can be linked to a Violation 8110 and a Charged Entity Element(s) 8120.

Referring to FIG. 82, a charged entity element may be included within a charged entity element table 8200. The Charged Entity Element can be linked to a Violation Element 8210 and a Charged Entity Elements(s) 8220.

Referring to FIG. 80, a court decision trial may be included within a court decision trial table 8200. The user can include a description 8010. The user can link to a court activity type 8020, such as Dropped, Dismissed with Prejudice, Dismissed without Prejudice, Guilty/Non-Guilty, Hung, and Mistrial.

Referring to FIG. 85, a court evidence may be included within a court device table 8500. The user can define the Court Evidence as a Unique Identification Number 8510 and an Authenticated On 8520 date. The Unique Identification Number 8510 is a unique number assigned by the system and the Authenticated On 8520 date is the date it has been authenticated, a requirement for court. The Court Evidence can link to an Evidence 8530, a Charged Entity Violation Element 8540, a Testifying Witness 8550, and a Testifying Witness Question(s) 8560.

Referring to FIG. 86, a charging presentation which is inherited from court activity may be included within a charging presentation table 8600. The user can link to a Charging Presentation to Type 8610, a Charged Entity 8620, and a charging presentation 8630.

Referring to FIG. 87, a charging presentation to type may be included within a charging presentation to type table 8700. The user can define the Charging Presentation to Type as a Description 8710. For example, the type could be the Grand Jury or a Judge.

Referring to FIG. 88, a charged entity charging presentation which is inherited from charged entity may be included within a charged entity charging presentation table 8800. The user can define the Charged Entity Charging Presentation as an Arrested Prior 8810 and an Arrest Warrant Issued 8820.

Either the same day or the day after a defendant is arrested and charged, he/she is brought before a magistrate judge for an initial hearing on the case. At that time, the defendant learns more about their rights and the charges against them. Arrangements are made for them to have an attorney, and the judge decides if the defendant will released until the trial or held in prison until the trial. In many cases, if they meet the requirements for bail, the defendant will be released from prison before a trial. Before the judge makes the decision on whether to grant bail, he/she may hold a hearing to learn facts about the defendant to determine if they should be released. If the defendant cannot pay the money (post bail), the judge may order the defendant remanded into the custody of the U.S. Marshals pending trial. The defendant will also be asked to plead guilty or not guilty to the charges.

Referring to FIG. 69, an initial appearance which is inherited from court activity may be included within an initial appearance table 6900. The Initial Appearance may link to the Charged Entity Initial Appearance(s) 6910.

Referring to FIG. 70, a Charged Entity Initial Appearance which is inherited from charged entity may be included within a Charged Entity Initial Appearance table 7000. The user can create a Charged Entity Initial Appearance within the Investigation. The user can link it to a Demand Appearance Type 7010, an Identity Hearing 7020, and a Detention Hearing 7030.

Referring to FIG. 71, a demand appearance type which is inherited from arrest warrant/summons to appear/extradition may be included within a demand appearance type table 7100. The user can define the Demand Appearance Type as a Description 7110. For example, it could be an Arrest Warrant, Summons to Appear, or Extradition.

Referring to FIG. 72, an identity hearing which is inherited from court activity may be included within an identity hearing table 7200. The user can define the Identity Hearing as Proceed as Named 7210.

Referring to FIG. 73, a detention hearing which is inherited from court activity may be included within a detention hearing table 7300. The user define a granted 7310, a release amount 7320, a posted amount 7330, and a date posted 7340. The user can link to a Detention Release Type 7350.

Referring to FIG. 74, a detention release type which is inherited from bail/bond/detained/release won recognizance may be included within a detention release type table 7400. The user can define the Detention Release Type as a Description 7410. For example, it could be Bail, Bond, Detained or Released own recognizance.

Although the investigators gather a lot of evidence that will not be used to charge the case, the discovery process rules obligate the government to make the evidence available to the defense. Before a prosecutor begins a trial, the prosecutor has to become familiar with the facts of the crime, study the evidence, talk to the witnesses, anticipate problems that could arise during trial, and develop a trial strategy. They may even practice statement they may make during the trial.

Meanwhile, the defense attorney is also preparing for trial. They will talk to witnesses who could be called to testify in court.

A witness is a person who saw or heard the crime take place or may have important information about the crime or the defendant. Both the defense and the prosecutor can call witnesses to testify or tell what they know. What the witness actually says in court is called testimony. In order to testify, witnesses will take an oath to agree or affirm to tell the truth.

There are three types of witnesses:

A lay witness is a person who watched certain events and describes what he/she saw. This is the most common type of witness.

An expert witness is a specialist who is educated in a certain area and will testify with respect to their specialty area only.

A character witness is someone who knew the defendant, the victim, or other people involved in the case. Character witnesses usually don't have first-hand knowledge of the crime but they can testify to the personality of the defendant or victim, or what type of person the defendant or victim was before the crime. Family, friends, neighbors and clergy are often used as character witnesses.

To determine which of the witnesses to call to testify and trial and to avoid surprises, the prosecutor talks to each witness to find out what they may say during trial. These conversations will help the prosecutor decide whom to call as a witness in court. Another important part of trial preparation is reading every report written about the case. The prosecutor determines the facts of the case based on information in the reports and the information from witnesses.

The discovery process is when prosecutors provide the defendant copies of materials and evidence that the prosecution intends to use at trial. The process continues from the time the case begins to the time of trial. A prosecutor has an obligation to provide the defendant documents and other information which may reflect upon the case. A prosecutor can be fined or sanctioned by the court if they fail to do so. Further, the prosecutor is required to provide the defense with evidence that may hurt the prosecutor's case because it may show the defendant's innocence. It is called exculpatory evidence. If the prosecution does not provide it to the defense, it may require a new trial.

Referring to FIG. 89, an export may be included within an export table 8900. The user can define the Description 8910, a reason description 8920, and a bates number prefix 8930. That is the Description of the Discovery Export such as the subject name "Shamus Smith." The system captures the Create Date 8940 which is the date the Discovery Export is created. There could many requests for an Export. The user can link to an investigation 8950, an export reason 8960, and an export headers 9070. The Export Reason 8960 is selected from a predefined list. If the Export Reason 8960 requires the user to define a description, the user can define a the Reason Description 8920 as a text entry. As an example, the Export Reason 8960 could be sharing of evidence with another agency and the Reason Description 8920 could be shared with "FBI".

The user can define which Export Headers will be displayed on the Export. For example, the Export Header, a text entry, could be "First Production" defining the first group of records to Export. The second Export Header could be the group of evidences chosen to be exported. The user can define the Bates Number Prefix 8930. The Bates number will distinguish between the same exact image that could have been submitted as evidence multiple times by multiple witnesses. The number is an assigned alphanumeric number prefixing each bates numbered image. For example, the subject of the investigation could be Shamus J. Smith. The Bates Number Prefix could be "SJS".

Referring to FIG. 90, an export reason may be included within an export reason table 9000. The agency/company can define the Export Reason as a description 9010. For example, the reason could be to share with another agency or at the request of the defense attorney. The user can define the Export Reason description from a predefined list. The agency/company can define the Description. The agency/company can define that the evidence will be Allow Not Discoverable 9020. The agency/company can define if the Evidence Item is Allow Grand Jury 9030 material. The agency/company can set if a Required Reason Description 9040 is required.

Referring to FIG. 91, an export header may be included within an export header table 9100. The system will capture the Export Header. The user can define the Actual Output Device 9110 from a predefined list. For example, it could be the "C Drive". The user can define the Export Option 9120. For example, evidence properties and file formats. The system can capture a Create Date 9130. The system can capture a Update Date 9140. The user can define the Description 9150. The user can link to an Export 9160, an Export Status 9165, an Export Method 9170, an Export Output Type 9175, an User 9180, an Export Header Shared to Link 9185, and an Export Objects 9190. The Export Header Shared to Link is the Entity in the investigation in which the Export data is being shared. The system can capture the Export Objects 9190.

Referring to FIG. 92, an export status may be included within an export status table 9200. The agency/company can create Export Status. The user can define a Description 9210.

Referring to FIG. 93, an export method may be included within an export method table 9300. The agency/company can create Export Method. The method is the medium the data is being exported to such as a CD/DVD or a printout. The user can define a Description 9310.

Referring to FIG. 94, an export output type may be included within an export output type table 9400. The agency/company can create Export Output Type. The user can define the Description 9410.

Referring to FIG. 95, an export object may be included within an export object table 9500. The system will define an Export Object. The user can define an Export Key Number 9510 (an integer), a Size 9520 (in decimals), a Type 9530 (text entry), a Path 9540 (text entry), and a Date Exported 9550, which is system captured. The Export Object can link to a Digital File 9560 and a Document Page 9570.

Referring to FIG. 96, an export header shared to link may be included within an export header shared to link table 9600. The user can link to the Person or User 9610 in the investigation in which the Export data is being shared.

Referring to FIG. 97, a plea offer may be included within a plea offer table 9700. The plea offer table may be linked to a charged entity plea offer 9710. When the government has a strong case, the government may offer the defendant a plea bargain to avoid trial and possibly reduce the defendant's exposure to a lengthier sentence. A defendant may only plead guilty if they committed the crime and admits to doing so in open court before the judge at a Change of Plea hearing. The government will draft a Plea Agreement that may be signed by the defendant prior to the Change of Plea hearing. When the defendant admits to the crime, they agree they are guilty and they agree that they may be "sentenced" by the judge presiding over the court. The judge is the only authorized person to impose a sentence. If a defendant pleads guilty, there is no trial. The next step is to prepare for a sentencing hearing.

Referring to FIG. 98, a charge entity plea offer may be included within a charge entity plea offer table 9800. Within an Investigation, a user can create a Charged Entity Plea Offer. This is what the government has offered the defendant as a plea agreement and the defendant can accept or reject it. The judge presiding over the case can also reject the plea agreement, even after it has been accepted by the defendant and the attorneys.

The user can define the Sentence Recommendation 9810. It is what is being recommended by the prosecution such as probation or a number or range of numbers for an incarceration term. The user can define the Restitution Recommendation Amount 9820. This is the amount the defendant is responsible for paying based on his criminal activities. The user can define the Sentence Accepted 9830. This describes if the defendant accepted/agreed to the offer or rejected it. If the offer is accepted and the Plea Agreement is signed, the Sentence Accepted should be the same as the Sentence Recommendation. The user can define the Restitution Accepted Amount 9840. This describes if the defendant agreed to the Restitution Accepted Amount or rejected it. If accepted, is should be the same as the Restitution Recommendation Amount. If there is a counter offer causing a new plea offer, the user would create another Charged Entity Plea Offer. The user can link to a Plea Offer Resolution 9850. The user can link to a Sentencing 9860.

Referring to FIG. 99, a plea offer resolution may be included within a plea offer resolution table 9900. The Plea Offer Resolution is a description 9910 that is the outcome of the offer and is from a predefined list. For example, the resolution could be Accepted, Charged Entity Rejected, Withdrawn, Judge Rejected.

One of the last steps a prosecutor takes before trial is to respond to or file motions. A motion is an application to the court made by the prosecutor or defense attorney. Motions request that the court make a decision on a certain issue before the trial begins. The motion can affect the trial defendants, evidence, testimony or courtroom. Only judges decide the outcome of motions.

Common pre-trial motions include the following. 1). a Motion to Dismiss: An attempt to get the judge to dismiss the case or the charge. This may be done if the alleged facts do not meet the elements of a crime or there is not enough evidence. 2). a Motion to Suppress: An attempt to keep certain evidence or statements from being introduced as evidence. For example, if police conducted a search without probable cause, a violation of the Fourth Amendment, it may be possible to suppress the evidence found as a result of that search. 3). a Motion for Change of Venue: An attempt to have the venue moved. It may be made for various reasons including pre-trial publicity. For example, if the case has been highly publicized by the local news, it may be necessary to move the trial to another venue so the defendant's may have an impartial jury.

Referring to FIG. 100, a motion may be included within a motion table 10000. In the Investigation, a user can create a Motion. The user can define if the motion is Joint 10010. This will be a Boolean value. For example, when there is more than one defendant in an investigation and each defendant has their own attorney, the attorneys may file motions together or jointly. The user can define the Date Filed 10020. The user can define a Response Date 10030. This is the date the response to the Motion is due and can be set up as a Due Date in an Action Item. The user can define the Hearing Date 10040 for the Motion. The Motion can be linked to a Court Activity Participant(s) 10050, a Motion Ruling Type 10060, a Related Motions 10700, a Testifying Witness 10080, and a Motion Hearing 10090.

Referring to FIG. 101, a motion stage type may be included within a motion stage type table 10100. The user can define the Motion Stage Type, which is a description 10110 of the type of Motion filed at a particular stage of the litigation process. For example, the stage could be Pre-Trial, Trial, or Post-Trial.

Referring to FIG. 102, a motion type may be included within a motion type table 10200. The user can define the Motion Type, which is a description 10210 of the type of motion filed. For example, the attorney can file a motion to dismiss a case, suppress evidence or change the venue.

Referring to FIG. 103, a motion ruling type may be included within a motion ruling type table 10300. The user can define the Motion Ruling Type, which is a description 10310 of the type of ruling the judge made on the Motion. For example, the judge could grant the motion, reject the motion or grant part of the motion Referring to FIG. 104, a motion hearing may be included within a motion hearing table 10400. The user can define the Motion Hearing, which is a motion 10410 of the court activity. A court activity can be a hearing, trial, change of plea, etc.

Within the Investigation, the user can create the Court Activity table 7500. The user will define the Scheduled Date 7510 and the Date Occurred 7520. The user can link to the Court Activity Type 7530, the Court Venue 7570, the Testifying Witness(es) 7540, the Court Activity Participant 7580, the Court Decision 7560, and the Court Activity Attachment 7550. The Court Activity Type 7530 could be an Indictment, Information or Complaint. The Court Activity Participant 7580 could be the Judge, Witness or Attorney. The Court Decision 7560 could be Dropped, Dismissed with Prejudice, Dismissed without Prejudice, Guilty, Not Guilty, Hung Jury or Mistrial. The user can link to one or more Motion(s) related to the court activity/hearing.

After many weeks or months of preparation, the prosecutor is ready for the trial, the most important part of their job. The trial is a structured process where the facts of a case are presented to a jury, and they decide if the defendant is guilty or not guilty of the charge. recommended. During trial, the prosecutor uses witnesses and evidence to prove to the jury that the defendant committed the crime(s). The defendant, represented by an attorney or representing themselves as an attorney, also tells their side of the story using witnesses and evidence. In a jury trial, the judge is the impartial person in charge of the trial. He/she decides what evidence can be shown to the jury. Similar to a referee in a ball game, a judge is there to make sure the entire process is played fairly.

Referring to FIG. 105, a trial may be included within a trial table 10500. Within an Investigation, the user can create a Trial. The user can link to a Trial Statement(s) 10510, a Trial Jury(s) 10520, a Trial Objection(s) 10530, and a Charged Entity Trial(s) 10540. The Trial Objection are objections made during the trial. The user can link to the Trial Statements 10510, which are the statements made by the prosecution and defense during the trial.

Referring to FIG. 107, a trial statement may be included within a trial statement table 10700. The user can define the Trial Statement Order 10710, which is the order in which the trial statement is made. The user can link to a Trial Statement Type 10720 and a facts 10730, which are the facts of the investigation. For example, it could be opening or closing.

Referring to FIG. 106, a charged entity trial may be included within a charge entity trial table 10600. The user can define the Charged Entity Trial, which defines if the subject is In Custody 10610. For example, the subject could be out on release or a fugitive.

Referring to FIG. 108, a charged entity trial may be included within a charge entity trial table 10800. At the beginning of trial, a prosecutor and defense attorney select jurors. Jurors are selected to listen to the facts of the case and to determine if the defendant committed the crime. Twelve jurors are selected randomly from the jury pool (also called the "venire"). The potential jurors are compiled from voter registration records of people living in the Federal district. When selecting the jury, the prosecutor and defense attorney may not discriminate against any group of people. A jury should represent all types of people, races, and cultures. Both lawyers are allowed to ask questions about their potential biases and may excuse jurors from service (also called Voir Dire). A limited number of "Peremptory challenges" allow each side to excuse certain potential jurors without providing a reason. Within the Investigation, the user can create a Trial Jury. The user can link the Trial Jury to a Jurors 10810, a Jury Selection(s) 10820, a Jury Questions(s) 10830, and a Charged Entity Trial(s) 10840.

Referring to FIG. 109, a jury selection may be included within a jury selection table 10900. The user can define the Number of Peremptory Challenges 10910 during the Jury Selection. The Number of Peremptory Challenges can link to a Juror 10920 and a Questionnaire 10930.

Referring to FIG. 110, a trial jury questionnaire may be included within a trial jury questionnaire table 11000. The trial jury questionnaire may include question(s) 11010.

Referring to FIG. 111, a trial jury questionnaire question may be included within a trial jury questionnaire question table 11100. The Trial Jury Questionnaire Question can be defined by a Number 11110, the number assigned to the juror, and a Question 11120, what the juror was/will be asked.

Referring to FIG. 112, a juror may be included within a juror table 11200. The user can define the Number 11210 assigned to the Juror. The Juror can link to a Juror Questionnaire Answer(s) 11220, a Juror Challenge(s) 11230, a Juror Status 11240, and a Juror Verdict 1250.

Referring to FIG. 113, a juror questionnaire answer may be included within a juror questionnaire answer table 11300. The user can define an Answer(s) 11310, which is the Juror's answer to the question. The Juror Questionnaire Answer can be linked to a Juror Reason to Excuse(s) 11320 and a Note(s) 11330.

Referring to FIG. 114, a juror reason to excuse may be included within a juror reason to excuse table 11400. The user can define the Juror Reason to Excuse as a Description 11410.

Referring to FIG. 115, a juror challenge may be included within a juror challenge table 11500. The user can link to a court activity participant 11510, a juror challenge type 11520, and a juror challenge ruling 11530.

Referring to FIG. 116, a juror challenge type may be included within a juror challenge type table 11600. The juror challenge type can be a description 11610.

Referring to FIG. 117, a juror challenge ruling may be included within a juror challenge ruling table 11700. The user can define the Juror Challenge Ruling as a Description 11710. For example, it could be granted or denied.

Referring to FIG. 118, a juror status may be included within a juror status table 11800. The user can define the Juror Status as a Description 11810. For example, the juror could be Pool, Excused, Selected, Alternate or Forman.

Referring to FIG. 119, a juror verdict may be included within a juror verdict table 11900. The user can define the Juror Verdict as a Description 11910. For example, it could guilty or not guilty.

Referring to FIG. 120, a jury question may be included within a jury question table 12000. The user can define the Jury Question as a Description 12010. The Jury Question can link to a Court Evidence 12020, an Entities 12030, a Charged Entity Violation 12040, and a Charged Entity Violation Element 12050.

Opening statements allow the prosecutor and the defense attorney to briefly tell their account of the events of the crime. These statements usually are short and do not involve witnesses or evidence. Since, the Government has the burden of proving that the defendant committed the crime, their opening statement is first.

Following opening statements, the prosecutor begins direct examination of their first witness. This is the prosecutor's initial step in attempting to prove the case. It can last from a few minutes to several days. During direct examination, the prosecutor can introduce evidence from the crime scene. Following the prosecutor's examination of a witness, the defense attorney has an opportunity to cross examine or ask questions to the same witness. The purpose of cross examination is to create doubt as to the credibility of the witness. After the defense attorney cross examines the witness, on redirect examination, the prosecutor asks the witness final questions to clarify any confusing testimony.

Once all three processes are complete, the prosecutor rests their case. After the prosecutor rests, no more witnesses can be called to the stand or evidence introduced by the government.

After the Government rests, the defense has the opportunity to present witnesses and evidence to the jury. The defense also has the option of not having the defendant testify because there is no burden upon the defendant to prove that he is innocent. It is the government's responsibility to prove the defendant committed the crime as detailed in the indictment. If the defendant does not testify, it may not be considered by the jury as proof that the defendant committed the crime. The defense may also waive his case. Also, if the defense does not put on any evidence, the jury cannot assume that the defendant is guilty simply because they did not put on a defense. The defense will usually present its own version of the case, however, the decision to put on a defense is solely up to the defendant and the defense attorney.

During direct or cross examination, either attorney can make an objection a piece of evidence or a question to the judge.

Common objections include some of the following. 1). Hearsay: a statement by a witness who did not see or hear the incident in question but learned about it through secondhand information such as another's statement such as a new article. 2). Relevance: Testimony and evidence presented at trial may be relevant to the case.

The judge decides the outcome of an objection, sometimes after allowing attorneys on both sides to comment before making a ruling. The judge either overrules" the objection and allows the action to continue or "sustains" the objection so that the action stops.

Referring to FIG. 121, trial objections may be included within a trial objections table 12100. The trial objections can include a description 12110 and an objection to answer 12120. The Trial Objections will link to a Trial Objection Type 12130, a Trial Objection Ruling 12140, a Witness Question 12150, a Court Evidence(s) 12160, and a Testifying Witness 12170.

Referring to FIG. 122, a trial objection type may be included within a trial objection type table 12200. The user can define the Trial Objection Type as a Description 12210. For example, it could be Hearsay, Relevance, Leading, Asked and Answered.

Referring to FIG. 123, a trial objection ruling may be included within a trial objection ruling table 12300. The user can define the Trial Objection Ruling as a Description 12310. For example, it could be sustained or overruled.

After the defense's direct testimony and cross examination by the prosecutor of all the witnesses, the defense rests their case, and the prosecutor and defense attorney prepare for closing arguments. Closing arguments are the last opportunity for the prosecutor and the defense attorney to talk to the jury. The arguments allow both attorneys to summarize the testimony and evidence, and ask the jury to return a verdict of guilty or not guilty.

Following the closing arguments, the judge "charges the jury," or informs them of the appropriate law and of what they may do and consider to reach a verdict.

After being charged, the jury goes into deliberation, the process of deciding whether a defendant is guilty or not guilty. During this process, no one associated with the trial can contact the jury without the judges and lawyers. If there is a question by the jury regarding the applicable law, they may write a note to the judge, which the judge will read in court with all parties present. In federal criminal trials, the jury may reach a unanimous decision in order to convict the defendant. After they reach an agreement on a verdict, they notify the judge, the lawyers, and the defendant in open court and everyone is present in court for the reading of the verdict. If the defendant is found not guilty, they are usually free to go home.

If the defendant is convicted, there are several motions that can be filed after the trial is over. Common post-trial motions include the following. 1) Motion for a New Trial. The court can vacate the judgment and allow for a new trial. 2). Motion for Judgment of Acquittal. The Court may set aside the jury's verdict and allow the defendant to go free. 3). Motion to Vacate, Set Aside, or Correct a Sentence. It is useful for the purpose of correcting a clerical error in the sentence.

Within the Investigation, the user can create a Motion. The user can define if the motion is Joint. This will be a Boolean value. For example, when there is more than one defendant in an investigation and each defendant has their own attorney, the attorneys may file motions together or jointly. The user can define the Date Filed. The user can define a Response Date. This is the date the response to the Motion is due and can be set up as a Due Date in an Action Item. The user can define the Hearing Date for the Motion. The Motion can be linked to the Motion Stage Type, Motion Type, Court Activity Participant(s), Motion Ruling Type, Related Motions, Testifying Witness, and Motion Hearing.

After conviction, the defendant returns to court to be sentenced. The judge receives guidance and assistance from several sources in order to sentence a defendant. Congress established minimum and maximum punishments for many crimes which the judge uses as guide to sentence the defendant. The judge will consider presentence reports and statements from the victims as well as the defendant, friends, family and supporters, and lawyers. The judge may consider a variety of mitigating or aggravating factors. The judge has great latitude to consider many sentencing factors both in support of the defendant and the moving party.

Referring to FIG. 124, a sentencing ruling may be included within a sentencing table 12400. Within the Investigation, the user will create Sentencing. The user can link Sentencing to the Charged Entity Sentencing 12410.

Referring to FIG. 125, a charged entity sentencing may be included within a charged entity sentencing table 12500. The user can define a Sentence Recommendation 12510, a Restitution Recommendation Amount 12520, a Sentence Accepted 12530, and a Restitution Accepted Amount 12540.

The Trial Appeal is the process in which cases are reviewed because the parties request a formal change to the official decision. Even after a defendant is found guilty, he can appeal to the Circuit Court if he believes the sentence was too harsh or they were wrongly convicted. A Trial Appeal is an opportunity for the defendant to try to raise specific errors that might have occurred at trial. It is not another trial. Appeals can be complicated and sometimes result in the case going back to the trial court. The Court of Appeals may decide a sentence may be altered, a conviction may be reversed or a new trial may be ordered. Even after an appeal is decided by a circuit court judge, a defendant can try to appeal that decision to the United States Supreme Court in Washington, D.C. The United States Supreme Court, the highest appellate court in the American court system, makes the final decision concerning a defendant's appeal. The Court only takes a small number of cases each year and is not required to hear an appeal in every case.

Referring to FIG. 126, a trial appeal may be included within a trial appeal table 12600. The Trial Appeal can link to a Trial Appeal Type 12610, a Charged Entity Trial 12620, and a Charged Entity Sentencing 12630.

Referring to FIG. 127, a trial appeal type may be included within a trial appeal type table 12700. The user can define the Trial Appeal Type as a Description 12710. For example, it could be a Trial, Verdict or Sentence.

For each type of challenge, how many challenges are granted, how many are used, and how many are left. The same query for the opposing side is also needed.

A Maps functionality allows a user to view and interact with geo-located investigative information on a map (e.g. Google Maps or Open Street Maps). Functionality could include, but isn't limited to:

GPS tracking data;
Geotagged multimedia files;
Manually-entered geographic coordinates;
GPS and geo-tagged overlays and comparisons;
Business Intelligence; and
Timeline Enhancements.

Figure 129:
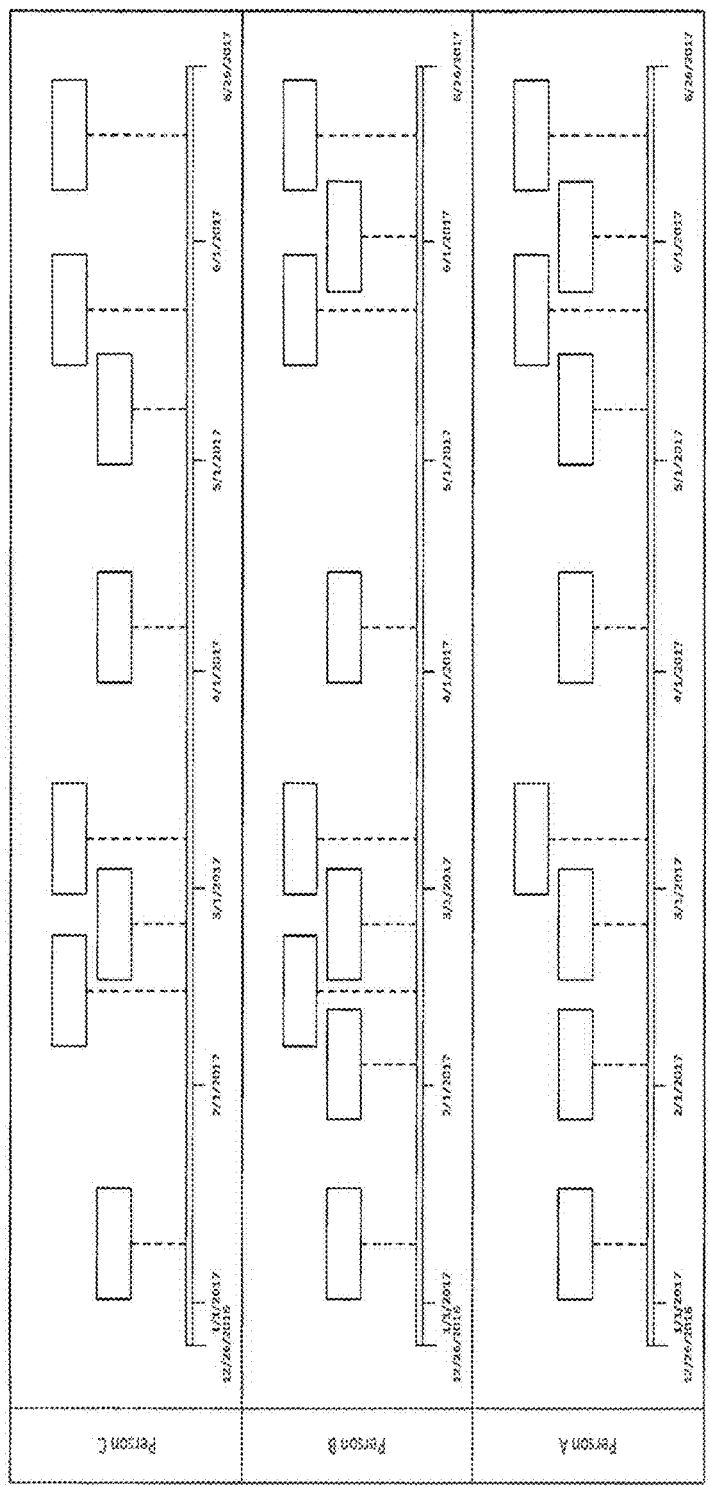
FIG. 129 illustrates swim lanes.

Referring to FIG. 129, the system may include swim lanes. This would allow users to view multiple timelines stacked on top of each other. Scrolling along the timeline would be synced, so that a user could compare events during a given window of time, across two or more timelines. Further functionality allows users to automatically highlight overlaps or gaps in similar/related events.

The system may be used for any suitable environment, such as for example, government agencies, government contracting, medical diagnosis, medical billing, education, and mixed reality systems. In the use of mixed reality interaction (i.e., augmented reality and/or virtual reality) the system acts as a tool for helping users across markets. Many of the leading mixed reality headsets (e.g., HoloLens, Oculus Rift, Daqri, Meta One) contain forward-facing, high resolution cameras. This enables an investigator to record the details of a crime scene. Additionally, at least two of these headsets (HoloLens, Daqri) are equipped with sensors that allow the wearer to create a 3D map of a space. The headset may also include a thermal headset, and audio recording, and collaboration tools. Beyond headsets, there are several stand-alone sensors, scanners, and other technology (e.g., LIDAR, 3D scanners, 360 degree cameras, etc.) that may be used for crime scene recording. Being equipped with high-resolution cameras, an investigator could quickly scan evidence directly into a database. Depending on the type of evidence, the data can be saved as an image, and even run through our OCR engine to produce accompanying text.

As an investigator walks through a crime scene, the cameras and/or sensors can record videos and photos, along with a spatial map. This functionality is useful throughout all phases of an investigation, including jury playback.

During the crime scene investigation, evidence can be tagged immediately as it is observed. A mixed reality user interface, where a user can select from a pre-set collection of evidence flags (e.g., weapons, paperwork, clothing, freeform, etc.) to pin into the crime scene walkthrough.

As a general matter, the system may search based upon the OCR text for entities that are in the investigation project. The text that matches previously entered entities may be presented to the user (e.g., the underlining of Clare Stevens illustrated in FIG. 10) so that the user may efficiently add links between OCR'd evidence and create a link between the entity and the evidence. The system may also search OCR text for other entity first level properties (e.g., a person's social security number, a person's date of birth, a business' employer identification number, a boat's name, etc.).

Referring to FIG. 130, the user may search across the entire project using any keyword(s), phrase(s), title(s) or other properties of an object(s). The system will return any object that contains the search criteria. The results of this search are filterable (e.g., faceted search) presented in a floating tab window.

Based upon the results of the search illustrated in FIG. 130, the user may dock the tab within the main user experience, navigate using the search breadcrumbs (e.g. All Projects>Stevens, Russel . . . etc.), use the filters checkboxes on the left to reduce the search results, use the search results controls (e.g. Search Within, Sort By, etc.) to further refine the search results, a user may click and drag results onto other panels (e.g., canvas, tables, etc.) and users can use the overflow menu (i.e. the vertical ellipsis on the right of the result's row) to open properties and/or view any attachments.

Referring to FIG. 131, another view is illustrated with a different set of filters selected.

Using the global search, the user may search across al OCR text within a project. The search ability allows a user to search for a word or a phrase. These criteria may be in object properties, but they may also be in the OCR text. The system provides the users with the ability to filter the OCR results. The search results may be presented to the user in a suitable manner which may include text snippets from the OCR text as illustrated in FIG. 132.

Using the global search the user may search across all objects within a project. The search functionality may allow users to specify the degrees of separation of a given object(s) and return results that satisfy that criteria.

Fuzzy Date Data Type

Figures 132, 133:
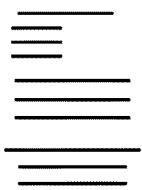
FIG. 132 illustrates text snippets from OCR.
FIG. 133 illustrates fuzzy dates.

Referring to FIG. 133, Fuzzy Dates can store full or less than complete dates. Fuzzy Date can define any part of the date time properties: Month, Day, Year, Hour, Minute, Second, and Time Zone. Fuzzy Date can define the approximation of the date as Before, On or Before, On, On or About, On or After, After, and Between. Fuzzy Dates are helpful when one is unsure of a complete date. For example, if you do not know the day but know that the date was after a known month and year.

Fuzzy Date Range

Referring to FIG. 134, Fuzzy Date Range includes the ability to define either a single Fuzzy Date or a Fuzzy Date Range. A Fuzzy Date Range allows for a starting Fuzzy Date and an ending Fuzzy Date, by using the Between option from the drop-down.

Money Data Type

Money data can store an amount, a defined type of currency, the conversion date and the number of decimal places to use for the amount. Money data can also store the multiple currencies to convert to money data into. The user can select which currency to view the money in. The application will use the defined currency type, the conversion date and the amount to convert to the amounts for all listed currencies to convert.

Audio/Video Storage Viewing Editing

The platform provides for digital file storage including Document (PDF, Word, Excel®, etc.), Binary Data (computer software, ZIP files, etc.), Multimedia (Audio, Video, etc.) and other file formats. The client application supports the import, storage, export and viewing/editing of binary data within a project. The Project Type configurator has the ability to allow users to manage binary data on a Project Type by Project Type basis.

Audio and Video data is stored and managed within the platform. The specific storage mechanism employed is configurable and extensible. Several storage techniques for binary data may include:

(a) Within the default Data Storage subsystem In the same data space, and using the same technology as normal object and property data.

(b) In an alternate Data Storage subsystem. For example, the configurator and/or administrator(s) may define an alternate Data Storage subsystem to specifically store binary data. For example, a relational database (such as MySQL, or SQLServer) may be used for binary data storage while a different technology is used for object storage.

(c) As separate files on a shared file storage system. The configurator and/or administrator(s) may define an external (not part of the Server architecture) storage location for binary data. This will generally be a shared file server within an organization.

The management of audio and video data also includes "Viewer" components within the client application to provide the functionality. For video data the functionality may include viewing video files, including video navigation functionality (fast forward, reverse, pause, skip to position, etc.), video editing capabilities (brightness, contrast, color correction, etc., trimming, and splitting a single Video stream into two or more video streams), ability to define "Bookmarks" in the Video stream (definition of a specific point in the video timeline), and ability to define "Fragments" in the Video stream (defining beginning and ending points in the video timeline). For audio date the functionality may include playing audio files, including audio navigation functionality (fast forward, reverse, pause, skip to position, etc.), audio editing capabilities (volume, noise removal, etc., trimming, splitting a single audio stream into two or more audio streams), ability to define "Bookmarks" in the Audio stream (definition of a specific point in the audio timeline), and ability to define "Fragments" in the Audio stream (defining beginning and ending points in the audio timeline).

The platform may provide an extensible, flexible workflow-based processing model providing Project Type configurators the flexibility to customize user interactions and system processes. Workflows may be made up of one or more "Steps". Each step is preferably one of two broad types: (1) a user Interaction Step and (2) a system processing step. The User Interaction Steps are presented to the User to allow them to enter information, make selections, or otherwise provide input to the process. The configurator provides a custom WPF-based UI experience, allowing the configurator to provide a feature-rich user experience. The System Processing Steps do not require user interaction, and are processed by the server process. Steps of this type may include background processes, processing of user input provided in an earlier User Interaction Step, or other processes.

The workflow processing engine provides the ability to store workflow states, manage transitions between workflow steps, and provide a background/scheduled processing framework for use by the Project Type configurators.

Workflows may be initiated by user actions as defined in the Project Type configuration, as "system" processes (not triggered directly by a user action), background processes, etc.

An example Document Import and Processing may be as follows.

In this example, the User imports a PDF file from their local computer. The Project Type configurator desires that when a PDF is imported, its binary data be extracted, stored, and OCR processing be performed on the imported PDF document.

The Project Type configurator would define a "Single PDF Import and OCR" workflow, and a "Perform OCR" workflow as follows:

Single PDF Import and OCR Workflow:
Step 1: User Interaction Step
  Provide the User with a user interface element to allow them to choose an existing PDF file from their computer, provide additional properties (such as Title, Document Author, etc.).
  When the User completes entering the required information and clicks a "Submit" button, the collected information is passed to the in8Server Workflow processing framework, and the system will execute the next Step in the Workflow.
  Note that at this point, with no subsequent User Interaction Steps, the user is "done" with this Workflow, and is allowed to continue with other work (they do not need to wait until the remaining processing is required).
Step 2: System Processing Step
  Execute the "Perform OCR" Workflow.
  Note: This is an example of Workflow "Chaining"—the ability for one Workflow to call another. This provides a way for Project Type configurators to share logic and code and minimize redundancy in the Project Type configuration.
Perform OCR Workflow:
Step 1: System Processing Step
  Perform OCR processing on the supplied PDF documents and save the resultant information.

Case Backups

A typical operational task for users of any computer system is to create, store, and manage backups of important data. These backups are generally used to reduce the impact of user, system, or software failures. The Platform provides several methods to create Backups of user's data:
1. Standalone Deployment Model:
  1. Users can utilize the "Export Entire Project" capability to create a file that contains all of the information within a Project.
  2. Users can utilize other backup solutions to backup all of the data on their PC.
2. Enterprise Deployment Model:
  1. Enterprise Administrative users can utilize in8 tools to perform backups of individual Projects, selected Projects, or all Projects from the Enterprise Server(s).

Export Data

The platform provides several techniques for users and/or administrators to Export data from the platform. There are several use cases for this functionality, including, but not limited to:

1. Backup project data for disaster recovery
2. Export a Project to share a Project with another user of the in8Platform.
3. Export a table of data to a CSV so that a user can open and review data in Excel®, or other software programs.
4. Export selected Objects and their attachments to share project information with others not using the in8Platform.

Several export file formats may be supported:
1. Comma Separated Values (.csv) which is useful for sharing data with others that want to access the information with tools other than the Platform.
2. A Project File that includes a file format that includes (optionally) data, metadata, history, binary data, etc.)
3. Extensible Markup Language (.xml) which is a portable file format useful for transferring data between computer systems.
4. Portable Document Format (.pdf), which is a "Document" based format that can include linked (attached) binary files.

Several different Export techniques may be supported:
1. Export entire Project
Use cases:
   Project data backup
   Project Archiving
   Transferring a Project from one computer to another in the Disconnected (Standalone) Client deployment model
A user can export an entire Project to a file.
The file can (optionally) be encrypted to protect the contents.
The data exported would include all objects, properties, history, binary data, metadata, audit logs, configurations, etc. In the Enterprise deployment model, exporting a Project will also (optionally) export user state data that is stored in Users' dataspaces within the Enterprise.
2. Export table to CSV
Use cases:
   Share data with an outside user.
   Open a set of data and perform analysis with Excel, or other software.
A user can elect to export the data presented in a Table to a .CSV file. This may be done within the Table panel by selecting one or more rows and selecting the option to "Export to CSV". The system may then allow the user to select the folder/file to save, and the data in the table will be saved to the .csv file.
3. "Advanced Export"-Export selected Objects (optionally including related Objects and digital files/attachments)
Use cases:
   Export selected object data to provide to outside users.
   Share selected objects from a project with other users.
An Advanced data export facility is provided to allow the user to graphically select objects within a project to be part of an ExportGroup. The ExportGroup is then configured as to which properties for each object type to export, the time period of data to export, and whether or not to include digital files (attachments/binary objects). The user will also choose the format for the ExportGroup— Either .CSV for basic object property values, and digital files stored as individual files in a selected folder, or as an .in8 proprietary file format.
The user can also choose to encrypt the file, and apply restrictions on the file (read only, secured by a password, etc.).

Project Type Configuration

The platform provides the ability for end-users to extend the Project Type configuration on a project-by-project basis, thereby allowing the end-user to customize the data elements related to objects of a specific type within a Project. For example, the Project Type may define a "Person" object type with pre-defined properties such as Name, Date of Birth, Gender, etc. Due to the business processes being performed by the user, a user may need to track additional data elements for "Persons" within a project. A simple example for this functionality is that a user may need to add "Marital Status" as a property for all instances "Person" within a Project, to allow the user to record, analyze, or report on Marital Status. When a "Custom Property" is added to a project's configuration, the new property is defined preferably with the following information:
   Name
   Description
   Data Type (see list of in8 Datatypes in this document)
   "Watermark" text (the helper text shown inside or near a field's editor control to provide information to the user as to what to enter in the field)
   Validation expression(s)
   Minimum and/or Maximum data size limits
   Masking Format
   Display Format
   Default Value
   Table Column Header Name
The new Property may be available for all objects of the modified Type within the Project.

Data Replication

The platform provides advanced data replication capabilities to support offline use of the application, user collaboration, and data sharing.

Functional Goals

The primary functionality provided by the Replication capabilities of the platform include (1) allowing users to replicate Project data to their local computer allowing them offline use, (2) provide a mechanism to distribute changes to data in near real-time enabling a collaborative workspace when multiple users are operating on the same Project on different computers; (3) providing a method to share data with other users of the Platform in a secured way; and (4) provide a traceable history of every change made to a Project enabling auditing, data change analysis, and the ability to visualize a Project at any point in time.

Conceptual Design

The platform's data storage infrastructure can be conceptualized as each Enterprise consisting of a single "Enterprise Dataspace" (collection of objects, relationships, change history, etc.) that is not necessarily ever physically present on any single computer. The Enterprise Dataspace is a conceptual collection of the fragments of the dataspace on all of the nodes of the Enterprise. Again, the entire Enterprise Dataspace may not ever be completely materialized on any one node. Administrators could choose to have all data replicated to one or more nodes, and in that case, the entire Dataspace would be present on the node, but this is not required.

Definition of a Replica

Replication is primarily defined at a Project level. Each Project within the Enterprise dataspace has one Node designated as the "Project Master" Node. This node is responsible for operations that need to occur on one and only one node (an example being assigning of unique sequential "Item Key" values ["Bates numbers"]). The Project Master always contains the complete dataset for the Project. The Process of creating a new Replica of a Project consists of defining any Replica Filtering (and the Filtered Object Storage Method), and defining the Replica's Population Method.

Replica Filtering

When a user (or administrator) elects to have a Project replicated to a Node that is not the Project Master, the node is said to host a "Replica" of the Project. A Replica does not necessarily contain a complete copy of a Project. Replicas can be defined as being "filtered"—only a subset of the Project's data is to be kept on the node. Filtering can be defined to restrict the data being replicated in a number of ways—these are referred to as "Filtering Methods". Filter Methods can be combined to create a specific set of filtering criteria.
Example Filtering Methods may include the following:
  No Filtering
    All data in the Project is replicated. Essentially, the Node will contain the entire dataset as the Project Master node.
  Specific Objects
    Only specific objects (and, optionally, their related Objects) are replicated.
  Specific Object Types
    Only objects of specific Object Types (as defined in the Project Type configuration) are replicated.
  Specific Properties
    Only selected Object Property values are replicated.
  Specific Property Types
    Only properties of a specific Property Type are replicated.
  Combinations of Object Type and Property Type
    Specific properties of specific Types are replicated.
  Binary Data
    Binary Data (images, documents, video, etc.) can optionally be replicated.
  History
    A Replica can be limited to containing only the most recent state, include the entire history, or a selected portion of the history of the Project (example: Last 5 states, or 1 month of history).
  Accessible by User
    Only Objects/Properties that are accessible by a specific User, or group of Users is replicated.
  Accessible by Role
    Only Objects/Properties that are accessible by members of a specific Project Role are replicated.

Filtered Object Storage Technique

When a Replica is defined with one or more Replication Filters, the user or administrator will also define how Objects filtered from the Replica are to be represented in the Replica:
  Forwarded
    Objects that are not replicated to the Replica (due to Filtering, for example), are replicated as "Forwarding Stub" objects. These allow the Replica to be aware of the Objects that are not replicated locally, and allow the in8Platform to forward a request for data to another node to retrieve the non-replicated data from the Project Master node (if connected and available).
  Hidden
    Objects that are not replicated to the Replica (due to Filtering, for example), are not represented at all in the Replica. The Replica has no knowledge of objects that are not being replicated to the Replica due to Replica Filtering rules for the Replica. This can be used to create a Replica that contains a subset of data to be shared with other users, outside agencies, etc.

Population Method

When a Replica is created, the user or administrator will define the Population Method. This controls the process whereby the new Replica is populated with data.
  Full Initial Population
    The entire initial synchronization process must complete before the Replica is considered "Online". The Replica is not available until the initial synchronization is completed for all Objects that conform to the Filtering Methods defined for the Replica.
  Queued Initial Population (Default)
    The Replica is initially populated with "Queue Stub" objects, representing objects in the Project Master replica that have not been replicated to the new Replica yet. Once all Queue Stub objects are created, the Replica is considered Online and accessible to the local user. The Replication process will continue in the background to replace the Queue Stub objects with replicated data when a connection is available to the Project Master.
  The Queue Stub objects are replaced with actual Object data via several methods:
    As the Population process continues in the background, objects are replicated from the Project Master node until all Queue Stub objects are replaced with real Object data.
    When the replica node receives a change notification for an object that is currently represented with a Queue Stub object, the Object will be immediately replicated from the Project Master.
  Once all Queue Stub objects have been replaced with real data, the result is the same as a Full Initial Population (the new Replica contains all of the data that conforms to any applied Filters).
  Incremental Population
    The Replica is initially populated with "Incremental Stub" objects, representing objects in the Project Master replica that have not been replicated to the new Replica yet. Once all Incremental Stub objects are created, the Replica is considered Online and accessible to the local user.
    The Incremental Stub objects are replaced with actual Object when a user accesses an object that is currently represented with a Incremental Stub Object. When this occurs, the local node will query the Project Master and replicate data for that Object immediately.
  Note that the difference between Queued and Incremental is that in the Queued method, the entire Replica will be eventually populated via the background replication process, while the Incremental method, the User must access an object for that Object to be replicated to the local Replica. This provides a mechanism where the local Replica only contains data that has been accessed by a local user, thereby saving storage space on the local node, and reducing replication workload (since not all objects are replicated to the node).

Continued Replication

Once the new Replica is ready (online), replication continues with the Replica Node connecting to the Project Master node (when available), and the Project Master sending all changes to objects meeting the Replica's Filtering configuration in real-time. The local Replica then applies those changes to the local Project Replica, and notifying any connected client applications (allowing the clients to have knowledge of changes made by other users).

Changes generated on the local Replica are sent to the Project Master for dissemination to all other nodes hosting replicas of the Project.

Replication Conflict Management

With any replication strategy, there exists the possibility of replication conflicts. In simple terms, a replication conflict is when two different users make a change to a single piece of data within one replication session. Therefore, one of the edits would be lost (replaced) with the other. The in8Platform records changes to individual property values, thereby reducing the chance for replication conflicts (by operating on a smaller portion of the data). When a replication conflict is determined, every node will have all of the changes made to the conflicted property, and users would be able to review the change history for an object and see an indication that a replication conflict was automatically resolved. The Administrator can select a conflict resolution mode:

Last change wins

If two or more users create changes that generate a conflict, the change with the latest timestamp will "win". Note that all of the changes are recorded in the object history for visibility, and audit capabilities.

Specific User or Role wins

If two or more users create changes that generate a conflict, the Administrator can define a hierarchy of users and/or roles, with the user or role with the highest priority "winning". This allows a scenario such as "The main user wins, while guests don't". Again, note that all of the changes are recorded in the object history for visibility, and audit capabilities.

Additionally, the Administrator can set system and Project options to notify one or more of the user(s) involved that a conflict was automatically handled, providing the users the ability to review the changes and ensure that the desired information is preserved.

As the Platform's data modifications are primarily additive (the system creates a new "State" of an object or property, versus "editing" a property or object), there will be a reduced incidence of replication conflicts.

Within the Investigation, the user can create Bank Statement as an Evidence Item. The user can define the Begin Date, Begin Balance, End Date (of the Evidence), End Balance, Total Deposits, Total Withdrawals and Reconciled, a Boolean value.

Financial Information

Bank Transaction

The user can define Bank Transaction as a Check Number, Cleared Date or Amount. The user can link to the Account, Bank Transactions and Lock Status. The Lock Status can be defined as Unlocked, Amount Locked or Object Locked. These allow the user to lock certain objects or properties. (For example, after a user has reconciled a bank account, he can lock the Amount property so it can't be modified.) The Bank Transaction can be linked to the Bank Transaction Details and the Entities.

Bank Transaction Details

The user can define the Bank Transaction Detail as an Amount and can be linked to the Bank Item.

Bank Item

The user can define Bank Items as Item Date, Amount, Memo, ABA Number, Account Number and Bad Unknown Amount. The Bank Item can be linked to the Bank Items and Account.

Create Check

The user can define Create Check as a Bank Item. The user can link to the Check Number.

Check

The user can define Check as the Check Number and link to the Item Date.

Item Date

The user can define the Item Date as Amount, Memo, ABA Number, Account Number and Bad Unknown Amount. The user can link to the Bank Item and the Account.

Financial Analysis

Various techniques may be used to prove income but there are specific methods of proof approved for prosecuting criminal cases. There are Indirect and Direct Methods of Proof. Those methods involve analyzing transactions and applying a source and application of the funds. The primary methods are Specific Items, Net Worth, Expenditures, Bank Deposits and Cash Method. Depending on the facts and circumstances of each investigation, a subject's correct income or financial gains may be established by "direct" or several "indirect" methods of proof, usually using circumstantial or "indirect" evidence.

Direct Method of Proof

The Specific Item method of proof is the preferred method of proof. It is easy to understand, report and present at trial. Additionally, the specific item of proof method is the hardest for the subject to rebut. Most subjects report their income and expenses by the specific item method using books and/or records in which their financial transactions are contemporaneously recorded.

Indirect Method of Proof

Indirect methods require investigators to gather and present evidence to support the allegation and determine the amount of the subject's financial gains. Unlike the specific item method of proof, sources of income may not be identifiable so the income may have to be computed indirectly based upon the subject's use or application of the funds.

The net worth method of proof differs from a specific item method in that direct comparisons of income, expenses, and credits cannot be made. Evidence of income applications such as asset accumulation, liability reduction, expenditures, and other financial data are utilized to indirectly establish correct income figures. An accounting is made showing how funds generated from income were applied by identifying increases to net assets and expenditures.

The following steps are taken by the investigator:

1. The investigator first calculates the change in a subject's net worth, which is the assets less the liabilities. This is done by determining the net worth at the beginning and end of a period of time and then subtracting the beginning period's net worth figure from the ending period's net worth figure. This will yield a net worth change of an increase or decrease in net worth.
2. The amount of this change in net worth is then adjusted for nontaxable items, personal living expenses and nondeductible losses to arrive at a corrected adjusted gross income figure.
3. The corrected adjusted gross income figure is then adjusted for itemized or standard deductions and for exemptions, to arrive at a corrected taxable income figure.
4. Finally, by comparing the corrected taxable income figure with the taxable income reported elsewhere, the investigator can determine whether the subject a reporting discrepancy.

Proving Income Using the Expenditures Method of Proof

The expenditures method of proving income utilizes circumstantial evidence. This method is based on the theory that if the subject's expenditures during a given year exceed his/her reported income, and the fund's source used for the expenditures can't be explained, it may be inferred that the expenditures represent unreported income.

Providing Income Using the Bank Deposits Method of Proof

The bank deposits method of proving income utilizes bank account records to establish a subject's understatement of income. The theory is that if a taxpayer is engaged in an income producing business and deposits of money are made in bank accounts under his/her control, an inference may be made that such deposits represent income, unless it appears that the deposits are transfers of funds between accounts or re-deposits, as long as those deposits did not come from gifts, inheritances or loans.

Proving Income Using a Cash Method of Proof

The cash method of proof is an indirect method of proof of undeclared income which focuses on expenditures made in currency. The cash method is based on the same kind of investigation and analysis performed in the expenditures method, however, it represents a different presentation of the results of the investigation.

Additional System Configuration

The Platform is an extensible, high-performance data management platform, designed to give users the ability to visualize, manage and report complex data across multiple markets. The Application is a comprehensive, intuitive, application from the perspective of the investigator, the litigator, and the court. Its purpose, in part, is to simplify the management of complex criminal investigations that often include incredibly sophisticated schemes, millions of pages of evidence, international ties, and very complex violations of laws and statutes. The process is simplified by offering a unified software application that will be the single application that is used during the investigation, the prosecution, the trial, and the appeal. The evidence will move from one stage to the next without the need to transfer the data to any other software application. In summary, the Application may connect:

Facts of a case to Evidence
Evidence to Entities
Evidence to elements of the crime
Evidence and the facts to a Report The Application gives the user the ability to create data links between Entities, Facts and Evidence and create Action Items for follow up. Users can upload and manage evidence and manage investigative tools such as Mails Covers, Phone Tolls, GPS tracking and Search Warrants. Users can manage and reconcile Financial Transactions. Users can create Investigative Reports, identify evidence for Discovery and export data. Users can create and manage litigation documents and court activity. Users can view the data and their links in the canvas as a Timeline, Graph, Map, Swimlanes or a Table.

Users have the ability to work offline. Entitles will be automatically Deconflicted and users will be alerted when there is a deconfliction hit. Users can use the Mobile application with a limited version of the full application.

The application will be available as a SaaS product. It can be a standalone application. A hosted client application that allows 6-10 workstations or an enterprise networked application. Data can be stored locally or at the client's choosing.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention. Project type configurations may be created automatically by the system or by the user of the system through an interface. The resulting project types may result in outputs suitable for use in the data models and the workflow models.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A system comprising:
(a) at least one computer that includes at least one host processor on the at least one computer to execute the operations of the system and at least one storage device storing instructions that are operable, when executed by said at least one computer including at least one host processor, to cause the at least one computer to perform operations of the system comprising:
(i) said at least one computer providing a user interface to present data to a user, an engine that performs said operations on said data that includes objects and provides said data to said user interface, and a vault that provides storage on said at least one storage device of said data for said operations by said engine;

(ii) said data including said objects that are project type data modules that provide definitions for said objects and a plurality of properties for each of said objects where each of said objects has a corresponding data type;

(iii) said data including said objects that are project type workflow modules that provide (1) definitions for said operations, (2) elements to system response to user interface events, (3) elements to system response to data events, (4) elements to prompt users for information, (5) elements to execute unattended processing workflows, and (6) elements for said presenting said data on said user interface;

(iv) said user interface including said graphical icons where movement of a first icon representative of a first project type data module onto a second icon representative of a second project type data module results in said first project type data module being linked to said second project type data module by an interrelationship defining both (1) an intermediary project type data module and (2) a project type workflow module, wherein the result of said linking is automatically saved;

(v) said user interface graphically showing said interrelationship between said first project type data module and said second project type data module together with a nature of said interrelationship between said first project type data module and said second project type data module;

(vi) said user interface including a canvas configurable to graphically map said interrelationship between said first and second icons and any number of interrelationships between said first and/or second icons and/or any number of other icons representative of said project type data modules; and (vii) said canvas also configurable to graphically arrange said objects that are project type data modules according to said plurality of properties of said project type data modules.

2. The system of claim 1 wherein said data is organized based upon a state chained property bag, in which the state chained property bag tracks each of the objects as they are included and their relationship to one or more other objects of said state chain in a temporal fashion.

3. The system wherein 1 wherein one of said objects associated with any of said project type data modules are identified in a unique manner.

4. The system of claim 3 wherein said unique manner includes a key, wherein said key includes a key prefix prepended to a sequential number, said sequential number, a key suffix appended to said sequential number, a number of digitals defining a zero padded length of said sequential number.

5. The system of claim 3 wherein said unique manner includes a key, wherein said key includes an allow temporary key defining whether a key is permitted to be assigned, a temporary key prefix prepended to a temporary key, said temporary key, and a temporary key suffix appended to said temporary key.

6. The system of claim 3 wherein said unique manner includes a key, wherein said key includes a key prefix prepended to a sequential number, said sequential number, a key suffix appended to said sequential number, a number of digitals defining a zero padded length of said sequential number, an allow temporary key defining whether a key is permitted to be assigned, a temporary key prefix prepended to a temporary key, said temporary key, and a temporary key suffix appended to said temporary key.

7. The system of claim 3 wherein said unique manner includes a key, wherein said key includes a key prefix prepended to a sequential number, said sequential number, a key suffix appended to said sequential number when said vault is currently accessible by said at least one computer.

8. The system of claim 3 wherein said unique manner includes a key, wherein said key includes a temporary key prefix prepended to a temporary key, said temporary key, and a temporary key suffix appended to said temporary key when said vault is currently not accessible by said at least one computer.

9. The system of claim 1 wherein said data is organized based upon a state chained property bag, in which the state chained property bag tracks historical values for any given property of each of the objects.

10. The system of claim 1 wherein said data is organized based upon a state chained property bag, in which the states chained property bag identifies an object as deleted while not being removed from said vault.

11. The system of claim 1 wherein said objects includes object security based upon a control list of roles that are allowed, including at least read and write.

12. The system of claim 1 wherein said data is organized based upon a state chained property bag, in which the state chained property bag identifies a temporal point in time for when each object is active and a state of said state chained property bag is determinable at any particular temporal point in time.

13. The system of claim 1 wherein workflow executed as a result of said project type workflow modules are recorded with state information to continue processing if said workflow executing is interrupted.

14. The system of claim 13 wherein said executed workflow includes an audit trail of said executed workflow.

* * * * *